United States Patent
Nukada et al.

(10) Patent No.: US 8,518,619 B2
(45) Date of Patent: Aug. 27, 2013

(54) PHOTOELECTRIC CONVERSION DEVICE, ELECTROPHOTOGRAPHIC PHOTORECEPTOR, PROCESS CARTRIDGE, AND IMAGE FORMING APPARATUS

(75) Inventors: Katsumi Nukada, Kanagawa (JP); Wataru Yamada, Kanagawa (JP); Takatsugu Doi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 202 days.

(21) Appl. No.: 13/025,610

(22) Filed: Feb. 11, 2011

(65) Prior Publication Data

US 2012/0021345 A1    Jan. 26, 2012

(30) Foreign Application Priority Data

Jul. 21, 2010   (JP) ................. 2010-164391

(51) Int. Cl.
*G03G 5/04*    (2006.01)
(52) U.S. Cl.
USPC ............... 430/96; 430/56; 430/57.1; 430/73
(58) Field of Classification Search
USPC ...................... 430/56, 96, 73, 57.1
See application file for complete search history.

(56) References Cited

U.S. PATENT DOCUMENTS

| | | |
|---|---|---|
| 4,539,507 A | 9/1985 | VanSlyke et al. |
| 4,764,625 A | 8/1988 | Turner et al. |

(Continued)

FOREIGN PATENT DOCUMENTS

| | | |
|---|---|---|
| EP | 517 542 A1 | 12/1992 |
| EP | 0 740 126 A1 | 10/1996 |

(Continued)

OTHER PUBLICATIONS

"Fluorine Resin Fine Particle Dispersion Type Hybride Coating", The Proceedings of the 8th Polymer Material Forum, Lecture 1999, p. 89.

(Continued)

*Primary Examiner* — Mark F Huff
*Assistant Examiner* — Rashid Alam
(74) *Attorney, Agent, or Firm* — Oliff & Berridge, PLC

(57) ABSTRACT

Provided is to provide a photoelectric conversion device including an organic compound layer which contains polymer (a) having partial structures represented by the following formulae (1) and (2) respectively. In the formula, $R^1$, $R^2$, $R^3$ each independently represent a hydrogen atom or an alkyl group having from 1 to 4 carbon atoms, X and Y each independently represent a divalent organic group having from 1 to 20 carbon atoms, a represents 0 or 1, and CT represents an organic group having a charge transportable skeleton.

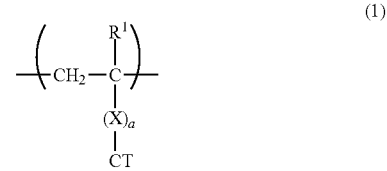

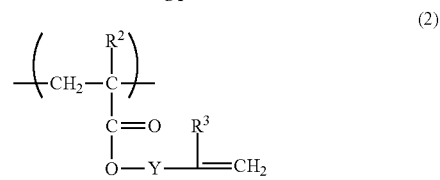

13 Claims, 8 Drawing Sheets

(56) References Cited

U.S. PATENT DOCUMENTS

| | | | |
|---|---|---|---|
| 4,923,774 A | 5/1990 | Van der Auweraer et al. |
| 4,950,950 A | 8/1990 | Perry et al. |
| 5,061,569 A | 10/1991 | VanSlyke et al. |
| 5,069,975 A | 12/1991 | Nakada et al. |
| 5,121,029 A | 6/1992 | Hosokawa et al. |
| 5,130,603 A | 7/1992 | Tokailin et al. |
| 5,151,629 A | 9/1992 | VanSlyke |
| 5,153,073 A | 10/1992 | Ohnuma et al. |
| 5,256,945 A | 10/1993 | Imai et al. |
| 5,276,381 A | 1/1994 | Wakimoto et al. |
| 5,290,928 A | 3/1994 | Nukada et al. |
| 5,298,617 A | 3/1994 | Nukada et al. |
| 5,302,479 A | 4/1994 | Daimon et al. |
| 5,322,753 A | 6/1994 | Tamura et al. |
| 5,330,866 A | 7/1994 | Ueda |
| 5,358,788 A | 10/1994 | Kawamura et al. |
| 5,358,813 A | 10/1994 | Iijima et al. |
| 5,378,569 A | 1/1995 | Nukada et al. |
| 5,393,614 A | 2/1995 | Nakada |
| 5,393,629 A | 2/1995 | Nukada et al. |
| 5,411,827 A * | 5/1995 | Tamura et al. ............ 430/58.05 |
| 5,427,880 A | 6/1995 | Tamura et al. |
| 5,459,004 A | 10/1995 | Daimon et al. |
| 5,488,137 A | 1/1996 | Tamura et al. |
| 5,496,671 A | 3/1996 | Tamura et al. |
| 5,529,853 A | 6/1996 | Hamada et al. |
| 5,608,010 A | 3/1997 | Tamura et al. |
| 5,639,581 A | 6/1997 | Iwasaki et al. |
| 5,654,119 A | 8/1997 | Ishii et al. |
| 5,734,003 A | 3/1998 | Iwasaki et al. |
| 5,776,622 A | 7/1998 | Hung et al. |
| 5,779,937 A | 7/1998 | Sano et al. |
| 6,093,864 A | 7/2000 | Tokailin et al. |
| 2004/0043312 A1 | 3/2004 | Kikuchi et al. |
| 2004/0248024 A1 | 12/2004 | Suzuki et al. |
| 2004/0253527 A1 | 12/2004 | Suzuki et al. |
| 2005/0181292 A1 | 8/2005 | Fujii et al. |
| 2007/0122724 A1 | 5/2007 | Suzuki et al. |
| 2007/0154828 A1 | 7/2007 | Fujii et al. |
| 2007/0178400 A1 | 8/2007 | Kikuchi et al. |
| 2008/0020305 A1 | 1/2008 | Suzuki et al. |
| 2009/0162763 A1 * | 6/2009 | Li et al. ............ 430/58.2 |

FOREIGN PATENT DOCUMENTS

| | | |
|---|---|---|
| JP | 59-194393 A | 11/1984 |
| JP | 01-245087 A | 9/1989 |
| JP | 02-222484 A | 9/1990 |
| JP | 02-247278 A | 10/1990 |
| JP | 04-129271 A | 4/1992 |
| JP | 04-133065 A | 5/1992 |
| JP | 04-175395 A | 6/1992 |
| JP | 04-189873 A | 7/1992 |
| JP | 04-264189 A | 9/1992 |
| JP | 04-290851 A | 10/1992 |
| JP | 04-304466 A | 10/1992 |
| JP | 04-308688 A | 10/1992 |
| JP | 04-335087 A | 11/1992 |
| JP | 04-364153 A | 12/1992 |
| JP | 05-011172 A | 1/1993 |
| JP | 05-011173 A | 1/1993 |
| JP | 05-025473 A | 2/1993 |
| JP | 05-040360 A | 2/1993 |
| JP | 05-043823 A | 2/1993 |
| JP | 05-070773 A | 3/1993 |
| JP | 05-098181 A | 4/1993 |
| JP | 05-198377 A | 8/1993 |
| JP | 05-202135 A | 8/1993 |
| JP | 05-216249 A | 8/1993 |
| JP | 05-234681 A | 9/1993 |
| JP | 05-239455 A | 9/1993 |
| JP | 05-263007 A | 10/1993 |
| JP | 05-279591 A | 10/1993 |
| JP | 05-310949 A | 11/1993 |
| JP | 05-320634 A | 12/1993 |
| JP | 05-323630 A | 12/1993 |
| JP | 05-331459 A | 12/1993 |
| JP | 06-001972 A | 1/1994 |
| JP | 06-025659 A | 2/1994 |
| JP | 06-049079 A | 2/1994 |
| JP | 06-256428 A | 9/1994 |
| JP | 06-322362 A | 11/1994 |
| JP | 07-053953 A | 2/1995 |
| JP | 07-072640 A | 3/1995 |
| JP | 07-138562 A | 5/1995 |
| JP | 07-252474 A | 10/1995 |
| JP | 08-176293 A | 7/1996 |
| JP | 08-208820 A | 8/1996 |
| JP | 08-315983 A | 11/1996 |
| JP | 09-012630 A | 1/1997 |
| JP | 10-074586 A | 3/1998 |
| JP | 11-052603 A | 2/1999 |
| JP | 2000-206715 A | 7/2000 |
| JP | 2000-206717 A | 7/2000 |
| JP | 2000-264961 A | 9/2000 |
| JP | 2001-166510 A | 6/2001 |
| JP | 2001-175016 A | 6/2001 |
| JP | 2004-012986 A | 1/2004 |
| JP | 2004-078147 A | 3/2004 |
| JP | 2004-302450 A | 10/2004 |
| JP | 2005-002291 A | 1/2005 |
| JP | 2005-181992 A | 7/2005 |
| JP | 2007-11005 A | 1/2007 |
| JP | 2007-086522 A | 4/2007 |
| WO | WO 97/33193 A2 | 9/1997 |

OTHER PUBLICATIONS

Tang, C.W., et al. "Electroluminescence of Doped Organic Thin Films", J. App. Phys., vol. 65, p. 3610-3616, May 1989.

Adachi, Chihaya, et al., "Organic Electroluminescent Device Having a Hole Conductor as an Emitting Layer", App. Phys. Lett., vol. 55, p. 1489-1490, Oct. 1989.

Hung, L.S., et al., "Enhanced Electron Injection in Organic Electroluminescence Devices Using an Al/Lif Electrode", Appl. Phys. Lett., vol. 70, p. 152-154, Jan. 1997.

Wakimoto, Takeo, et al., "Organic EL Cells Using Alkaline Metal Compounds as Electron Injection Materials", IEEE Trans. Electron Devices, vol. 44, p. 1245-1248, Aug. 1997.

\* cited by examiner

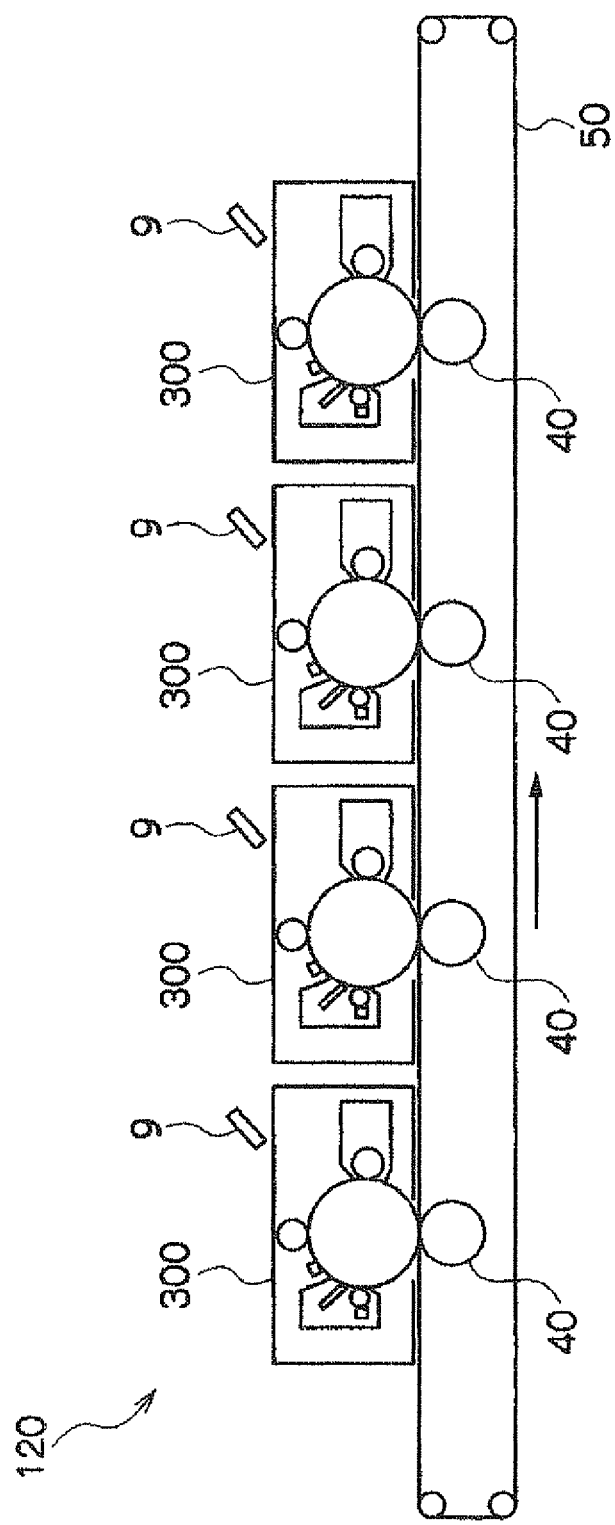

PHOTOELECTRIC CONVERSION DEVICE, ELECTROPHOTOGRAPHIC PHOTORECEPTOR, PROCESS CARTRIDGE, AND IMAGE FORMING APPARATUS

CROSS-REFERENCE

This application is based on and claims priority under 35 USC 119 from Japanese Patent Application No. 2010-164391 filed on Jul. 21, 2010.

BACKGROUND

1. Technical Field

The present invention relates to a photoelectric conversion device, an electrophotographic photoreceptor, a process cartridge, and an image forming apparatus.

2. Related Art

Recently, photoelectric conversion devices using acryl-based polymers or cross-linked films have attracted attention.

SUMMARY

According to an aspect of the invention, there is provided a photoelectric conversion device comprising an organic compound layer that contains a polymer (a) having partial structures represented by the following formulae (1) and (2) respectively:

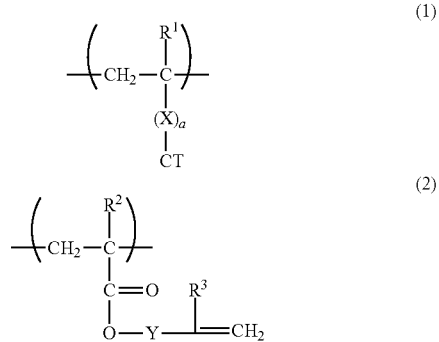

wherein, in formulae (1) and (2), $R^1$, $R^2$, and $R^3$ each independently represent a hydrogen atom or an alkyl group having from 1 to 4 carbon atoms, X and Y each independently represent a divalent organic group having from 1 to 20 carbon atoms, a represents 0 or 1, and CT represents an organic group having a charge transportable skeleton.

BRIEF DESCRIPTION OF THE DRAWINGS

Exemplary embodiments of the invention will be described in detail based on the following figures, wherein:

FIG. 5 is a schematic diagram illustrating one example of a configuration of a tandem type image forming device according to an exemplary embodiment of the invention.

DETAILED DESCRIPTION

Figure 1:
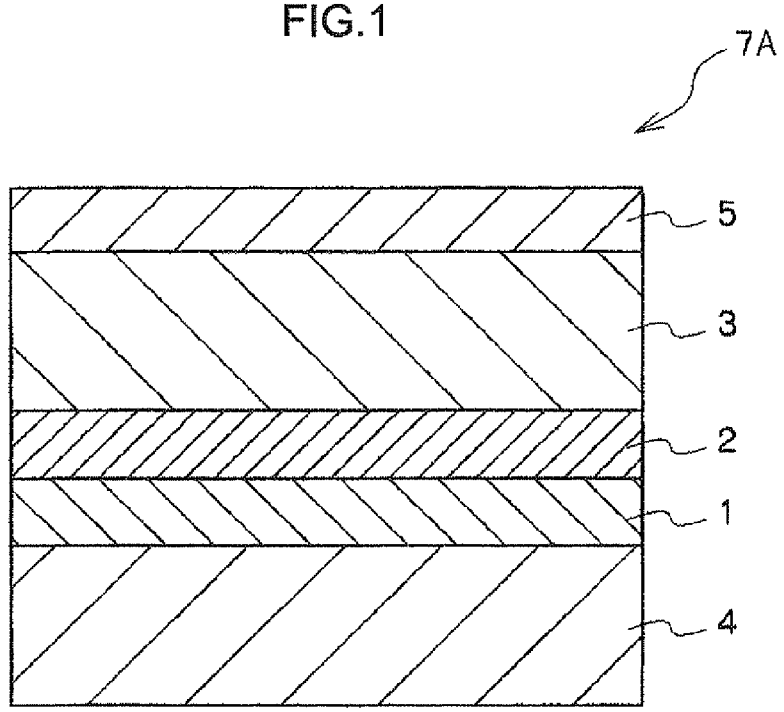
FIG. 1 is a schematic cross-sectional diagram partially illustrating one example of an electrophotographic photoreceptor according to an exemplary embodiment of the invention.

According to an exemplary embodiment of the invention, when low molecular charge transportable materials are polymerized or are made to be of a cross-linked structure, it is hard to thicken the film thickness due to residues of the polymerization catalyst used at the time of making a cross-linked structure, stresses such as heat, light, and radiation rays, and residual strain as a consequence of the polymerization or the fixing of the cross-linked structure that makes carrier trapping occur more easily and makes sufficient performances harder to obtain.

Non-cross-linkable charge transportable acryl polymer is excellent in electrical properties, but can easily become a film having high brittleness and low strength. Further, when multi-functional acryl monomer is mixed thereto and strength is increased, non-cross-linkable charge transportable acryl polymer and multi-functional acryl monomer have low mutual compatibility, and there is a limit to the increasing of the amount of multi-functional acryl monomer added. Multi-functionalizing and cross-linking the charge transportable materials are effective in improving strength, but on the other hand, residual strain easily occurs and deterioration of electrical properties is easily caused.

The photoelectric conversion device of the exemplary embodiments of the invention has an organic compound layer containing polymer (a) including a partial structure represented by the following formulae (1) and (2) respectively.

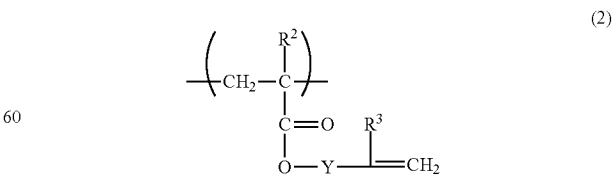

In the formula, $R^1$, $R^2$, and $R^3$ each independently represent a hydrogen atom or an alkyl group having from 1 to 4 carbon atoms, X and Y each independently represent a divalent organic group having from 1 to 20 carbon atoms, a represents 0 or 1, and CT represents an organic group having a charge transportable skeleton. Further, X and Y may contain —C(=O)—, —O—C(=O)— and/or an aromatic ring.

Further, an end group of polymers (a) represents a structure generated in a stop reaction by a radical polymerization reaction.

Since at least one organic compound layer provided in a photoelectric conversion device such as an electrophotographic photoreceptor, an organic electroluminescent device, solar cell or the like contains polymer (a) including a partial structure represented by the formulae (1) and (2) respectively and has none or has small amounts of high polar functional groups such as the —OH group, there is provided a photoelectric conversion device where carrier trapping is suppressed and mechanical and thermal strength and stability are excellent and deterioration due to the environment is low, and an electrophotographic photoreceptor where general deterioration of image quality after repeated use is suppressed.

Further, "photoelectric conversion device" of the exemplary embodiments of the invention means a device where light is converted into electricity or electricity is converted into light and, examples thereof include an electrophotographic photoreceptor, a solar cell, an organic electroluminescent device, or the like.

Further, polymer (a) contained in the organic compound layer preferably has partial structures represented by the following formulae (1') and (2') respectively as partial structures represented by the formulae (1) and (2) respectively.

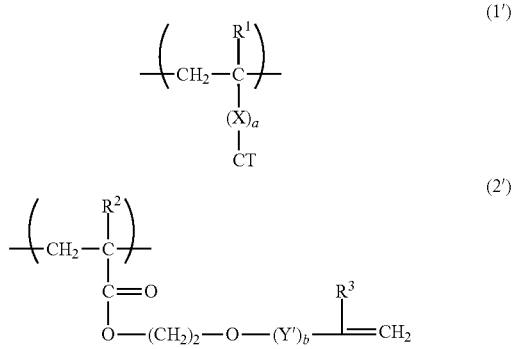

In the formula, $R^1$, $R^2$ and $R^3$ each independently represent a hydrogen atom or an alkyl group having from 1 to 4 carbon atoms, X represents a divalent organic group having from 1 to 20 carbon atoms, Y' represents a divalent organic group having from 1 to 10 carbon atoms, a and b each independently represent 0 or 1, and CT represents an organic group having a charge transportable skeleton. X and Y" preferably may contain, —C(=O)—, —O—C(=O)— and/or an aromatic ring, and one having no hydroxyl group is preferable, The electrophotographic photoreceptor (simply referred to as "photoreceptor") as one example of the photoelectric conversion device of the exemplary embodiments of the invention will be described.

The electrophotographic photoreceptor of the exemplary embodiments has at least a conductive substrate, and an organic compound layer which contains polymer (a) containing partial structures represented by the formulae (1) and (2) respectively and is disposed on the conductive substrate. The organic compound layer is applied to any layer as long as it is an organic compound layer forming the photoreceptor, but it is preferably formed as the outermost surface (protective layer) from the viewpoints of electrical properties and abrasion resistance.

According to such an embodiment, the outermost layer combining electrical properties and film strength is formed, in particular, the thickening of a film to about 10 µm or more is realized and deterioration of image quality from repeated use is suppressed. The life span of a photoreceptor is determined at the time when the surface layer having high strength becomes worn, and therefore thickening the film is very effective to prolong life.

Further, when a photoreceptor is charged by discharge, deterioration of surface materials is caused by electrical stress and stress due to discharge gas such as ozone, and as a result, ionic materials such as ammonium nitrate called discharge products is easily adsorbed. Therefore, in particular, water is adsorbed under high humidity, surface resistance is reduced, latent image bleeding occurs, and as a result, degradation of print image occurs easily. To suppress this, it may be required that the surface layer is suitably worn to suppress latent image bleeding. The charging method, the cleaning method, and the toner type have a great influence on amount of wear and the influence is greatly affected by the system, and therefore it may be required that the strength of the surface layer of a photoreceptor is adjusted. By selecting the ratio of the cross-linked component or the structure of the reactive monomer, the optimal strength is adjusted in accordance with system. The reason why the outermost layer having electrical properties and strength is obtained is estimated as follows, but the invention is not limited by this speculation.

The electrophotographic photoreceptor of the exemplary embodiments of the invention has excellent electrical properties, for example, because the polymer (a) of the outermost layer has relatively few of the polar groups for preventing carrier transportation such as —OH and —NH—; or residual strain is suppressed in comparison to fixing by two or more bonds because the charge transportable component is fixed to the polymer or cross-linked structure by one bond. Further, there is obtained the electrophotographic photoreceptor where mutual compatibility is excellent because the electrophotographic photoreceptor has a structure similar to a multi-functional acryl monomer, and a multi-functional acryl monomer is cross-linked such that phase separation of the included multi-functional acryl monomer is suppressed to further improve strength, and the photoreceptor has an outermost layer combining electrical properties and strength.

On the other hand, other general examples of the photoelectric conversion device of the exemplary embodiments of the invention include organic electroluminescent devices (simply referred to as "organic EL devices") and solar cells.

For example, as a charge transporting layer forming organic EL device, an organic compound layer is formed by using the charge transportable polymer (a) including a partial structure represented by the formulae (1) and (2) respectively, and thereby crystallization is suppressed and a thin even film is easily obtained in comparison with deposition or coating of a low molecular compound. Further, for the above reason, a film is obtained, which has excellent electrical properties and preferably further high heat resistance by being cross-linked, and stable performance is obtained over a long period.

The same effect is obtained when the charge transportable polymer (a) including a partial structure represented by the formulae (1) and (2) respectively is used in solar cells.

Further, the cross-linkable monomer is used as the multi-functional charge transportable monomer, and thereby the strength is provided without reducing the density of the charge transportable components.

[Electrophotographic Photoreceptor]

The electrophotographic photoreceptor of the exemplary embodiments of the invention has an organic compound layer containing polymer (a) including a partial structure represented by the formulae (1) and (2) respectively as the outermost layer. The organic compound layer may be applied to a layer other than the outermost layer of electrophotographic photoreceptor, but it preferably forms the outermost layer, and the organic compound layer is provided as a layer serving as a protective layer or a charge transporting layer.

Further, when the outermost layer is a layer serving as a protective layer, the photoelectric conversion device has a photosensitive layer formed of a charge transporting layer and a charge generating layer or a single photosensitive layer under the protective layer.

When the outermost layer serves as a protective layer, the layer has a photosensitive layer and a protective layer as the outermost layer on the conductive substrate, the protective layer includes a layer of composition containing polymer (a) including a partial structure represented by the formulae (1) and (2) respectively, or a curing material cross-linking the polymer (a).

On the other hand, when the outermost layer is a layer serving as the charge transporting layer, the layer includes an embodiment forming, on the conductive substrate, a charge generating layer and a layer containing a composition containing polymer (a) including a partial structure represented by the formulae (1) and (2) respectively or curing materials thereof as the outermost layer.

When the organic compound layer of the exemplary embodiments of the invention is used in an organic EL device or solar cell, any of a single or multilayer may be used for any functional layer.

The photoelectric conversion device of the exemplary embodiments of the invention will be described below in detail, with reference to the drawings of the electrophotographic photoreceptor where the outermost layer serves as the protective layer. Further, in the drawings, the same or corresponding components are denoted by the same reference numerals and the repeated description is omitted.

Figure 2:
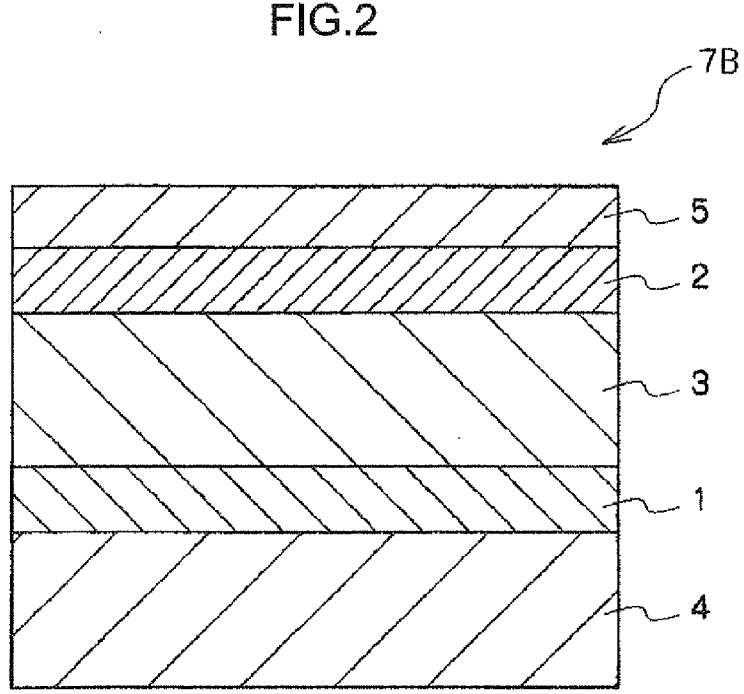
FIG. 2 is a schematic cross-sectional diagram partially illustrating another example of an electrophotographic photoreceptor according to an exemplary embodiment of the invention.
Figure 3:
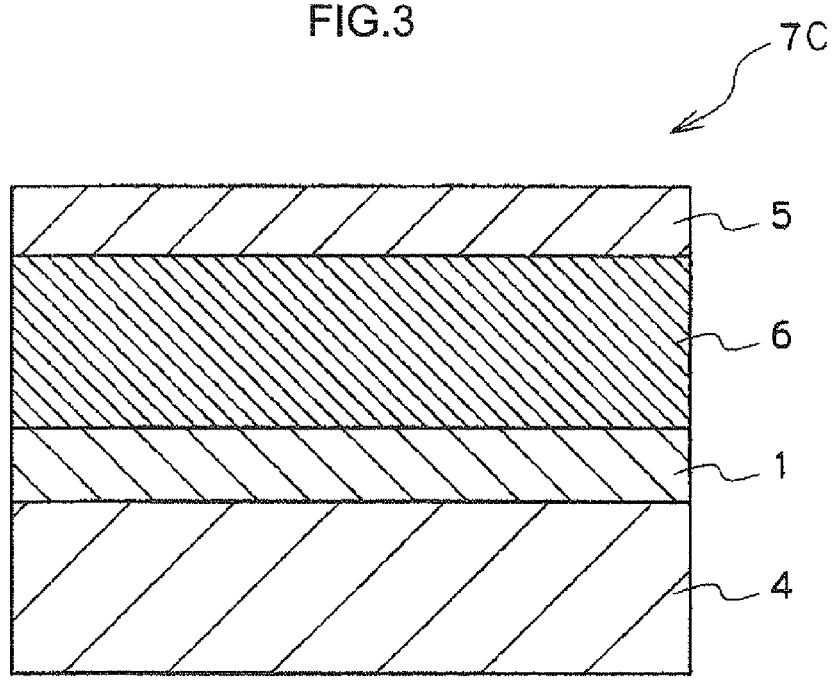
FIG. 3 is a schematic cross-sectional diagram partially illustrating another example of an electrophotographic photoreceptor according to an exemplary embodiment of the invention.

FIG. 1 is a schematic cross-sectional diagram illustrating one example of a layer configuration of the electrophotographic photoreceptor of the exemplary embodiments of the invention, and FIGS. 2 and 3 are schematic cross-sectional diagram illustrating other examples of layer configurations of the electrophotographic photoreceptor of the exemplary embodiments of the invention. An electrophotographic photoreceptor 7A illustrated in FIG. 1 is the so-called function-separated photoreceptor (or multilayered photoreceptor), and has a configuration in which an undercoating layer 1 is formed on an electroconductive substrate 4, and the following are successively formed thereon: a charge generating layer 2, a charge transporting layer 3, and a protective layer 5. In the electrophotographic photoreceptor 7A, the charge generating layer 2 and the charge transporting layer 3 constitute a photosensitive layer.

The electrophotographic photoreceptor 7B shown in FIG. 2 is a function-separated photoreceptor which is functionally separated into a charge generating layer 2 and a charge transporting layer 3 in a similar manner to the electrophotographic photoreceptor 7A shown in FIG. 1. The electrophotographic photoreceptor 7B shown in FIG. 2 has a configuration in which an undercoating layer 1 is formed on a conductive substrate 4, and the following are successively formed thereon: the charge generating layer 2, the charge transporting layer 3 and the protective layer 5. In the electrophotographic photoreceptor 7B, the charge transporting layer 3 and the charge generating layer 2 constitute a photosensitive layer.

The electrophotographic photoreceptor 7C shown in FIG. 3 contains a charge generating material and a charge transporting material in the same layer (single photosensitive layer 6). In the electrophotographic photoreceptor 7C shown in FIG. 3, an undercoating layer 1 is formed on a conductive substrate 4 and a single photosensitive layer 6 and a protective layer 5 are successively formed thereon.

In the electrophotographic photoreceptors 7A, 7B, and 7C shown in FIGS. 1, 2, and 3, the outermost layer which is most distant from the conductive substrate 2 is a protective layer 5, and this outermost layer has the configuration described above. In the electrophotographic photoreceptors 7A, 7B, and 7C shown in FIGS. 1, 2 and 3, the undercoating layer 1 may or may not be formed.

Respective components will be described below based on the electrophotographic photoreceptors 7A shown in FIG. 1 as a representative Example.

<Protective Layer>

First, the protective layer 5 which is the outermost layer in the electrophotographic photoreceptors 7A will be described.

The protective layer 5 is the outermost layer in the electrophotographic photoreceptors 7A and preferably contains polymer (a) including a partial structure represented by the formulae (1) and (2) respectively, and curing is further preferable.

The polymer (a) including a partial structure represented by the formulae (1) and (2) respectively will be described.

The CT portion of formula (1) may be any organic group so long as the CT portion is an organic layer having a charge transportable skeleton. Examples thereof include those having a triaryl amine skeleton, a benzidine skeleton, an aryl alkane skeleton, an aryl-substituted ethylene skeleton, a stilbene skeleton, an anthracene skeleton, a hydrazone skeleton. Among them, those having a triaryl amine skeleton, a benzidine skeleton, or a stilbene skeleton is more preferable.

Specific examples of the partial structure represented by formula (1) include structures represented by the following (1)-1 to (1)-33, but the structures are not limited thereto.

| $R^1$ | $(X)a$ | CT |
|---|---|---|
| (1)-1　　H | — | 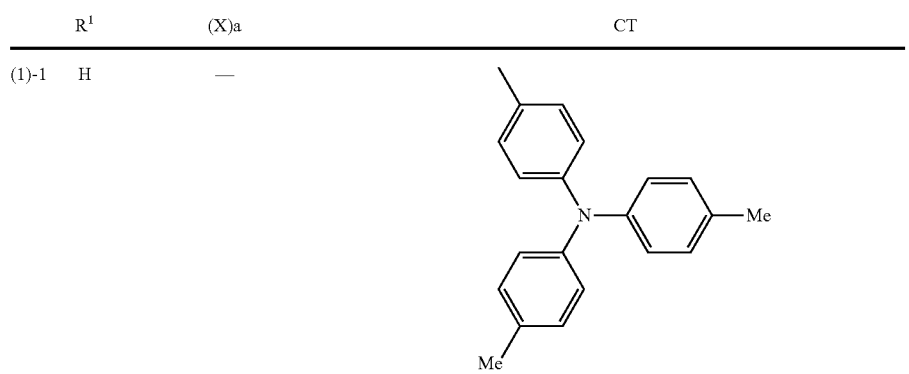 |

-continued

| | R¹ | (X)a | CT |
|---|---|---|---|
| (1)-2 | H | — | *N,N-bis(3,4-dimethylphenyl)-N-(4-methylphenyl)amine type structure* |
| (1)-3 | H | — | *N-(3,4-dimethylphenyl)-N-(4-methylphenyl)-N-(biphenyl-4-yl)amine* |
| (1)-4 | H | — | *N-(3,4-dimethylphenyl)-N-(4-methylphenyl)-N-(4'-methylbiphenyl-4-yl)amine* |
| (1)-5 | H | — | *N,N-bis(3,4-dimethylphenyl)-N-(4'-methylbiphenyl-4-yl)amine* |
| (1)-6 | H | — | *N-(3,4-dimethylphenyl)-N-(4-methylphenyl)-N-[4-(2,2-diphenylvinyl)phenyl]amine* |

-continued
| | R¹ | (X)a | CT |
|---|---|---|---|
| (1)-7 | H | — | 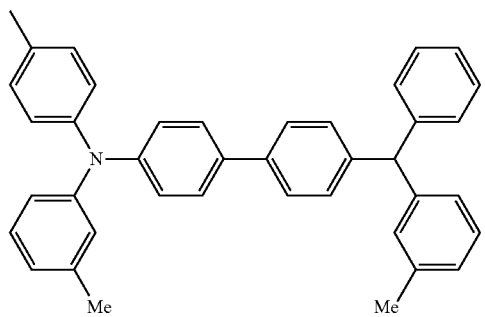 |
| (1)-8 | H | — | 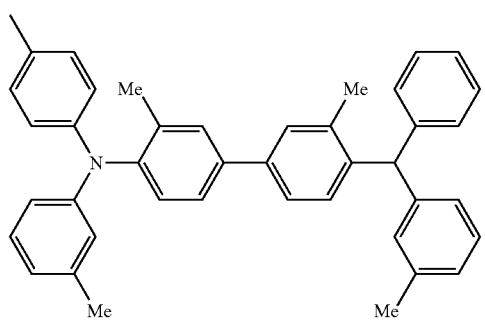 |
| (1)-9 | H | — | 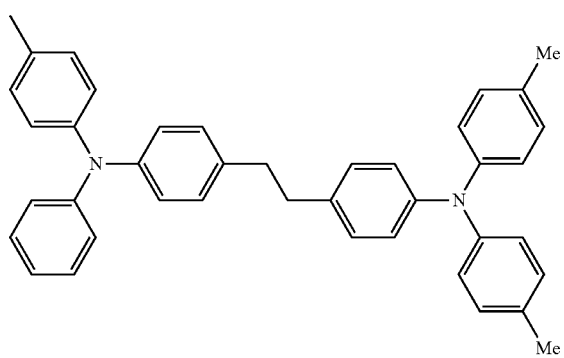 |
| (1)-10 | H | — | 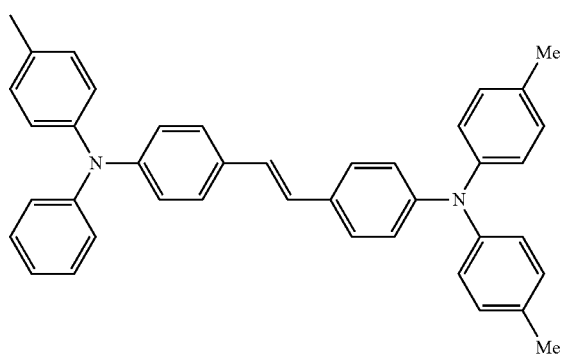 |

-continued

| | R¹ | (X)a | CT |
|---|---|---|---|
| (1)-11 | H | — | |
| (1)-12 | H | (acetate-O-(CT)) | |
| (1)-13 | H | (acetate-O-propyl-(CT)) | |
| (1)-14 | H | (acetate-O-propyl-(CT)) | |
| (1)-15 | H | (acetate-O-propyl-(CT)) | |

-continued
| | R¹ | (X)a | CT |
|---|---|---|---|
| (1)-16 | H | | |
| (1)-17 | H | | |
| (1)-18 | H | | |
| (1)-19 | H | | |
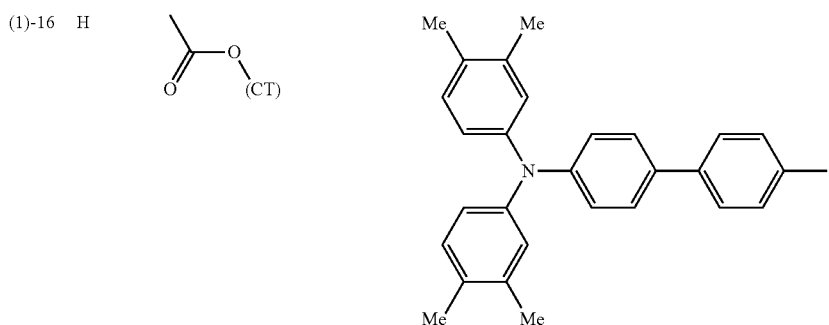
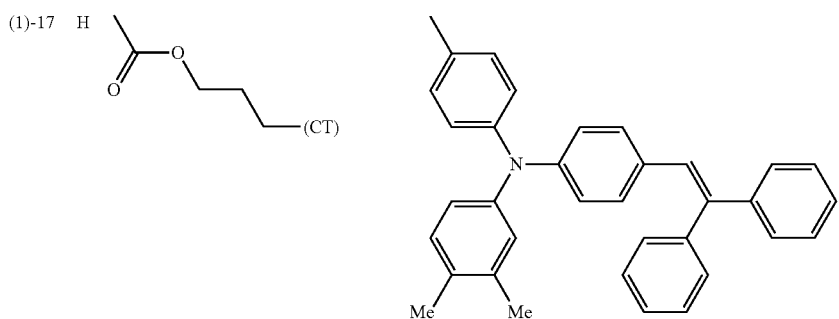
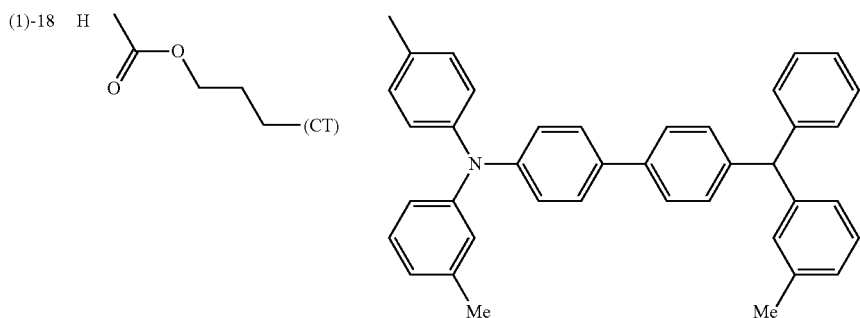
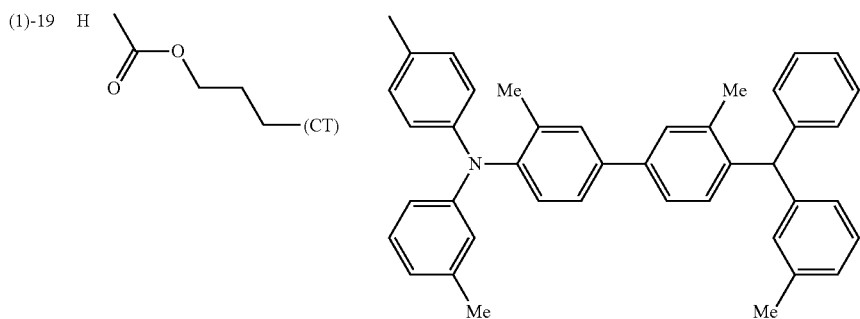

-continued
| | R[1] | (X)a | CT |
|---|---|---|---|
| (1)-20 | H | 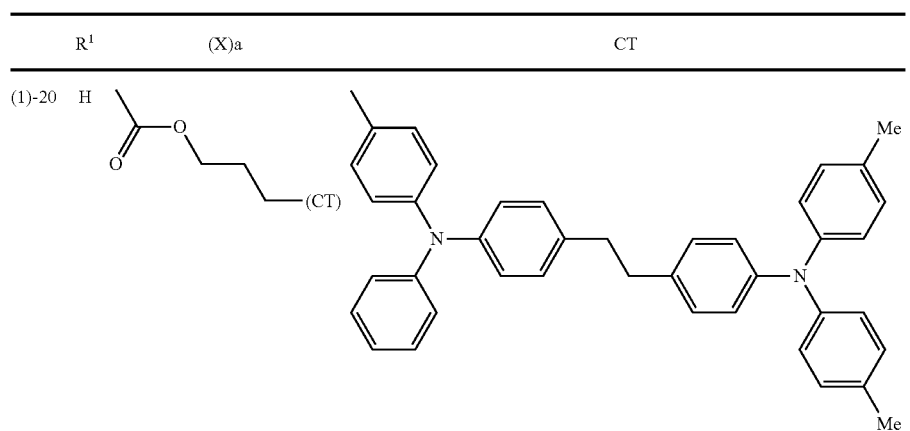 | |
| (1)-21 | H | 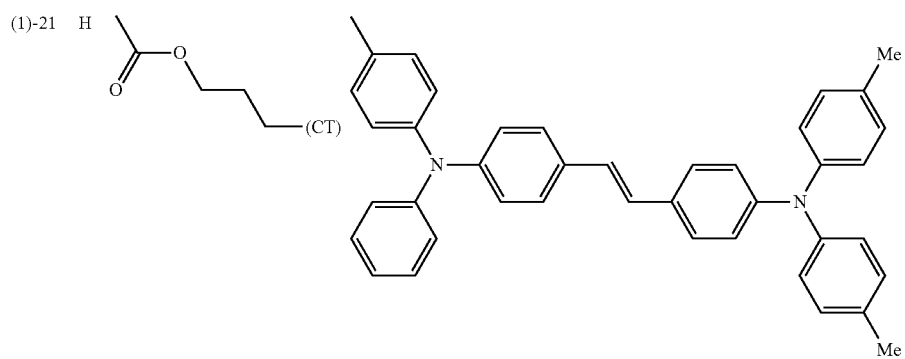 | |
| (1)-22 | H | 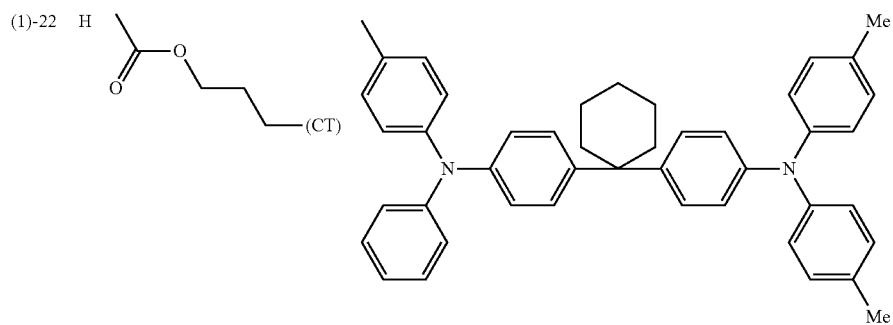 | |
| (1)-23 | Me | 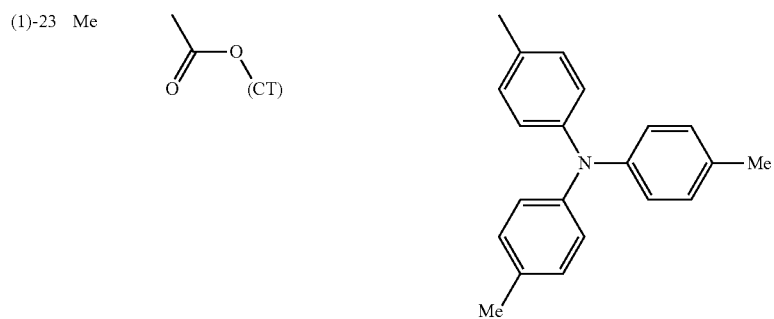 | |

-continued

| R¹ | (X)a | CT |
|---|---|---|
| (1)-24 Me | | |
| (1)-25 Me | | |
| (1)-26 Me | | |
| (1)-27 Me | | |
| (1)-28 Me | | |

-continued
| R¹ | (X)a | CT |
|---|---|---|
(1)-29  Me
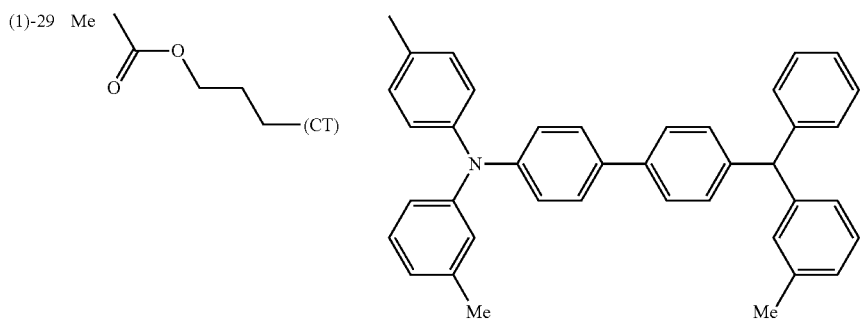
(1)-30  Me
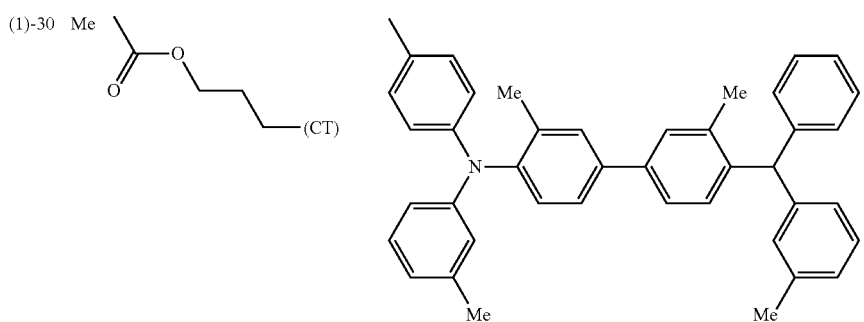
(1)-31  Me
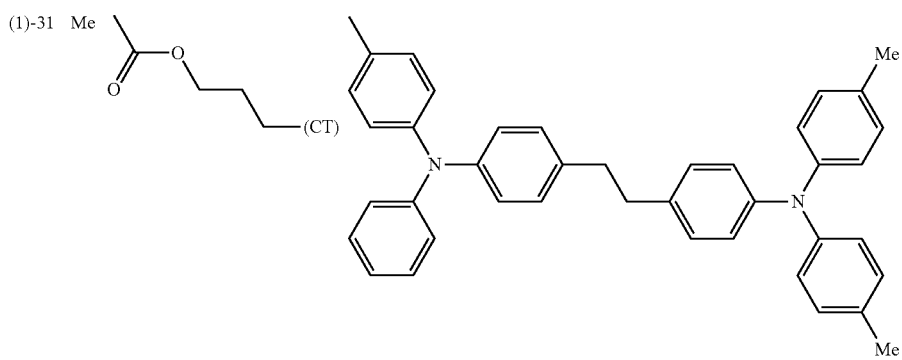
(1)-32  Me
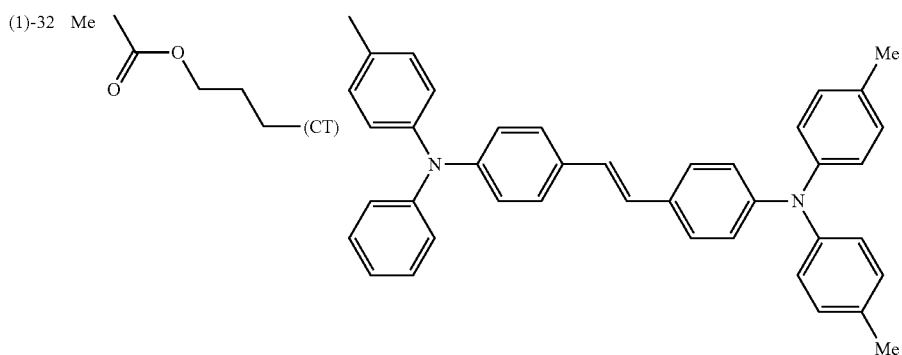

-continued

| | R¹ | (X)a | CT |
|---|---|---|---|
| (1)-33 | Me | | 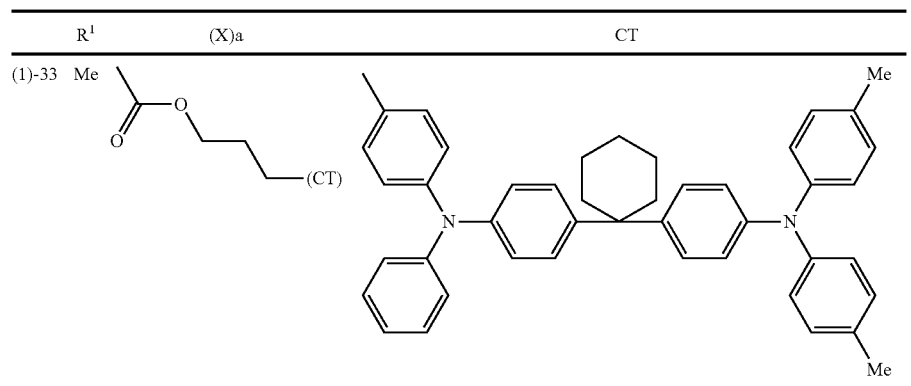 |

On the other hand, specific examples of the partial structures represented by formula (2) include structures represented by the following (2)-1 to (2)-8. Further, Me represents a methyl group and Bu represents a butyl group.

| | R² | Y | R³ |
|---|---|---|---|
| (2)-1 | H | CH₂ | H |
| (2)-2 | H | ~~~O-C(=O)CH₃ (propyl acetate linker) | H |
| (2)-3 | H | -CH₂-C₆H₄-CH₃ (p-tolyl methylene) | H |
| (2)-4 | H | CH₂ | Me |
| (2)-5 | H | ~~~O-C(=O)CH₃ | Me |
| (2)-6 | H | -CH₂-C₆H₄-CH₃ | Bu |
| (2)-7 | H | ~~~O-C(=O)CH₃ | Bu |
| (2)-8 | H | -C₆H₄-O-CH₂CH₂-O-C(=O)CH₃ | Me |

The layer formed of only partial structures represented by formulae (1) and (2) preferably has partial structures represented by the following formulae (1') and (2').

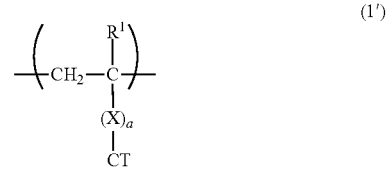

(1')

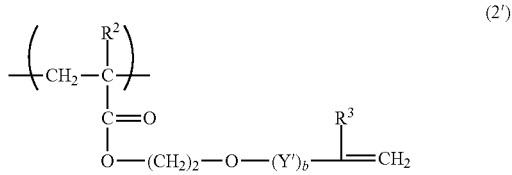

(2')

In the formula, $R^1$, $R^2$ and $R^3$ each independently represent a hydrogen atom or an alkyl group having from 1 to 4 carbon atoms, X and Y' represents a divalent organic group having from 1 to 20 carbon atoms, a and b each independently represent 0 or 1, and CT represents an organic group having a charge transportable skeleton. X and Y' preferably may contain, —C(=O)—, —O—C(=O)— and/or an aromatic ring. It is more preferable that X and Y' do not have a hydroxyl group.

Among them, a layer represented by the following formula (3) has excellent solubility and film formability, and thus it is preferable.

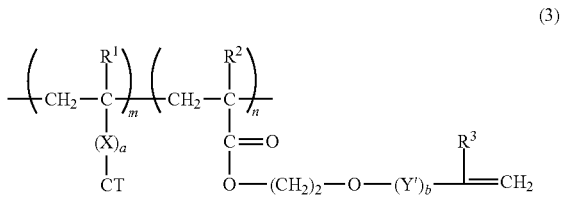

(3)

In the formula, $R^1$, $R^2$, $R^3$ each independently represent a hydrogen atom or an alkyl group having from 1 to 4 carbon atoms, X represents a divalent organic group having from 1 to 20 carbon atoms, Y' represents a divalent organic group having from 1 to 10 carbon atoms, a and b each independently represent 0 or 1, and CT represents an organic group having a charge transportable skeleton. m and n each independently represent an integer of 5 or more and is in the range of $10 < m+n < 2000$, and $0.2 < m/(m+n) < 0.95$. From the viewpoints of strength, flexibility, and electrical properties, $15<m+n<2000$, and $0.3<m/(m+n)<0.95$ is preferable, and $20<m+n<2000$ and $0.4<m/(m+n)<0.95$ is more preferable. Further, X and Y' may contain at least any one of —C(=O)—, —O—C(=O)— and an aromatic ring. It is more preferable that X and Y' do not have a hydroxyl group.

Further, in addition to the layer represented by formulae (1) and (2), a mono-functional monomer may be copolymerized in order to provide solubility and flexibility.

Examples of the mono-functional monomer include acrylates or methacrylates such as isobutyl acrylate, t-butyl acrylate, isooctyl acrylate, lauryl acrylate, stearyl acrylate, isobornyl acrylate, cyclohexyl acrylate, 2-methoxyethyl acrylate, methoxytriethylene glycol acrylate, 2-ethoxyethyl acrylate, tetrahydrofurfuryl acrylate, benzyl acrylate, ethyl carbitol acrylate, phenoxyethyl acrylate, 2-hydroxyacrylate, 2-hydroxypropyl acrylate, 4-hydroxybutyl acrylate, methoxypolyethylene glycol acrylate, methoxypolyethylene glycol methacrylate, phenoxypolyethylene glycol acrylate, phenoxypolyethylene glycol methacrylate, hydroxyethyl o-phenylphenol acrylate, or o-phenylphenol glycidyl ether acrylate; or styrene derivatives such as styrene, α-methyl styrene, or 4-methyl styrene.

The amount of (1) used when these monomers are copolymerized is preferably $1/m<0.3$ and more preferably $1/m<0.2$, with respect to m in the formula (3), from the viewpoints of providing solubility and flexibility.

The organic compound layer preferably contains a multi-functional monomer which is reacted with the polymer (a). It is more preferable that the multi-functional monomer is a charge transportable compound (α) having two or more of the acryloyl group or the methacryloyl group or derivatives thereof in the same molecule.

(Reactive Charge Transportable Compound (α))

The reactive charge transportable compound (α) used in the protective layer (outermost layer) 5 is a compound having a charge transportable skeleton and two or more acryloyl groups or methacryloyl groups or derivatives thereof in the same molecule, and any compounds may be used so long as the compound satisfies structural conditions.

The charge transportable skeleton in the reactive charge transportable compound (α) is a skeleton derived from nitrogen-containing hole transportable compound such as a triaryl amine-based compound, a benzidine-based compound, or a hydrazone-based compound.

The reactive charge transportable compound (α) includes those where two or more acryloyl groups or methacryloyl groups, or derivatives thereof are introduced to the charge-transportable skeleton described above.

In particular, the reactive charge transportable compound (α) is preferably a compound which has a methacryloyl group. The reason is not clear, but is thought to be as described below.

An acryl group having high reactivity is generally used in curing reactions in some cases, but, it is thought that, when an acryl group having high reactivity as a substituent is used in a large charge transportable skeleton, a inhomogeneous curing reaction easily occurs and micro (or macro) sea-island structure is easily formed. The sea-island structure is rarely a problem in other than electronic fields, but when the structure is used as an electrophotographic photoreceptor, unevenness and/or wrinkles of the outermost layer is easily generated, and portions having different charge transportability occur. As a result, problems such as image unevenness occurs. It is thought, when such sea-island structures are formed by having plural functional groups in a charge transportable skeleton, such problems become particularly pronounced.

It is thought that, since formation of the above-described sea-island structure is suppressed by using the reactive charge transportable compound (α) having a methacryloyl group, the electrophotographic photoreceptor, which has the outermost layer formed of a curing film of the composition containing the reactive charge transportable compound (α) of this preferable embodiment, has more stable electric and image properties.

In the reactive charge transportable compound (α), a structure where one or more carbon atoms are interposed between a charge transportable skeleton and an acryloyl group or a methacryloyl group, or derivatives thereof, is preferable. In other words, in the reactive charge transportable compound (α), a structure having one or more carbon atoms as a connecting group between a charge transportable skeleton and an acryloyl group or a methacryloyl group, or derivatives thereof, is preferable. In particular, it is preferable that such a connecting group is alkylene.

The reason why this embodiment is preferable is not completely clear, but it is thought to be as follows.

When an electron-withdrawing methacryloyl group is too close to a charge transportable skeleton, the charge density of the charge transportable skeleton is reduced, and the ionized potential is increased so that it is difficult for the carrier to be smoothly infused from a lower layer. Further, it is thought that in a structure where a radical polymerizable substituent such as a methacryloyl group is polymerized, when a radical generated during polymerization is easily moved to a charge transportable skeleton, a generated radical causes the charge transportation performance to deteriorate, and, therefore, deterioration of electrical properties occurs. Further, it is thought that with respect to the mechanical strength of the outermost layer, a large charge transportable skeleton and polymerization portion (an acryloyl group or a methacryloyl group, or derivatives thereof) are closely packed and rigid, polymerization portions are not easily moved and there is a risk of the probability of the reaction occurring being reduced.

In view of the above, a structure in which carbon chains having high flexibility are interposed between a charge transportable skeleton and an acryloyl group or a methacryloyl group or derivatives thereof is preferable.

Further, an embodiment is preferable in which the reactive charge transportable compound (α) is a compound of a structure having triphenyl amine skeletons, and three or more, or more preferably four or more methacryloyl groups in the same molecule. In this embodiment, there are excellent advantages in that stability of the compound is obtained during synthesis and is produced on an industrial scale. Further, in this embodiment, the outermost layer having high cross-linked density and sufficient mechanical strength is formed. Therefore a multifunctional monomer having no charge transportability does not need to be added, electrical properties are not reduced by the addition of a multifunctional monomer, and a film-thickening of the outermost layer is attained. As a result, the electrophotographic photoreceptor having this outermost layer has extended life and can withstand use over a long period.

Further, since the reactive charge transportable compound (α) has a charge transportable skeleton, mutual compatibility to conventional charge transportable material having no reactive groups is excellent, and therefore the conventional charge transportable material having no reactive groups may be added, and electrical properties are further improved.

As a curing method, radical polymerization by heat, light or radiation rays, or the like is applied. When the reaction progresses too quickly, unevenness or wrinkles of the film easily occurs, and therefore it is preferable that polymerization occurs under conditions where radicals are generated relatively slowly. From that point, thermal polymerization where polymerization rate is easily adjusted is preferable.

Further, the charge transportable compound (α) having a methacryloyl group having low reactivity is used, and is subjected to thermal polymerization, so that structural relaxation by heat is promoted and a film having high homogeneity is obtained.

In the exemplary embodiments of the invention, reactive charge transportable compound (α) is a compound represented by the following formula (A), which is preferable from the viewpoint of excellent charge transportability,

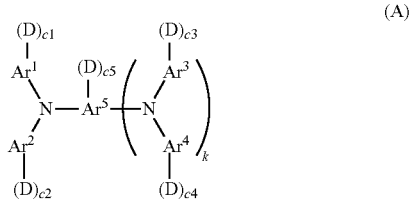
(A)

In the formula, $Ar^1$ to $Ar^4$ each independently represent a substituted or unsubstituted aryl group, $Ar^5$ represents a substituted or unsubstituted aryl group or a substituted or unsubstituted arylene group, D represents a group having an aryloyl group or methacryloyl group, or derivatives thereof, at a terminal, c1 to c5 each independently represent 0, 1 or 2, k represents 0 or 1, and the total number of D is 1 or more, preferably from 2 to 6.

In formula (A), $Ar^1$, $Ar^2$, $Ar^3$ and $Ar^4$ each independently represent a substituted or unsubstituted aryl group. $Ar^1$, $Ar^2$, $Ar^3$ and $Ar^4$ may be the same or different from each other.

Examples of a substituent of the substituted aryl group include, other than D (a group having acryloyl group or methacryloyl group, or derivatives thereof, at a terminal), an alkyl group or an alkoxy group having from 1 to 4 carbon atoms, and a substituted or unsubstituted aryl group having from 6 to 10 carbon atoms.

$Ar^1$, $Ar^2$, $Ar^3$ and $Ar^4$ are preferably any one of the following formulae (1) to (7). Further, in the following formulae (1) to (7), "-$(D)_{C1}$," to "-$(D)_{C4}$" connected to each of $Ar^1$, $Ar^2$, $Ar^3$ and $Ar^4$ are generally represented by "-$(D)_C$".

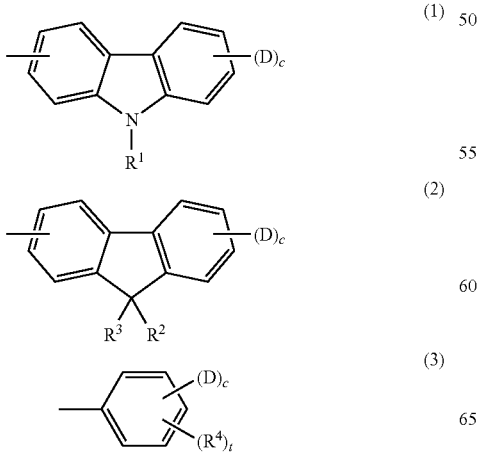
(1)
(2)
(3)

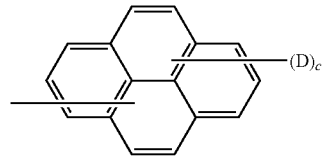
(4)

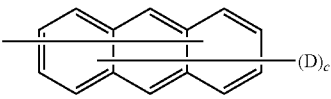
(5)

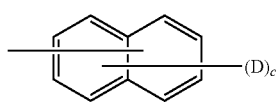
(6)

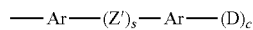
(7)

In formulae (1) to (7), $R^1$ represents one type selected from a group consisting of a hydrogen atom, an alkyl group having from 1 to 4 carbon atoms, a phenyl group substituted or unsubstituted with an alkyl group having from 1 to 4 carbon atoms or an alkoxy group having from 1 to 4 carbon atoms, and an aralkyl group having from 7 to 10 carbon atoms. $R^2$, $R^3$ and $R^4$ each respectively represents one type selected from a group consisting of a hydrogen atom, an alkyl group having from 1 to 4 carbon atoms, an alkoxy group having from 1 to 4 carbon atoms, a phenyl group substituted or unsubstituted with an alkoxy group having from 1 to 4 carbon atoms, an aralkyl group having from 7 to 10 carbon atoms, and a halogen atom, Ar represents a substituted or unsubstituted arylene group, D represents a group having an acryloyl group or methacryloyl group or derivatives thereof, at a terminal, c represents 0, 1 or 2, s represents 0 or 1, t represents an integer of between 0 and 3, and Z' represents a divalent organic connecting group.

Ar of formula (7) is preferably represented by the following formulae (8) or (9).

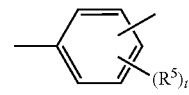
(8)

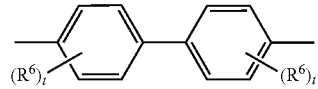
(9)

$R^5$ and $R^6$ of the formulae (8) and (9) each independently represent one type selected from a group consisting of a hydrogen atom, an alkyl group having from 1 to 4 carbon atoms, an alkoxy group having from 1 to 4 carbon atom, a phenyl group substituted or unsubstituted with an alkoxy group having from 1 to 4 carbon atoms, an aralkyl group having from 7 to 10 carbon atoms and a halogen atom, t represents an integer of between 0 and 3.

Further, Z' of the formula (7) is preferably represented by any one of the formulae (10) to (17). Further, s represents 0 or 1.

—(CH$_2$)$_q$— (10)

—(CH$_2$CH$_2$O)$_r$— (11)

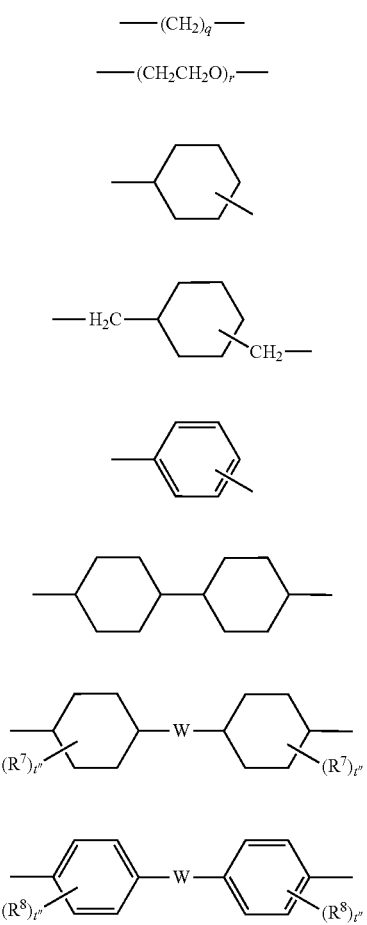

(12)

(13)

(14)

(15)

(16)

(17)

R$^7$ and R$^8$ of the formulae (10) to (17) each independently represent one type selected from a group consisting of a hydrogen atom, an alkyl group having from 1 to 4 carbon atoms, an alkoxy group having from 1 to 4 carbon atoms, or a phenyl group substituted or unsubstituted with an alkoxy group having from 1 to 4 carbon atoms, an aralkyl group having from 7 to 10 carbon atoms and a halogen atom. W represents a divalent group, q and r each independently represent an integer of from 1 to 10, t" represents an integer of between 0 and 3.

W of formulae (16) and (17) is preferably any of the divalent groups represented by the following (18) to (26). However, u of formula (25) represents an integer of between 0 and 3.

—CH$_2$— (18)

—C(CH$_3$)$_2$— (19)

—O— (20)

—S— (21)

—C(CF$_3$)$_2$— (22)

—Si(CH$_3$)$_2$— (23)

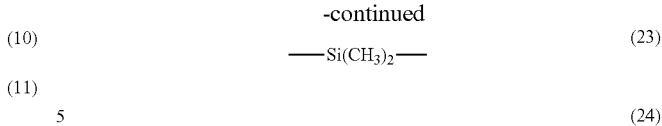

(24)

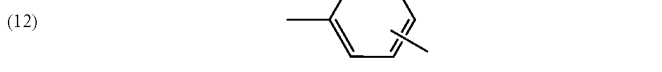

(25)

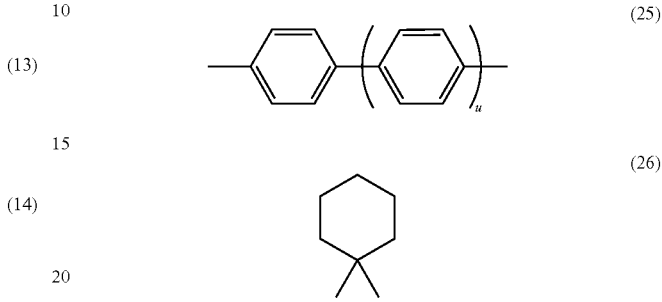

(26)

Further, Ar$^5$ of formula (A) is a substituted or unsubstituted aryl group when k is 0. Examples of the aryl group include the same ones as in the description of Ar$^1$ to Ar$^4$. Further, Ar$^5$ is a substituted or unsubstituted arylene group when k is 1. Examples of the arylene group include an arylene group excluding one hydrogen atom from an aryl group in the description of Ar$^1$ to Ar$^4$.

D of formula (A) represents an acryloyl group or a methacryloyl group at a terminal, or derivatives thereof. D represents a group connecting an acryloyl group or a methacryloyl group at a terminal, or derivatives thereof through one or more carbon atoms. More preferably, D represents a group connecting an acryloyl group or a methacryloyl group at a terminal, or derivatives thereof through an alkylene group. Even more preferably, D represents a group connecting a methacryloyl group of the end through an alkylene group.

Specifically, D of formula (A) is preferably -(CH$_2$)$_d$—(O—CH$_2$—CH$_2$)$_e$—O—CO—C(CH$_3$)=CH$_2$. d represents an integer of from 1 to 5, preferably an integer of from 1 to 4, and even more preferably an integer of 1 to 3. e represents 0 or 1.

c1 to c5 of formula (A) each independently represent 0, 1, or 2, and the total number of D is 1 or more. From the viewpoints of increasing the strength of the obtained curing film and suppressing the deterioration of image quality after repeated use, the total number of D is preferably 2 or more and more preferably 4 or more.

Specific examples of the reactive charge transportable compound (α) are represented by each number of a functional group of an acryloyl group or a methacryloyl group, or derivatives thereof. Further, the reactive charge transportable compound (α) is not limited thereto. In specific examples, Me represents a methyl group, Et represents an ethyl group, Pr represents a propyl group, and Bu represents a butyl group.

First, specific examples (compound A-1 to A-67) of compounds having two or more functional groups of an acryloyl group or a methacryloyl group, or derivatives thereof in the reactive charge transportable compound (α) are represented.

Further, specific examples of compounds having one functional group are a monomer represented by the following structure formula (1') having structure formula (1) and include structures of the (1)-1 to (1)-33

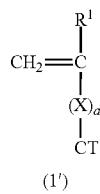
(1')
A-1
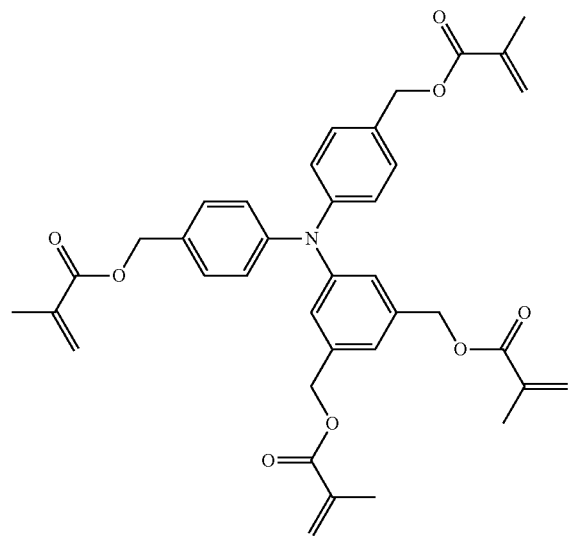 [SMILES: C=C(C)C(=O)OCc1ccc(N(c2ccc(COC(=O)C(=C)C)cc2)c2cc(COC(=O)C(=C)C)cc(COC(=O)C(=C)C)c2)cc1]
A-2
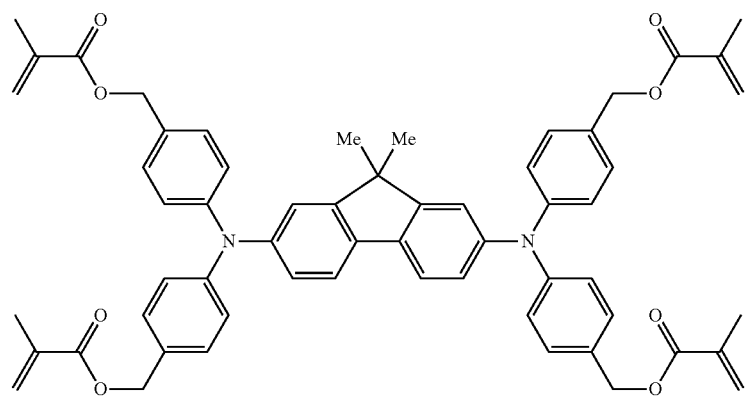 [SMILES: C=C(C)C(=O)OCc1ccc(N(c2ccc(COC(=O)C(=C)C)cc2)c2ccc3c(c2)C(C)(C)c2cc(N(c4ccc(COC(=O)C(=C)C)cc4)c4ccc(COC(=O)C(=C)C)cc4)ccc2-3)cc1]
A-3
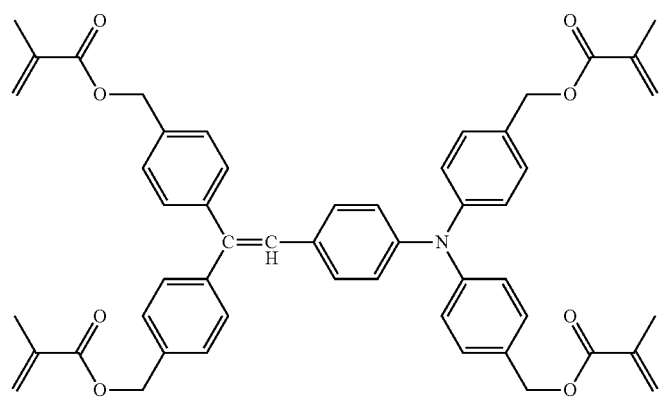 [SMILES: C=C(C)C(=O)OCc1ccc(C(=Cc2ccc(N(c3ccc(COC(=O)C(=C)C)cc3)c3ccc(COC(=O)C(=C)C)cc3)cc2)c2ccc(COC(=O)C(=C)C)cc2)cc1]

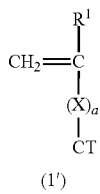
(1')
A-4
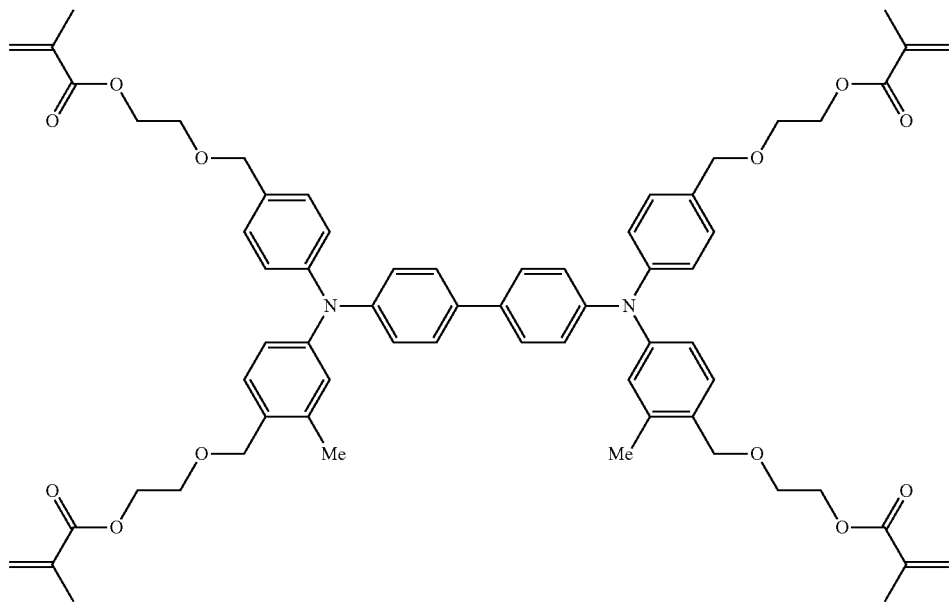 [SMILES: C=C(C)C(=O)OCCOCc1ccc(N(c2ccc(-c3ccc(N(c4ccc(COCCOC(=O)C(=C)C)cc4)c4ccc(COCCOC(=O)C(=C)C)c(C)c4)cc3)cc2)c2ccc(COCCOC(=O)C(=C)C)c(C)c2)cc1]
A-5
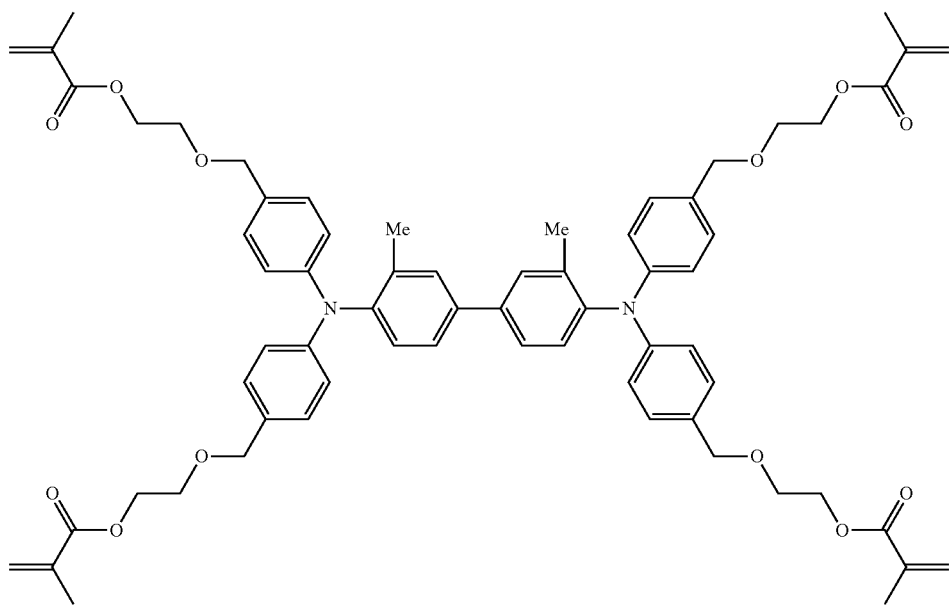 [SMILES: C=C(C)C(=O)OCCOCc1ccc(N(c2ccc(COCCOC(=O)C(=C)C)cc2)c2ccc(-c3ccc(N(c4ccc(COCCOC(=O)C(=C)C)cc4)c4ccc(COCCOC(=O)C(=C)C)cc4)c(C)c3)cc2C)cc1]

-continued
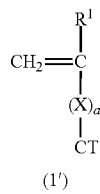
(1')
A-6
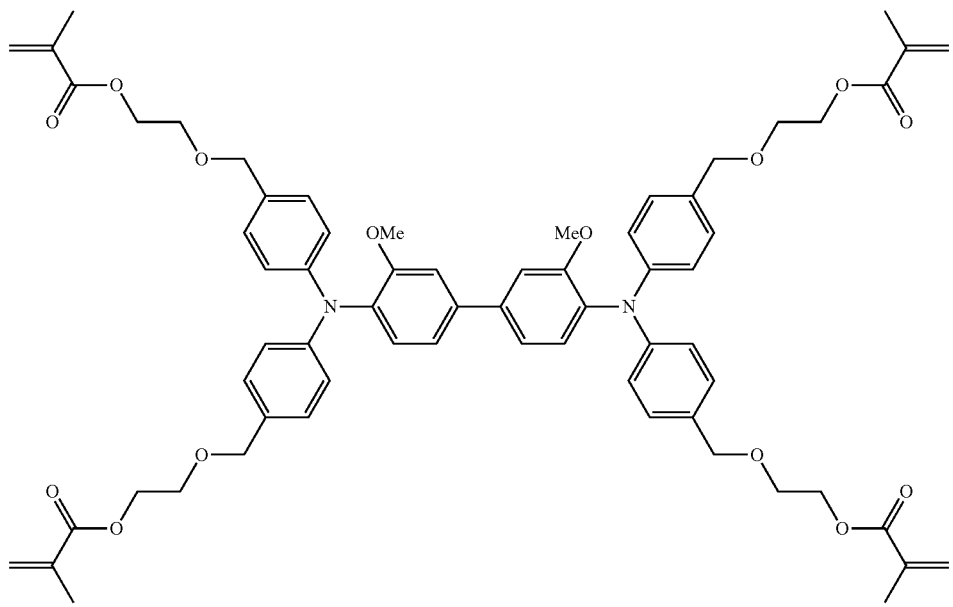 [SMILES: C=C(C)C(=O)OCCOCc1ccc(N(c2ccc(COCCOC(=O)C(=C)C)cc2)c2ccc(-c3ccc(N(c4ccc(COCCOC(=O)C(=C)C)cc4)c4ccc(COCCOC(=O)C(=C)C)cc4)c(OC)c3)cc2OC)cc1]
A-7
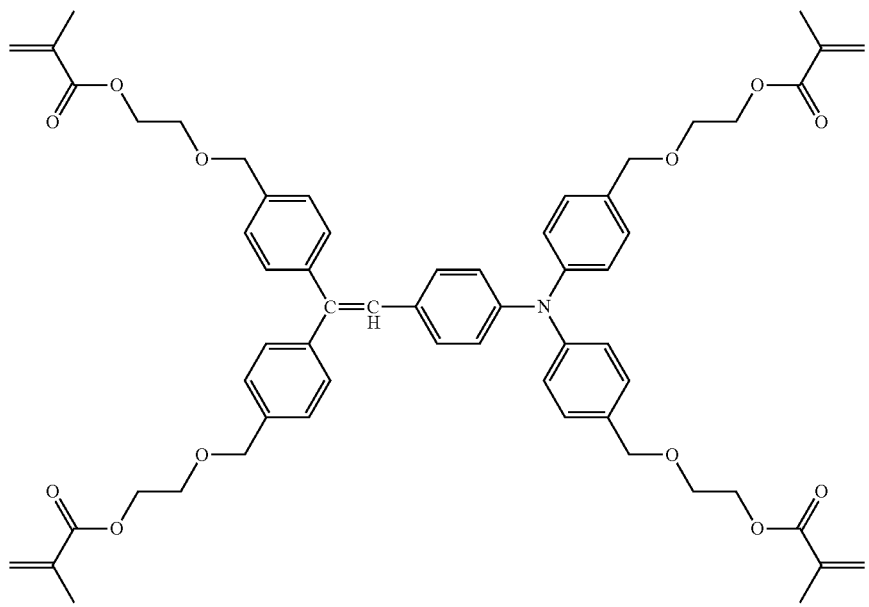 [SMILES: C=C(C)C(=O)OCCOCc1ccc(C(=Cc2ccc(N(c3ccc(COCCOC(=O)C(=C)C)cc3)c3ccc(COCCOC(=O)C(=C)C)cc3)cc2)c2ccc(COCCOC(=O)C(=C)C)cc2)cc1]

-continued
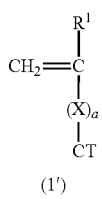
(1')
A-8
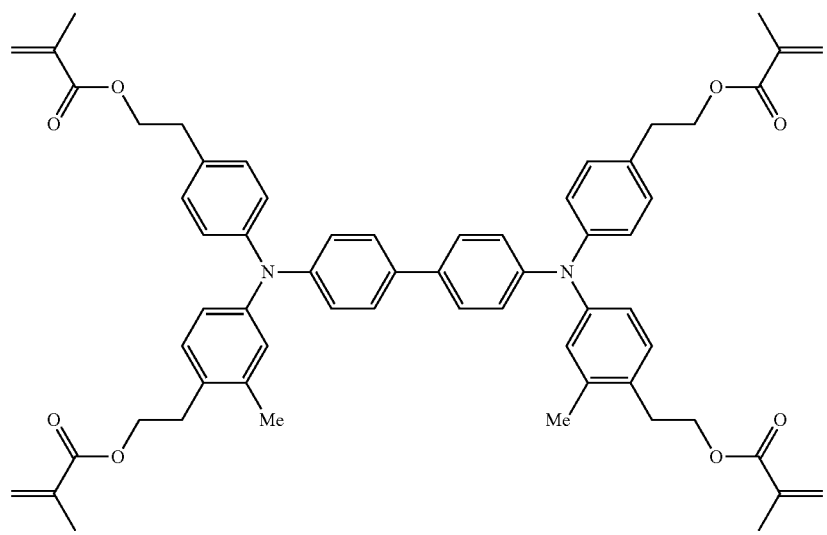 [SMILES: C=C(C)C(=O)OCCc1ccc(N(c2ccc(-c3ccc(N(c4ccc(CCOC(=O)C(=C)C)cc4)c4ccc(CCOC(=O)C(=C)C)c(C)c4)cc3)cc2)c2ccc(CCOC(=O)C(=C)C)c(C)c2)cc1]
A-9
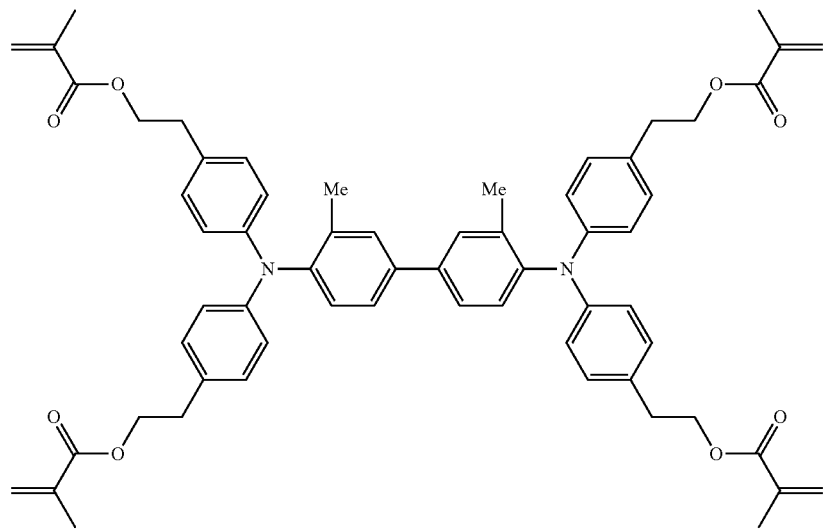 [SMILES: C=C(C)C(=O)OCCc1ccc(N(c2ccc(CCOC(=O)C(=C)C)cc2)c2ccc(-c3ccc(N(c4ccc(CCOC(=O)C(=C)C)cc4)c4ccc(CCOC(=O)C(=C)C)cc4)c(C)c3)cc2C)cc1]

-continued
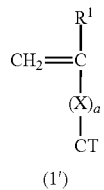
(1')
A-10
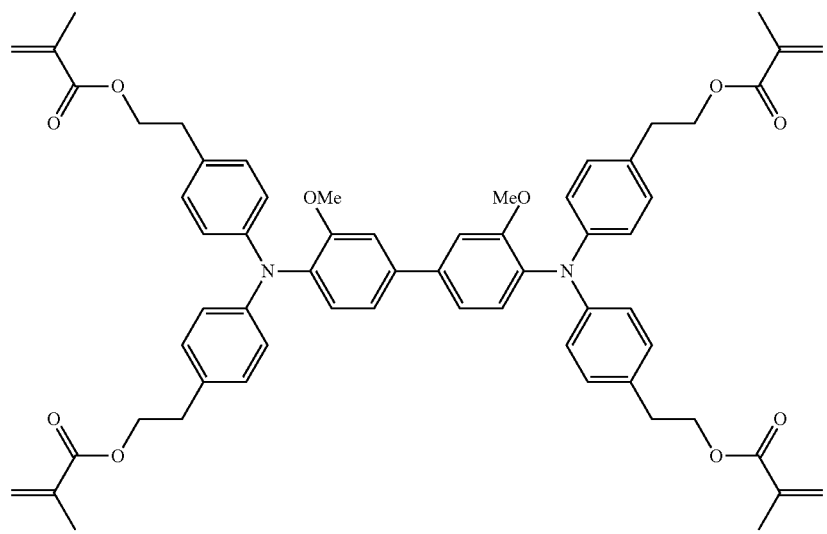 [SMILES: C=C(C)C(=O)OCCc1ccc(N(c2ccc(CCOC(=O)C(=C)C)cc2)c2ccc(-c3ccc(N(c4ccc(CCOC(=O)C(=C)C)cc4)c4ccc(CCOC(=O)C(=C)C)cc4)c(OC)c3)cc2OC)cc1]
A-11
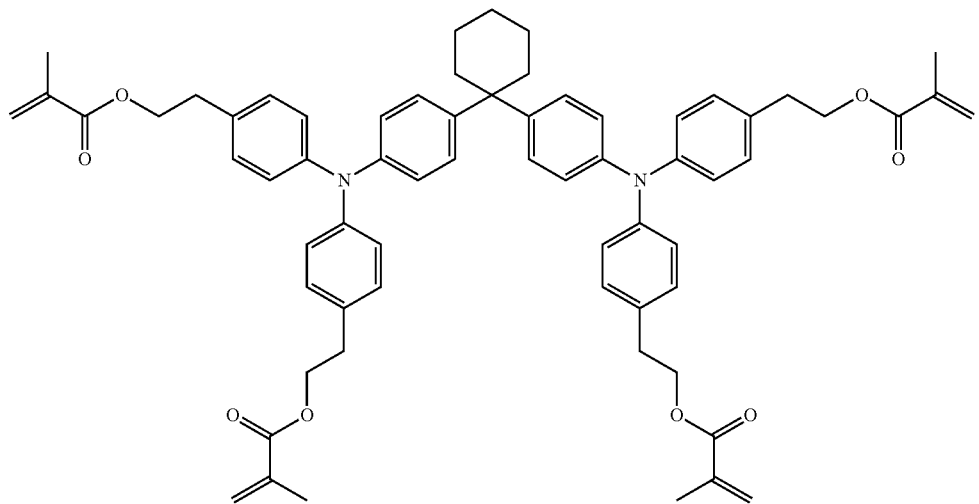 [SMILES: C=C(C)C(=O)OCCc1ccc(N(c2ccc(CCOC(=O)C(=C)C)cc2)c2ccc(C3(c4ccc(N(c5ccc(CCOC(=O)C(=C)C)cc5)c5ccc(CCOC(=O)C(=C)C)cc5)cc4)CCCCC3)cc2)cc1]

-continued
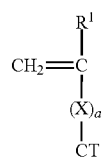
(1')
A-12
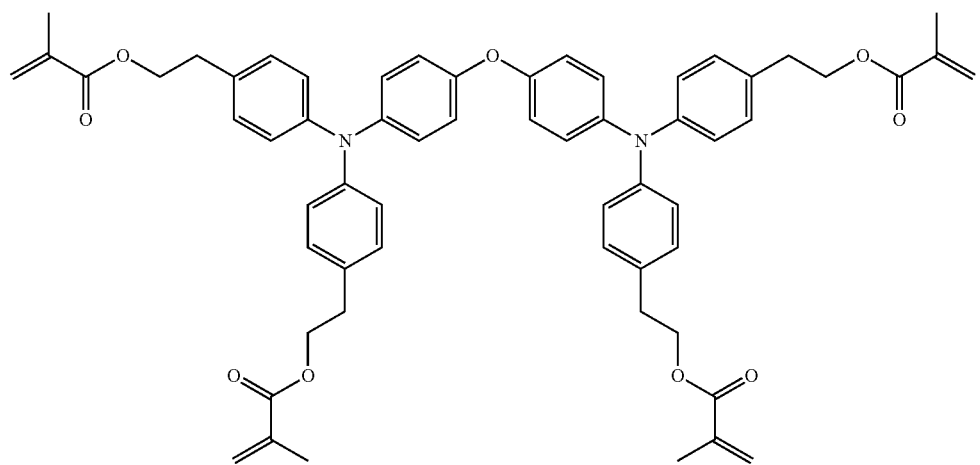 [SMILES: C=C(C)C(=O)OCCc1ccc(N(c2ccc(CCOC(=O)C(=C)C)cc2)c2ccc(Oc3ccc(N(c4ccc(CCOC(=O)C(=C)C)cc4)c4ccc(CCOC(=O)C(=C)C)cc4)cc3)cc2)cc1]
A-13
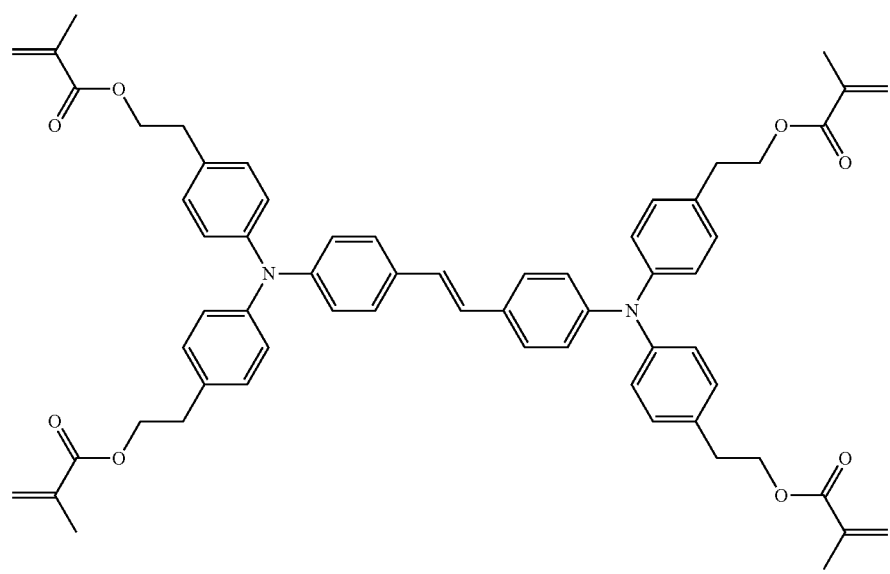 [SMILES: C=C(C)C(=O)OCCc1ccc(N(c2ccc(/C=C/c3ccc(N(c4ccc(CCOC(=O)C(=C)C)cc4)c4ccc(CCOC(=O)C(=C)C)cc4)cc3)cc2)c2ccc(CCOC(=O)C(=C)C)cc2)cc1]

-continued
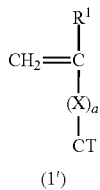
(1')
A-14
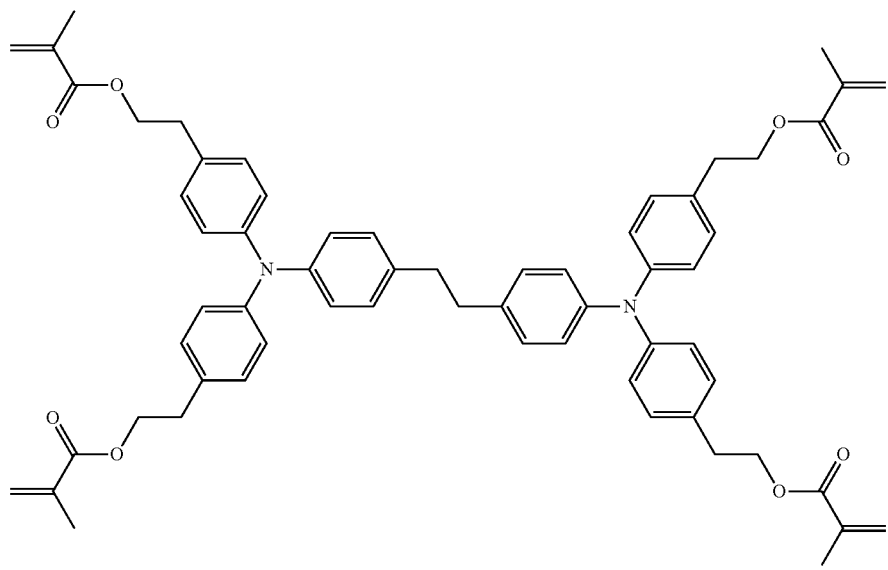 [SMILES: C=C(C)C(=O)OCCc1ccc(N(c2ccc(CCOC(=O)C(=C)C)cc2)c2ccc(CCc3ccc(N(c4ccc(CCOC(=O)C(=C)C)cc4)c4ccc(CCOC(=O)C(=C)C)cc4)cc3)cc2)cc1]
A-15
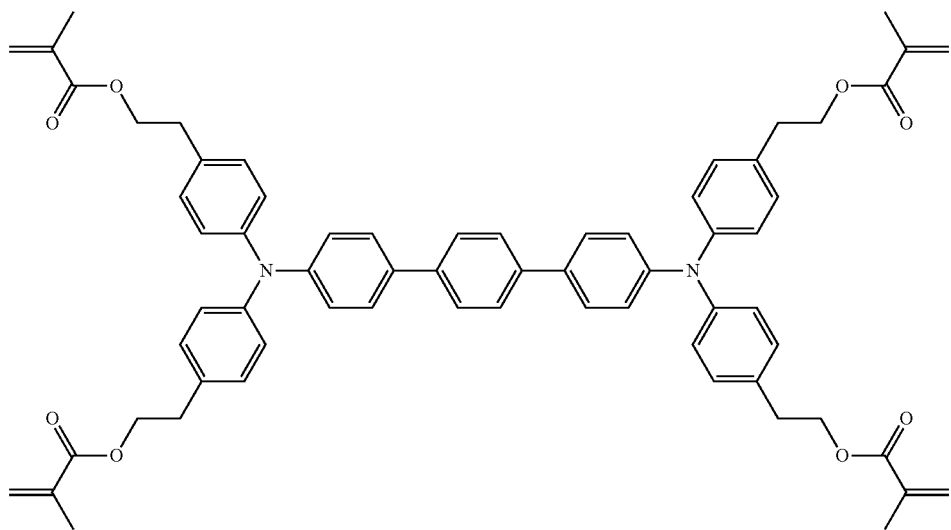 [SMILES: C=C(C)C(=O)OCCc1ccc(N(c2ccc(CCOC(=O)C(=C)C)cc2)c2ccc(-c3ccc(-c4ccc(N(c5ccc(CCOC(=O)C(=C)C)cc5)c5ccc(CCOC(=O)C(=C)C)cc5)cc4)cc3)cc2)cc1]

-continued
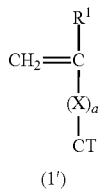
(1')
A-16
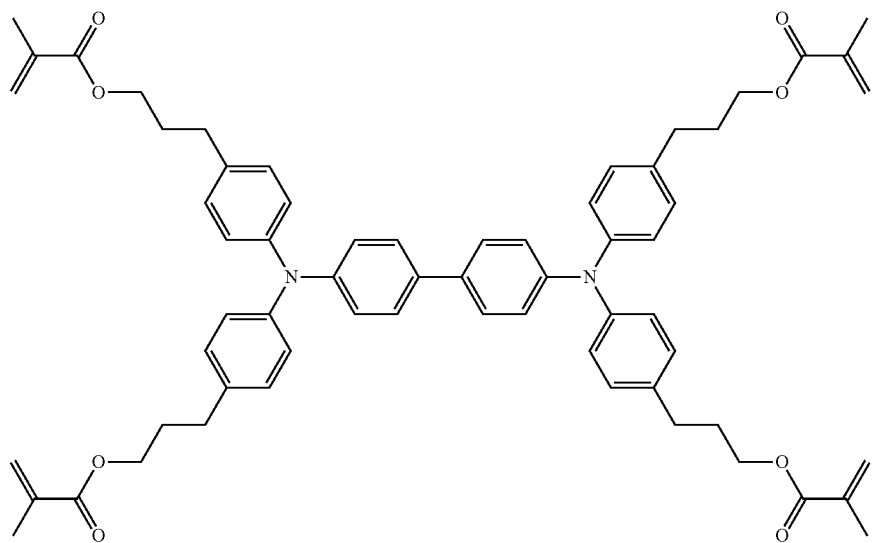 [SMILES: C=C(C)C(=O)OCCCc1ccc(N(c2ccc(CCCOC(=O)C(=C)C)cc2)c2ccc(-c3ccc(N(c4ccc(CCCOC(=O)C(=C)C)cc4)c4ccc(CCCOC(=O)C(=C)C)cc4)cc3)cc2)cc1]
A-17
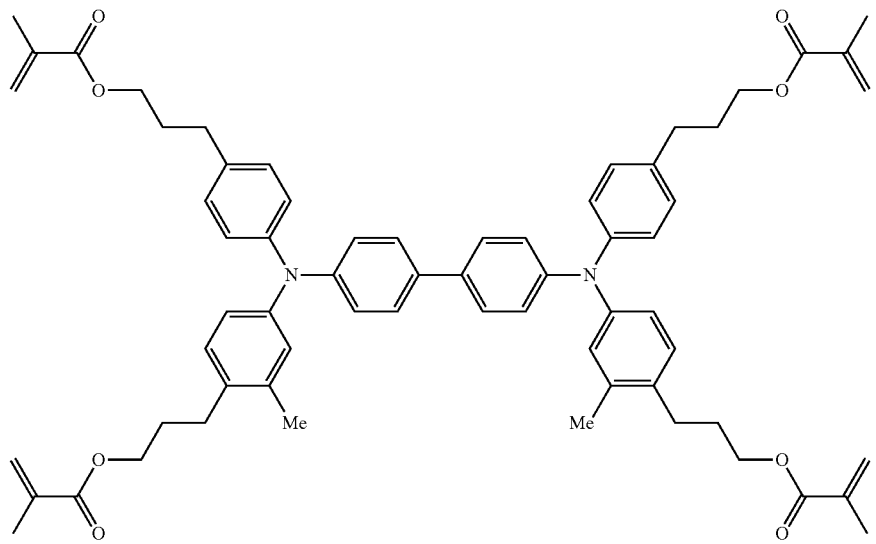 [SMILES: C=C(C)C(=O)OCCCc1ccc(N(c2ccc(-c3ccc(N(c4ccc(CCCOC(=O)C(=C)C)cc4)c4ccc(CCCOC(=O)C(=C)C)c(C)c4)cc3)cc2)c2ccc(CCCOC(=O)C(=C)C)c(C)c2)cc1]

-continued
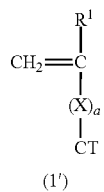
(1')
A-18
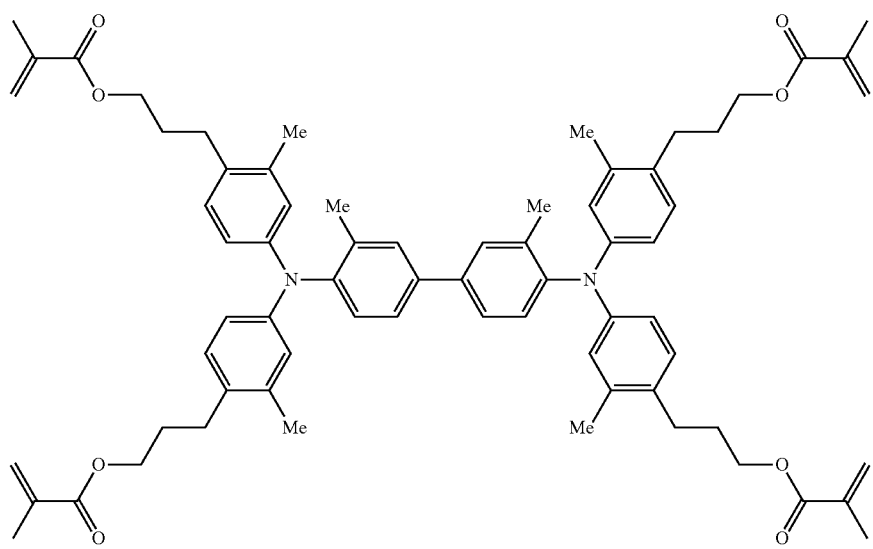 [SMILES: C=C(C)C(=O)OCCCc1ccc(N(c2ccc(CCCOC(=O)C(=C)C)c(C)c2)c2ccc(-c3ccc(N(c4ccc(CCCOC(=O)C(=C)C)c(C)c4)c4ccc(CCCOC(=O)C(=C)C)c(C)c4)c(C)c3)cc2C)cc1C]
A-19
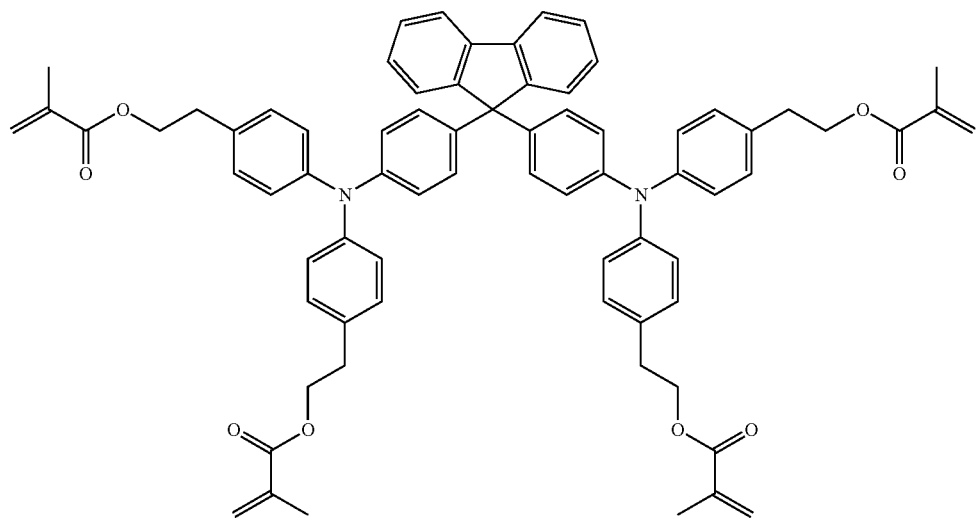 [SMILES: C=C(C)C(=O)OCCc1ccc(N(c2ccc(CCOC(=O)C(=C)C)cc2)c2ccc(C3(c4ccc(N(c5ccc(CCOC(=O)C(=C)C)cc5)c5ccc(CCOC(=O)C(=C)C)cc5)cc4)c4ccccc4-c4ccccc43)cc2)cc1]

-continued
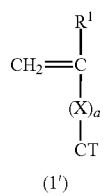
(1')
A-20
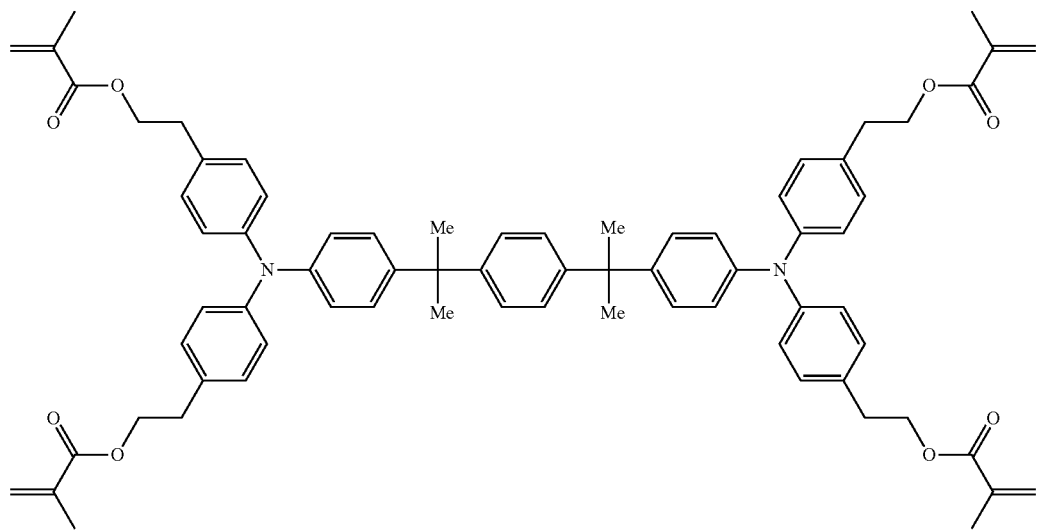 [SMILES: C=C(C)C(=O)OCCc1ccc(N(c2ccc(CCOC(=O)C(=C)C)cc2)c2ccc(C(C)(C)c3ccc(C(C)(C)c4ccc(N(c5ccc(CCOC(=O)C(=C)C)cc5)c5ccc(CCOC(=O)C(=C)C)cc5)cc4)cc3)cc2)cc1]
A-21
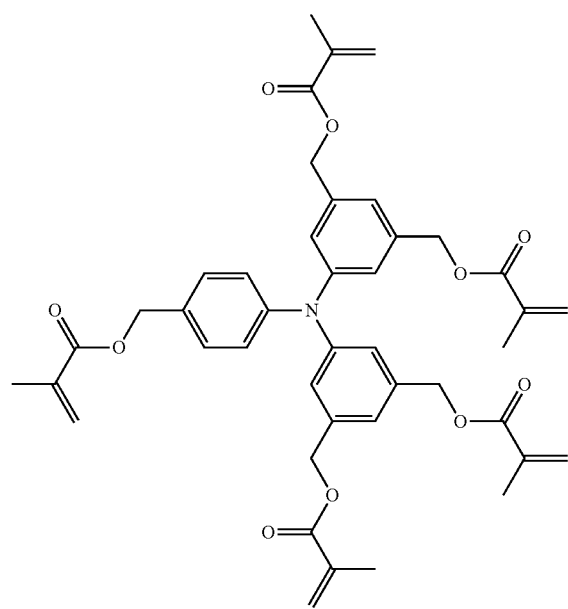 [SMILES: C=C(C)C(=O)OCc1ccc(N(c2cc(COC(=O)C(=C)C)cc(COC(=O)C(=C)C)c2)c2cc(COC(=O)C(=C)C)cc(COC(=O)C(=C)C)c2)cc1]

-continued
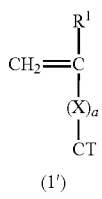
(1')
A-22
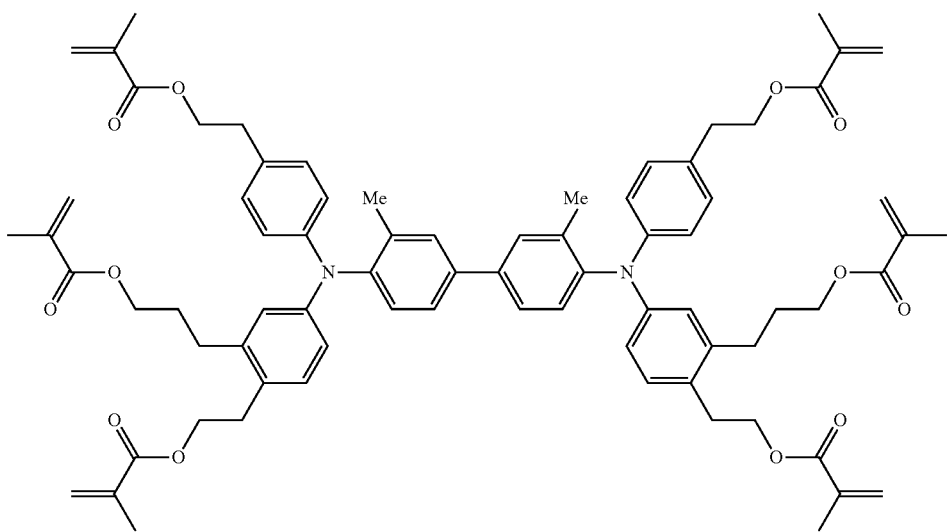 [SMILES: C=C(C)C(=O)OCCCc1cc(N(c2ccc(CCOC(=O)C(=C)C)cc2)c2ccc(-c3ccc(N(c4ccc(CCOC(=O)C(=C)C)cc4)c4ccc(CCOC(=O)C(=C)C)c(CCCOC(=O)C(=C)C)c4)c(C)c3)cc2C)ccc1CCOC(=O)C(=C)C]
A-23
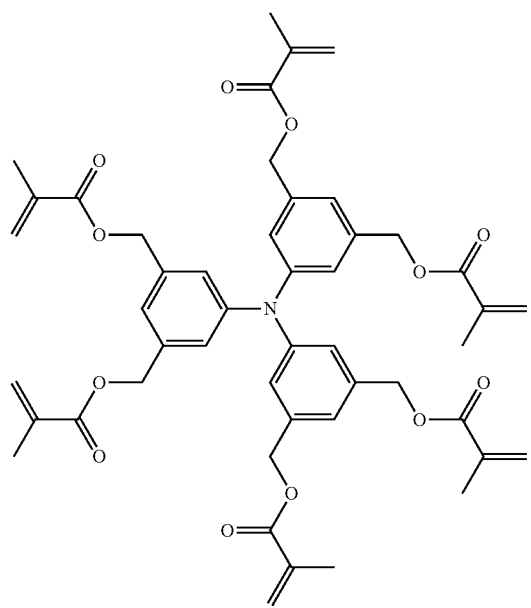 [SMILES: C=C(C)C(=O)OCc1cc(COC(=O)C(=C)C)cc(N(c2cc(COC(=O)C(=C)C)cc(COC(=O)C(=C)C)c2)c2cc(COC(=O)C(=C)C)cc(COC(=O)C(=C)C)c2)c1]

-continued
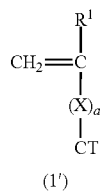
(1')
A-24
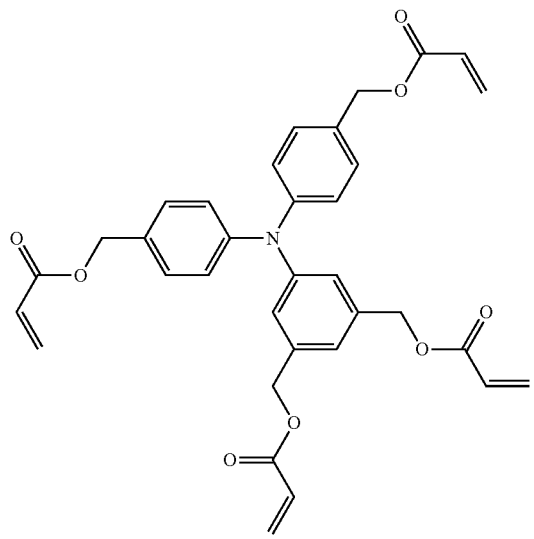 [SMILES: C=CC(=O)OCc1ccc(N(c2ccc(COC(=O)C=C)cc2)c2cc(COC(=O)C=C)cc(COC(=O)C=C)c2)cc1]
A-25
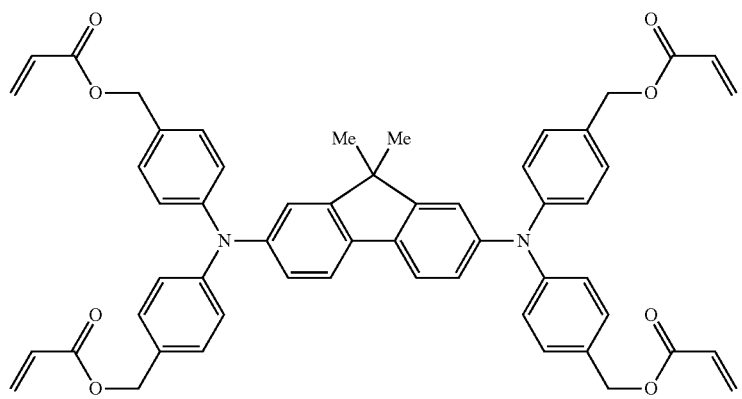 [SMILES: C=CC(=O)OCc1ccc(N(c2ccc(COC(=O)C=C)cc2)c2ccc3c(c2)C(C)(C)c2cc(N(c4ccc(COC(=O)C=C)cc4)c4ccc(COC(=O)C=C)cc4)ccc2-3)cc1]
A-26
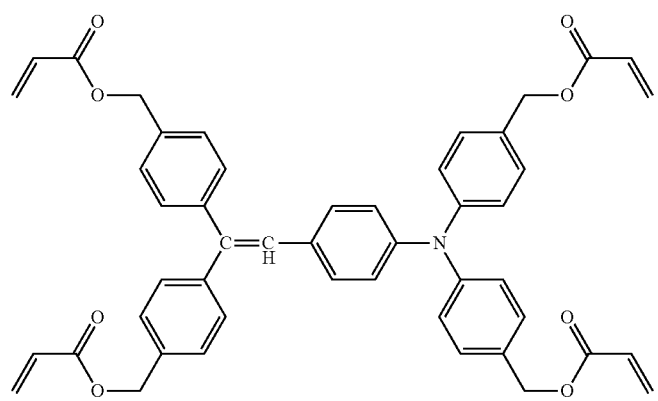 [SMILES: C=CC(=O)OCc1ccc(C(=Cc2ccc(N(c3ccc(COC(=O)C=C)cc3)c3ccc(COC(=O)C=C)cc3)cc2)c2ccc(COC(=O)C=C)cc2)cc1]

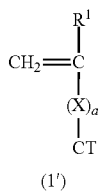
(1')
A-27
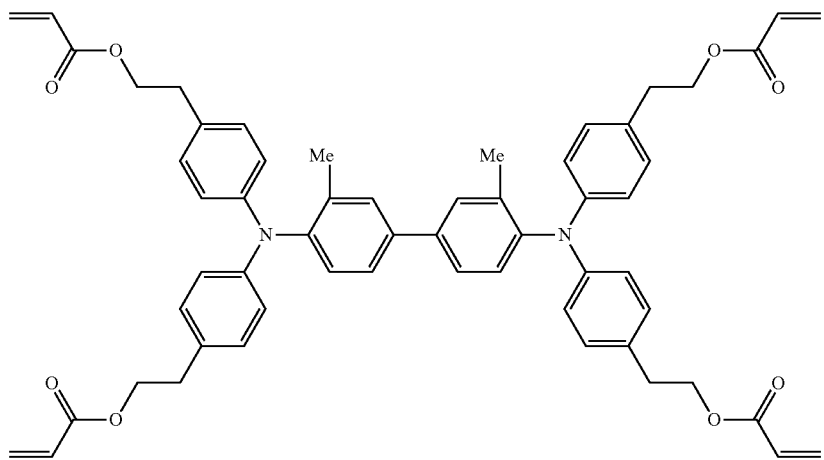 [SMILES: C=CC(=O)OCCc1ccc(N(c2ccc(CCOC(=O)C=C)cc2)c2ccc(-c3ccc(N(c4ccc(CCOC(=O)C=C)cc4)c4ccc(CCOC(=O)C=C)cc4)c(C)c3)cc2C)cc1]
A-28
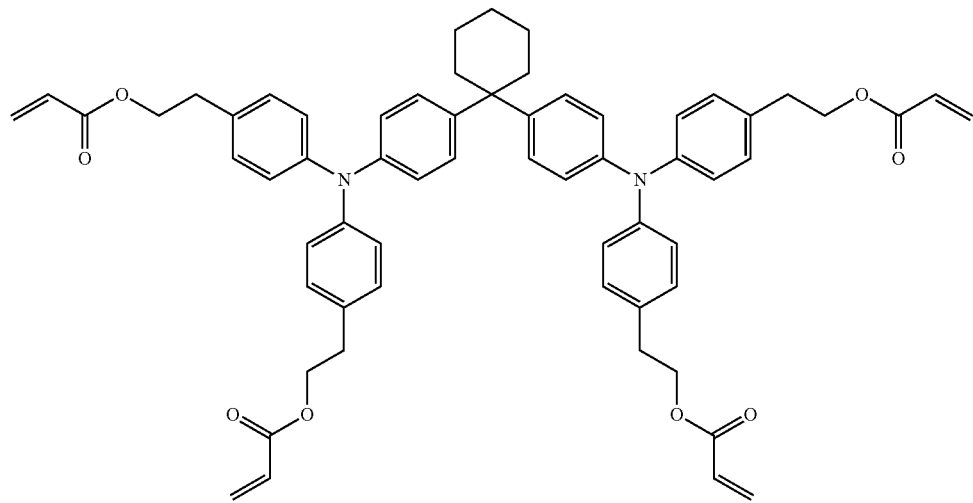 [SMILES: C=CC(=O)OCCc1ccc(N(c2ccc(CCOC(=O)C=C)cc2)c2ccc(C3(c4ccc(N(c5ccc(CCOC(=O)C=C)cc5)c5ccc(CCOC(=O)C=C)cc5)cc4)CCCCC3)cc2)cc1]

-continued
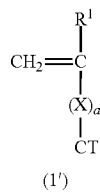
(1')
A-29
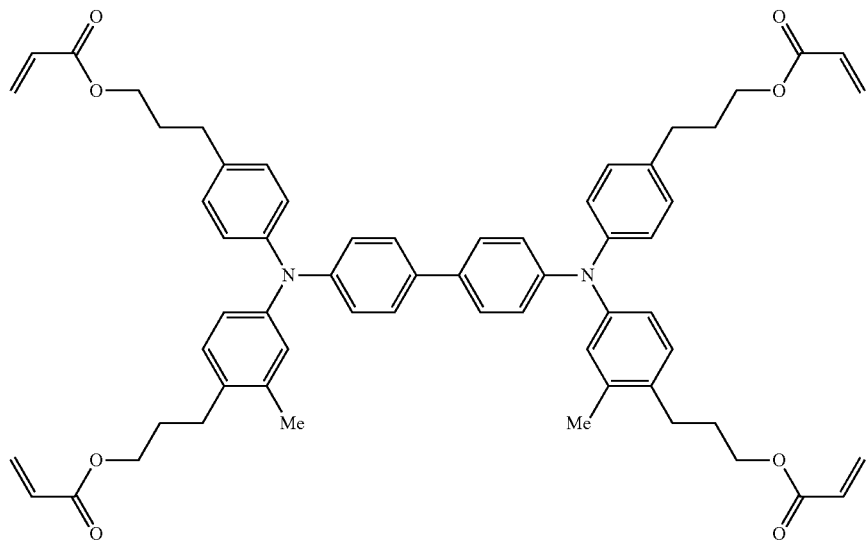 [SMILES: C=CC(=O)OCCCc1ccc(N(c2ccc(-c3ccc(N(c4ccc(CCCOC(=O)C=C)cc4)c4ccc(CCCOC(=O)C=C)c(C)c4)cc3)cc2)c2ccc(CCCOC(=O)C=C)c(C)c2)cc1]
A-30
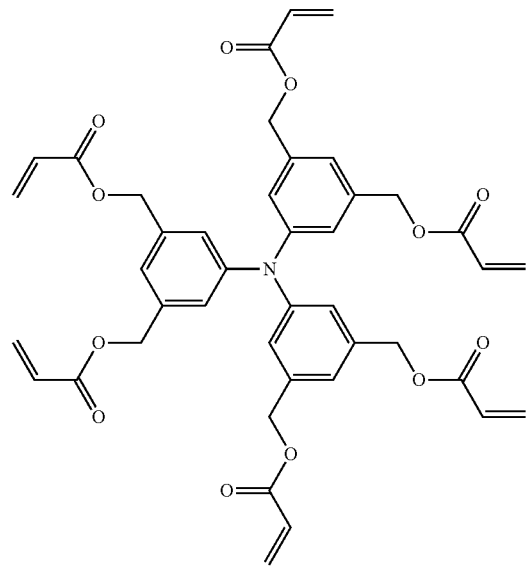 [SMILES: C=CC(=O)OCc1cc(COC(=O)C=C)cc(N(c2cc(COC(=O)C=C)cc(COC(=O)C=C)c2)c2cc(COC(=O)C=C)cc(COC(=O)C=C)c2)c1]

-continued
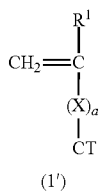
(1')
A-31
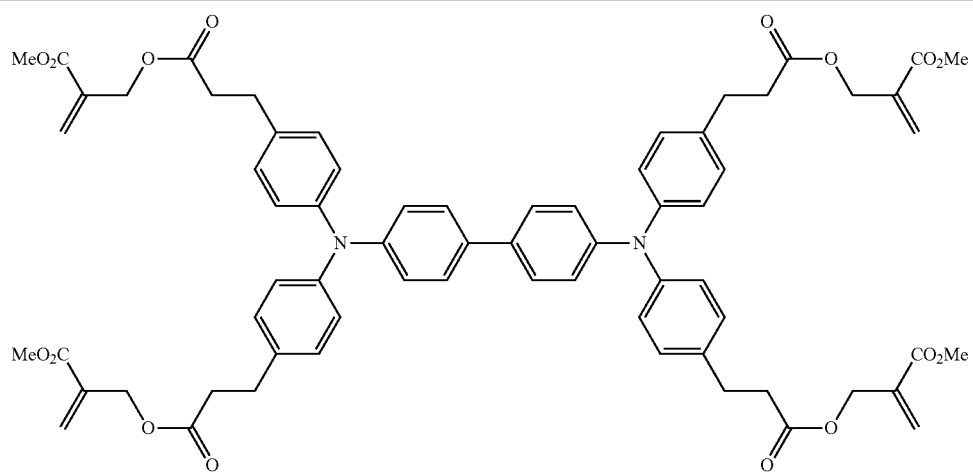 [SMILES: C=C(COC(=O)CCc1ccc(N(c2ccc(CCC(=O)OCC(=C)C(=O)OC)cc2)c2ccc(-c3ccc(N(c4ccc(CCC(=O)OCC(=C)C(=O)OC)cc4)c4ccc(CCC(=O)OCC(=C)C(=O)OC)cc4)cc3)cc2)cc1)C(=O)OC]
A-32
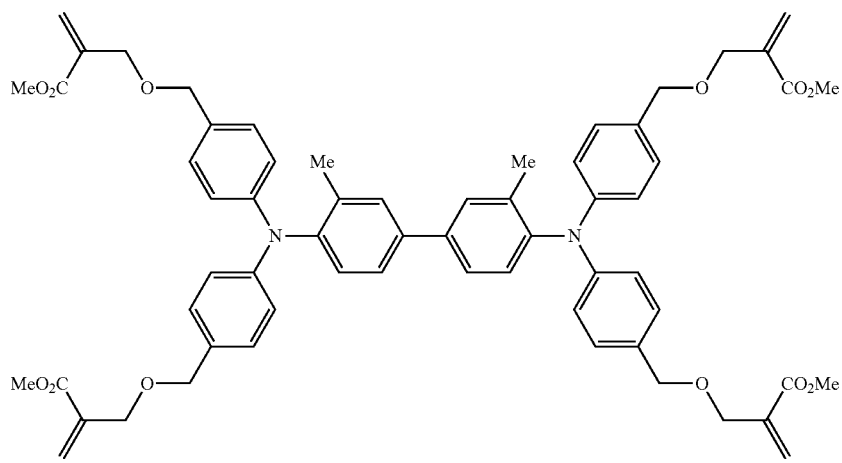 [SMILES: C=C(COCc1ccc(N(c2ccc(COCC(=C)C(=O)OC)cc2)c2ccc(-c3ccc(N(c4ccc(COCC(=C)C(=O)OC)cc4)c4ccc(COCC(=C)C(=O)OC)cc4)c(C)c3)cc2C)cc1)C(=O)OC]
A-33
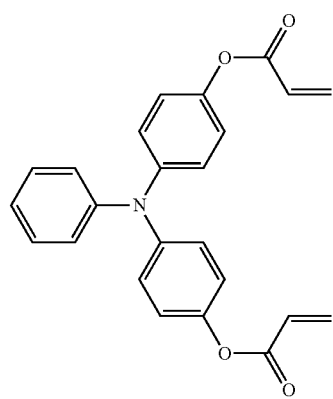 [SMILES: C=CC(=O)Oc1ccc(N(c2ccccc2)c2ccc(OC(=O)C=C)cc2)cc1]

-continued
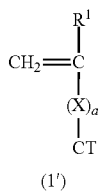
(1')
A-34
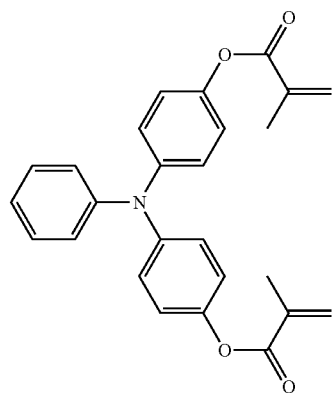 [SMILES: C=C(C)C(=O)Oc1ccc(N(c2ccccc2)c2ccc(OC(=O)C(=C)C)cc2)cc1]
A-35
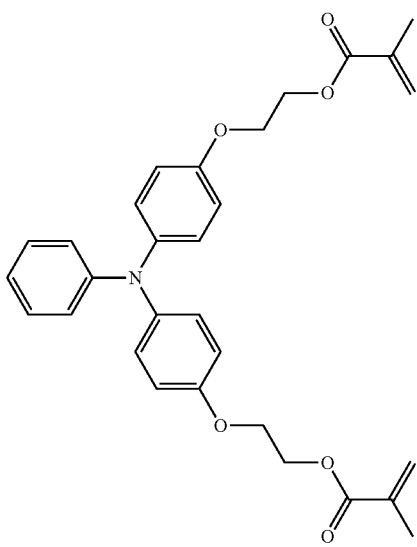 [SMILES: C=C(C)C(=O)OCCOc1ccc(N(c2ccccc2)c2ccc(OCCOC(=O)C(=C)C)cc2)cc1]
A-36
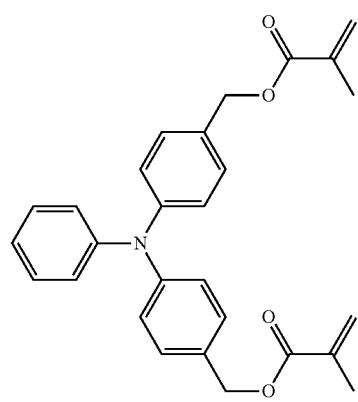 [SMILES: C=C(C)C(=O)OCc1ccc(N(c2ccccc2)c2ccc(COC(=O)C(=C)C)cc2)cc1]

-continued
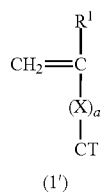
(1')
A-37
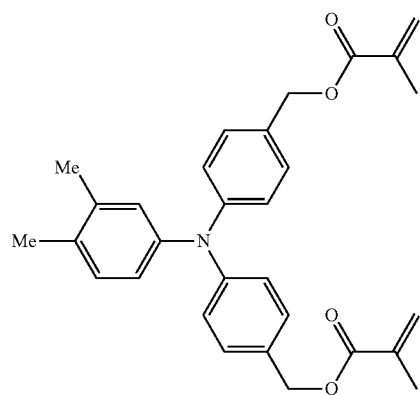 [SMILES: C=C(C)C(=O)OCc1ccc(N(c2ccc(COC(=O)C(=C)C)cc2)c2ccc(C)c(C)c2)cc1]
A-38
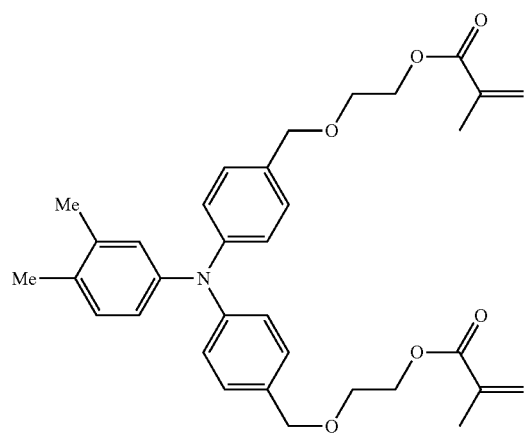 [SMILES: C=C(C)C(=O)OCCOCc1ccc(N(c2ccc(COCCOC(=O)C(=C)C)cc2)c2ccc(C)c(C)c2)cc1]
A-39
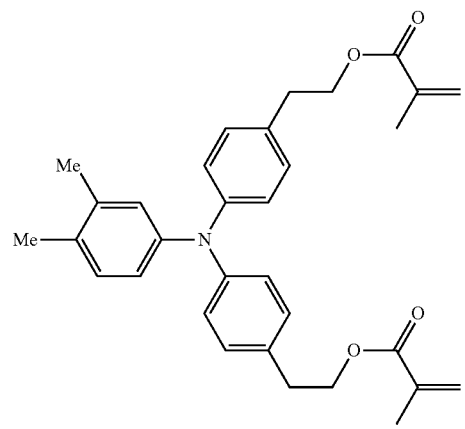 [SMILES: C=C(C)C(=O)OCCc1ccc(N(c2ccc(CCOC(=O)C(=C)C)cc2)c2ccc(C)c(C)c2)cc1]

-continued
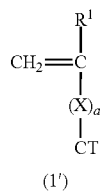
(1')
A-40
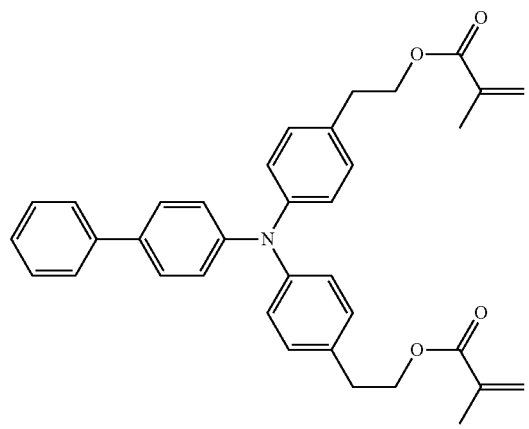 [SMILES: C=C(C)C(=O)OCCc1ccc(N(c2ccc(CCOC(=O)C(=C)C)cc2)c2ccc(-c3ccccc3)cc2)cc1]
A-41
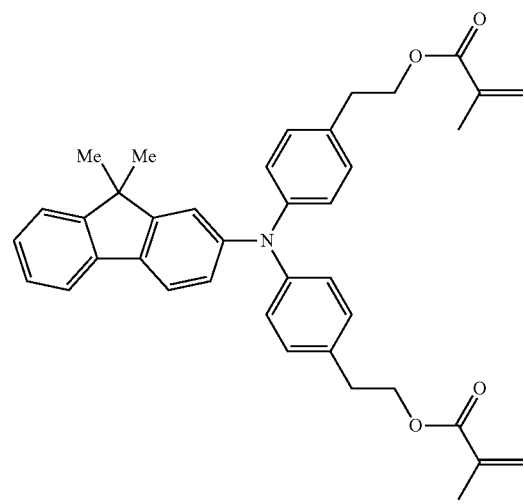 [SMILES: C=C(C)C(=O)OCCc1ccc(N(c2ccc(CCOC(=O)C(=C)C)cc2)c2ccc3c(c2)C(C)(C)c2ccccc2-3)cc1]
A-42
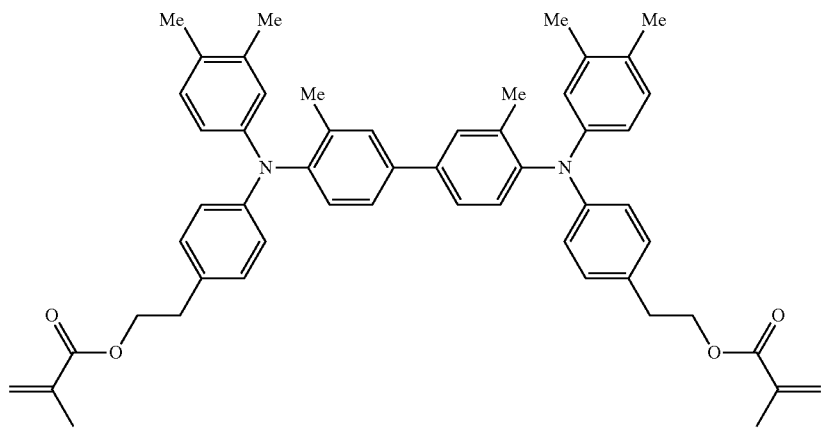 [SMILES: C=C(C)C(=O)OCCc1ccc(N(c2ccc(C)c(C)c2)c2ccc(-c3ccc(N(c4ccc(CCOC(=O)C(=C)C)cc4)c4ccc(C)c(C)c4)c(C)c3)cc2C)cc1]

-continued
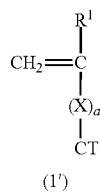
(1')
A-43
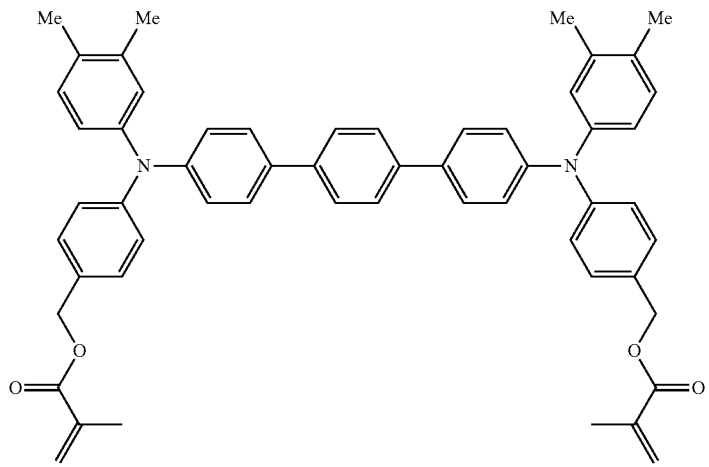 [SMILES: C=C(C)C(=O)OCc1ccc(N(c2ccc(-c3ccc(-c4ccc(N(c5ccc(COC(=O)C(=C)C)cc5)c5ccc(C)c(C)c5)cc4)cc3)cc2)c2ccc(C)c(C)c2)cc1]
A-44
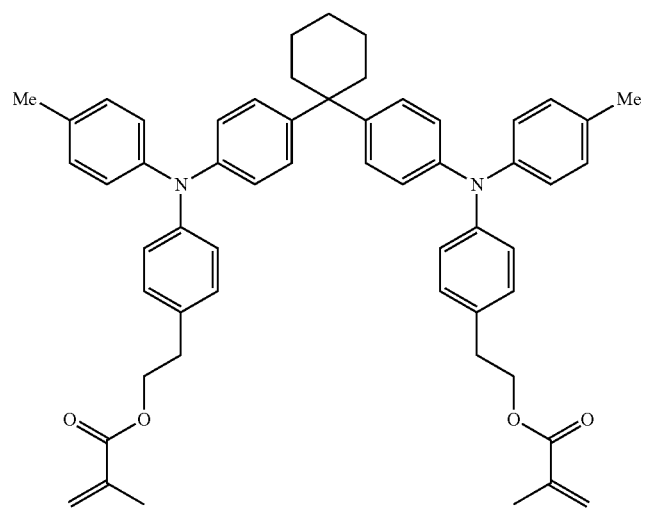 [SMILES: C=C(C)C(=O)OCCc1ccc(N(c2ccc(C)cc2)c2ccc(C3(c4ccc(N(c5ccc(C)cc5)c5ccc(CCOC(=O)C(=C)C)cc5)cc4)CCCCC3)cc2)cc1]
A-45
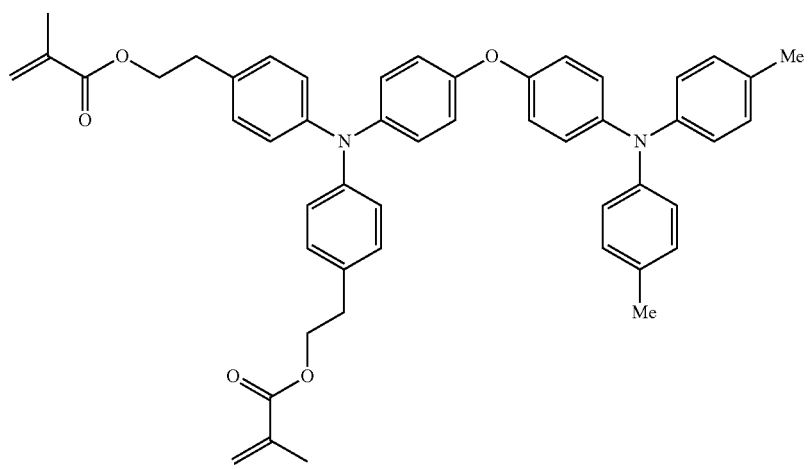 [SMILES: C=C(C)C(=O)OCCc1ccc(N(c2ccc(CCOC(=O)C(=C)C)cc2)c2ccc(Oc3ccc(N(c4ccc(C)cc4)c4ccc(C)cc4)cc3)cc2)cc1]

-continued
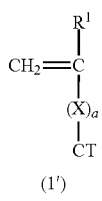
(1')
A-46
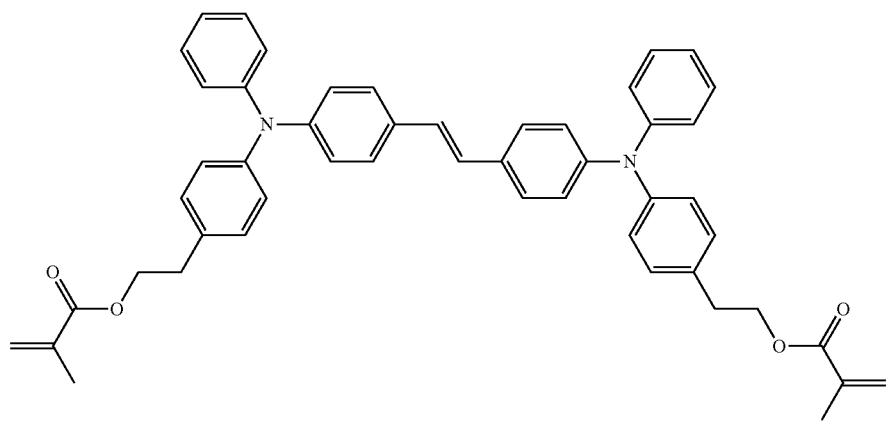 [SMILES: C=C(C)C(=O)OCCc1ccc(N(c2ccccc2)c2ccc(/C=C/c3ccc(N(c4ccccc4)c4ccc(CCOC(=O)C(=C)C)cc4)cc3)cc2)cc1]
A-47
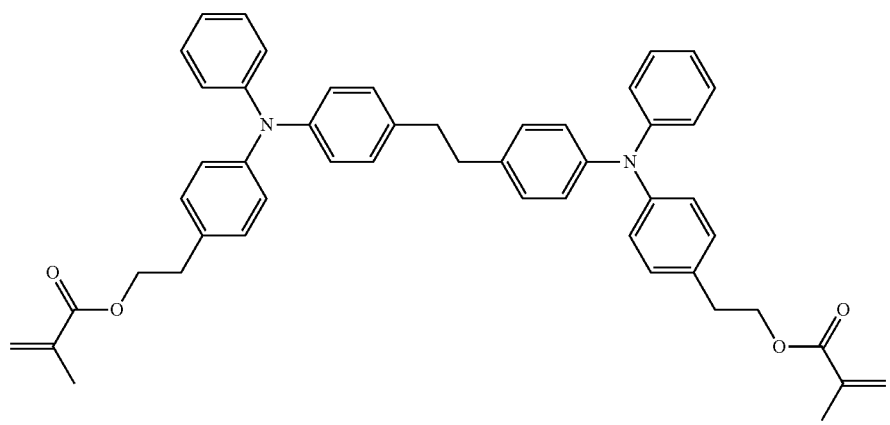 [SMILES: C=C(C)C(=O)OCCc1ccc(N(c2ccccc2)c2ccc(CCc3ccc(N(c4ccccc4)c4ccc(CCOC(=O)C(=C)C)cc4)cc3)cc2)cc1]
A-48
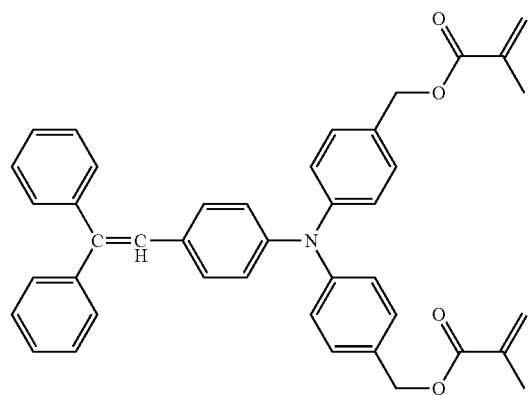 [SMILES: C=C(C)C(=O)OCc1ccc(N(c2ccc(C=C(c3ccccc3)c3ccccc3)cc2)c2ccc(COC(=O)C(=C)C)cc2)cc1]

-continued
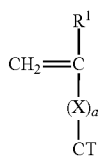
(1')
A-49
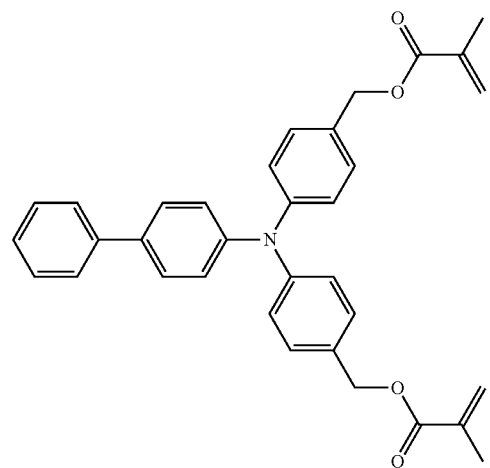 [SMILES: C=C(C)C(=O)OCc1ccc(N(c2ccc(COC(=O)C(=C)C)cc2)c2ccc(-c3ccccc3)cc2)cc1]
A-50
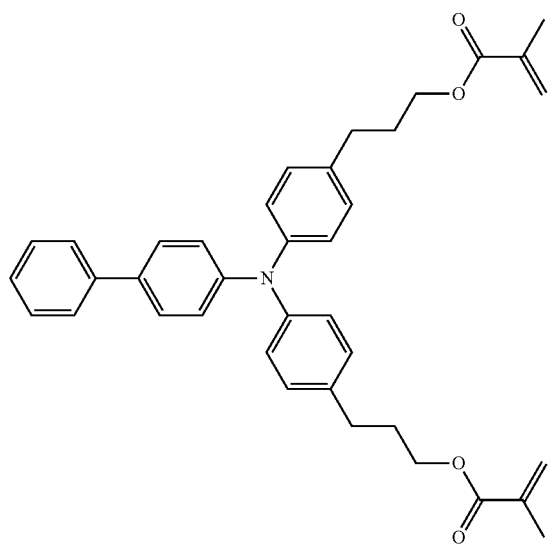 [SMILES: C=C(C)C(=O)OCCCc1ccc(N(c2ccc(CCCOC(=O)C(=C)C)cc2)c2ccc(-c3ccccc3)cc2)cc1]
A-51
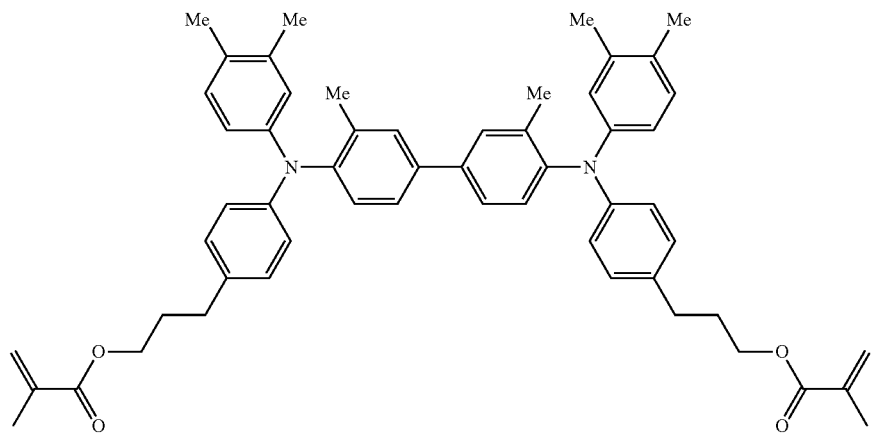 [SMILES: C=C(C)C(=O)OCCCc1ccc(N(c2ccc(C)c(C)c2)c2ccc(-c3ccc(N(c4ccc(CCCOC(=O)C(=C)C)cc4)c4ccc(C)c(C)c4)c(C)c3)cc2C)cc1]

-continued
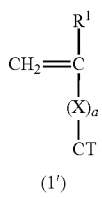
(1')
A-52
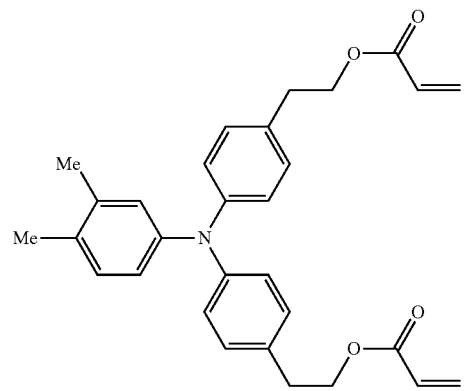 [SMILES: C=CC(=O)OCCc1ccc(N(c2ccc(CCOC(=O)C=C)cc2)c2ccc(C)c(C)c2)cc1]
A-53
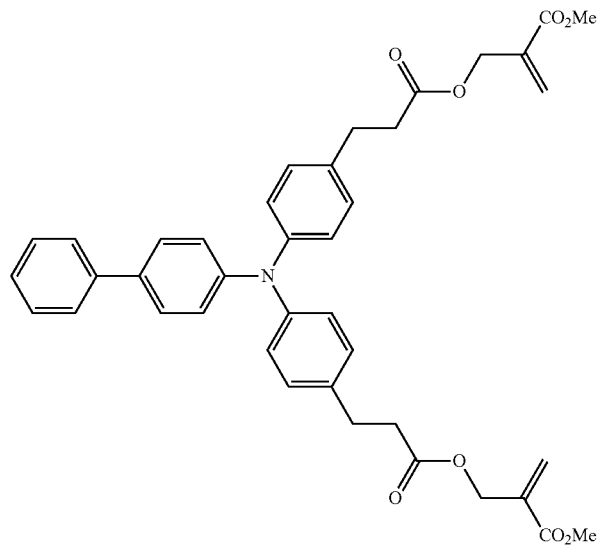 [SMILES: C=C(COC(=O)CCc1ccc(N(c2ccc(CCC(=O)OCC(=C)C(=O)OC)cc2)c2ccc(-c3ccccc3)cc2)cc1)C(=O)OC]
A-54
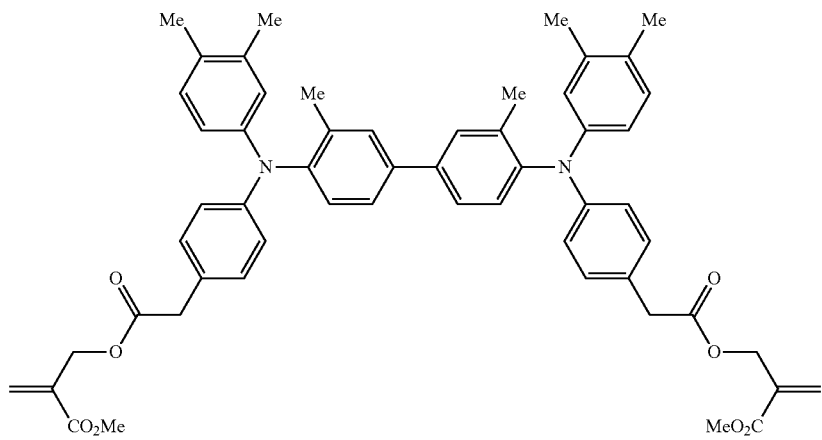 [SMILES: C=C(COC(=O)Cc1ccc(N(c2ccc(C)c(C)c2)c2ccc(-c3ccc(N(c4ccc(CC(=O)OCC(=C)C(=O)OC)cc4)c4ccc(C)c(C)c4)c(C)c3)cc2C)cc1)C(=O)OC]

-continued
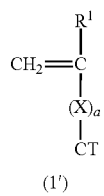
(1')
A-55
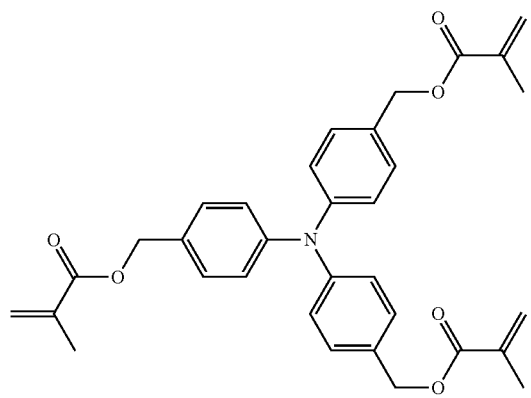 [SMILES: C=C(C)C(=O)OCc1ccc(N(c2ccc(COC(=O)C(=C)C)cc2)c2ccc(COC(=O)C(=C)C)cc2)cc1]
A-56
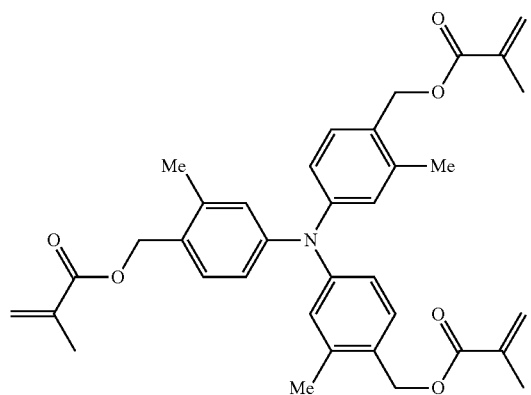 [SMILES: C=C(C)C(=O)OCc1ccc(N(c2ccc(COC(=O)C(=C)C)c(C)c2)c2ccc(COC(=O)C(=C)C)c(C)c2)cc1C]
A-57
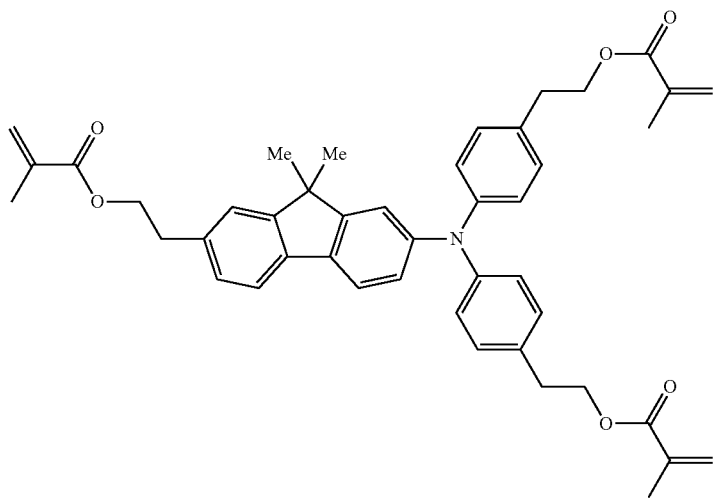 [SMILES: C=C(C)C(=O)OCCc1ccc(N(c2ccc(CCOC(=O)C(=C)C)cc2)c2ccc3c(c2)C(C)(C)c2cc(CCOC(=O)C(=C)C)ccc2-3)cc1]

-continued
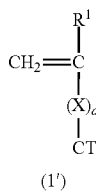
(1')
A-58
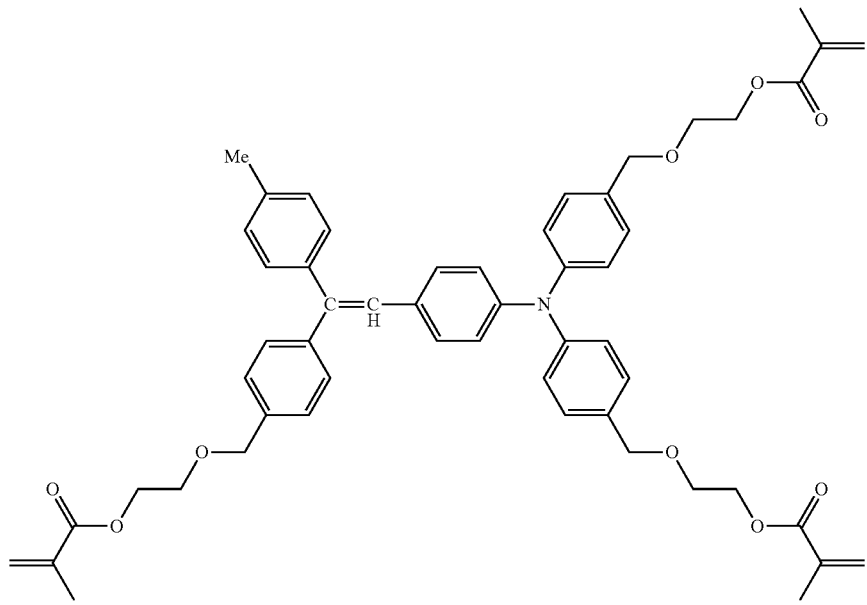 [SMILES: C=C(C)C(=O)OCCOCc1ccc(C(=Cc2ccc(N(c3ccc(COCCOC(=O)C(=C)C)cc3)c3ccc(COCCOC(=O)C(=C)C)cc3)cc2)c2ccc(C)cc2)cc1]
A-59
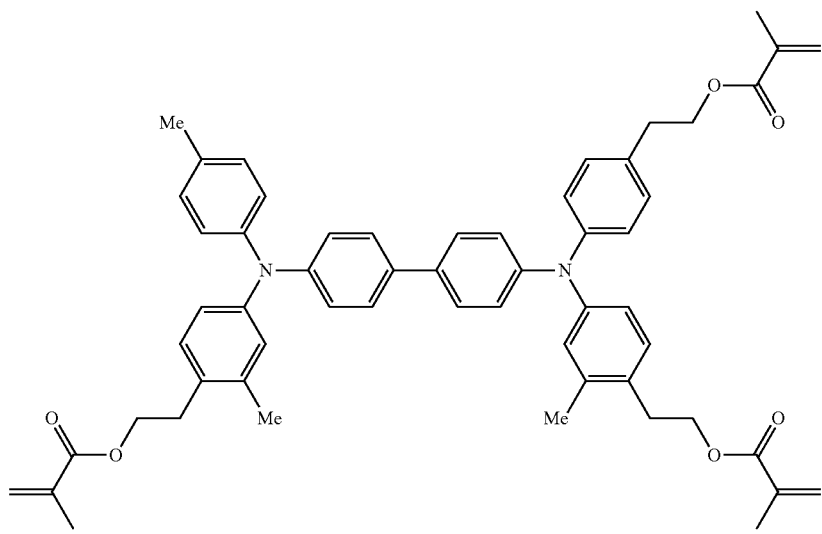 [SMILES: C=C(C)C(=O)OCCc1ccc(N(c2ccc(-c3ccc(N(c4ccc(C)cc4)c4ccc(CCOC(=O)C(=C)C)c(C)c4)cc3)cc2)c2ccc(CCOC(=O)C(=C)C)c(C)c2)cc1]

-continued
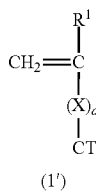
(1′)
A-60
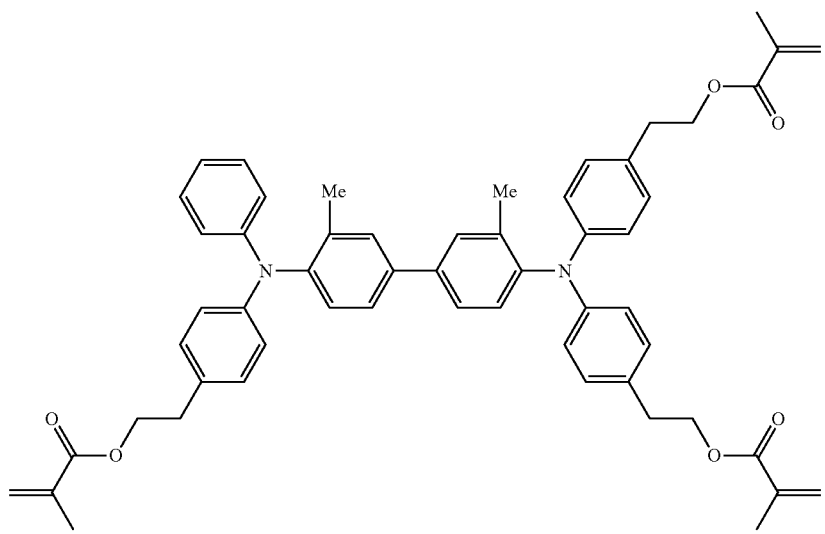 [SMILES: C=C(C)C(=O)OCCc1ccc(N(c2ccccc2)c2ccc(-c3ccc(N(c4ccc(CCOC(=O)C(=C)C)cc4)c4ccc(CCOC(=O)C(=C)C)cc4)c(C)c3)cc2C)cc1]
A-61
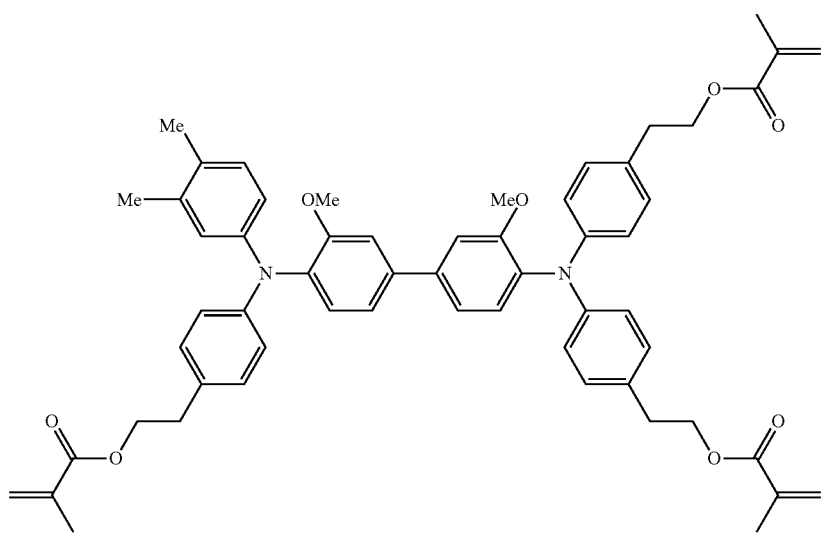 [SMILES: C=C(C)C(=O)OCCc1ccc(N(c2ccc(CCOC(=O)C(=C)C)cc2)c2ccc(-c3ccc(N(c4ccc(CCOC(=O)C(=C)C)cc4)c4ccc(C)c(C)c4)c(OC)c3)cc2OC)cc1]

-continued
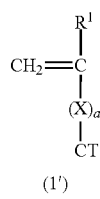
(1')
A-62
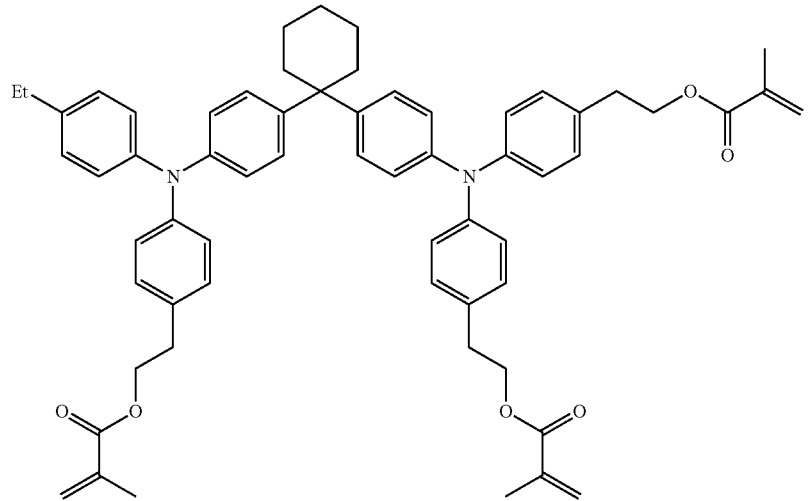 [SMILES: C=C(C)C(=O)OCCc1ccc(N(c2ccc(CC)cc2)c2ccc(C3(c4ccc(N(c5ccc(CCOC(=O)C(=C)C)cc5)c5ccc(CCOC(=O)C(=C)C)cc5)cc4)CCCCC3)cc2)cc1]
A-63
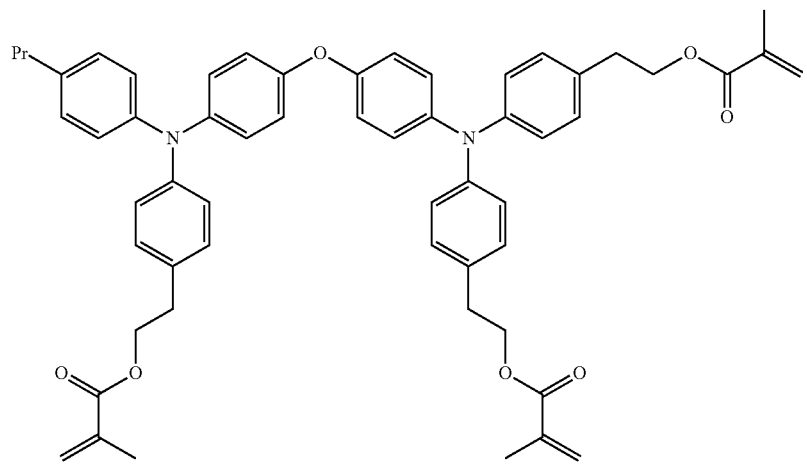

-continued
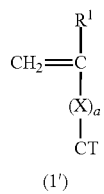
(1')
A-64
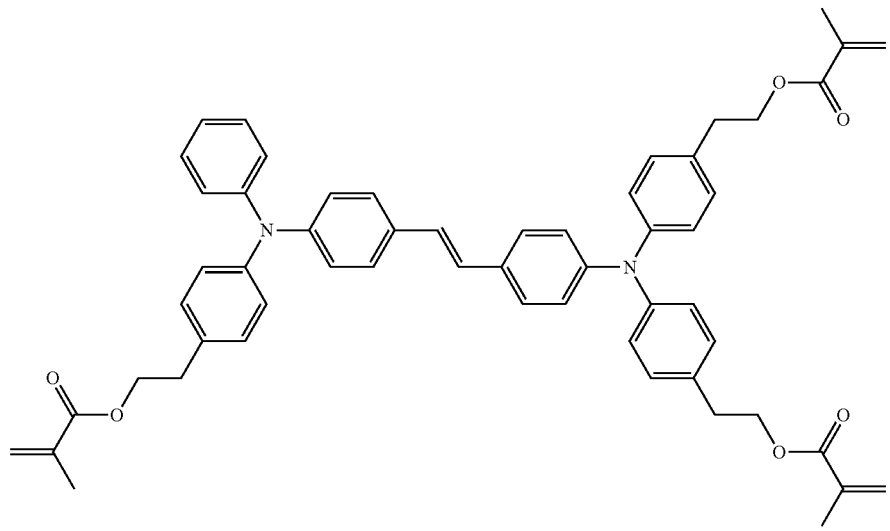 [SMILES: C=C(C)C(=O)OCCc1ccc(N(c2ccccc2)c2ccc(/C=C/c3ccc(N(c4ccc(CCOC(=O)C(=C)C)cc4)c4ccc(CCOC(=O)C(=C)C)cc4)cc3)cc2)cc1]
A-65
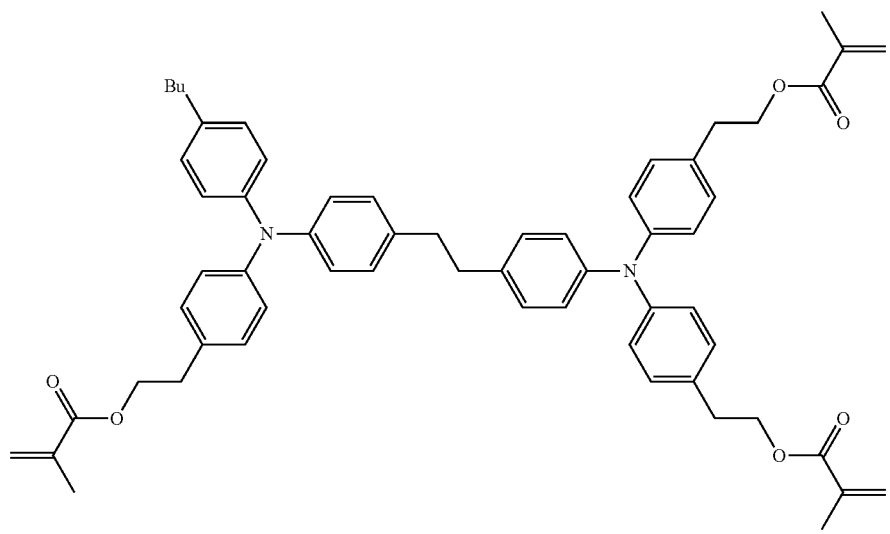
A-66
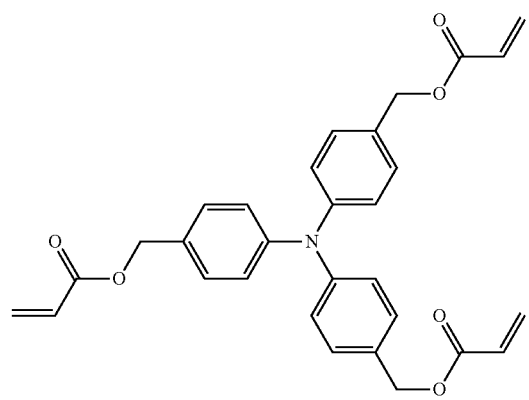 [SMILES: C=CC(=O)OCc1ccc(N(c2ccc(COC(=O)C=C)cc2)c2ccc(COC(=O)C=C)cc2)cc1]

-continued

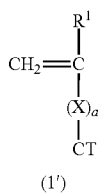

(1')

A-67

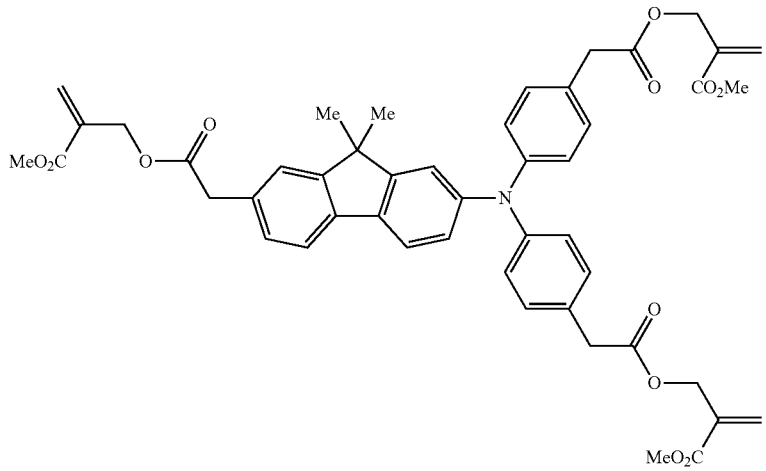 [SMILES: C=C(COC(=O)Cc1ccc(N(c2ccc(CC(=O)OCC(=C)C(=O)OC)cc2)c2ccc3c(c2)C(C)(C)c2cc(CC(=O)OCC(=C)C(=O)OC)ccc2-3)cc1)C(=O)OC]

The total content of the reactive charge transportable compound (α) is preferably from 0% by weight to 50% by weight, more preferably from 1% by weight to 45% by weight, even more preferably from 3% by weight to 40% by weight, with respect to the total solid content of the composition used when the protective layer 5 is formed. When the total content thereof is within this range, the strength and the electrical properties of the curing film (outermost layer) are excellent and film-thickening of the curing film is attained.

Non-Reactive Charge Transportable Compound (β)

The film of the protective layer 5 may also use a non-reactive charge transportable compound (β) having a charge transportable skeleton and having no unsaturated double bonds to be subjected to radical polymerization, in addition to the reactive charge transportable compound (α) described above. Since the non-reactive charge transportable compound (β) does not have a reactive group that does not serve as charge transportation, it is effective in that, when non-reactive charge transportable compound (β) is used in the protective layer 5, the density of the charge transportable component is substantially increased and the electrical properties are further improved. Further, strength may be adjusted by adding the non-reactive charge transportable compound (β) to the lower cross-linked density.

A charge transportable skeleton of the non-reactive charge transportable compound (β) may use the charge transportable skeleton described in the reactive charge transportable compound (α). In particular, it is preferable that the non-reactive charge transportable compound (β) has the same charge transportable skeleton as that of the reactive charge transportable compound (α) from the viewpoints that charge transportability and film strength, and mutual compatibility of the reactive charge transportable compound (α) and the non-reactive charge transportable compound (β) are improved.

Further, the non-reactive charge transportable compound (β) has the same charge transportable skeleton as the reactive charge transportable compound (α). This means that the non-reactive charge transportable compound (β) has the same skeleton structure as that of the reactive charge transportable compound (α). Regarding the charge transportable skeleton, the non-reactive charge transportable compound (β) may have substituents including an alkyl group such as a methyl group or an ethyl group, or an alkoxy group such as a methoxy group or an ethoxy group.

The non-reactive charge transportable compound (β) may use known charge transportable materials, specifically, a triaryl amine-based compound, a benzidine-based compound, an arylalkane-based compound, an aryl-substituted an ethylene-based compound, a stilbene-based compound, an anthracene-based compound, a hydrazone-based compound or the like. Among them, from the viewpoints of mobility and mutual compatibility, a compound having a triphenyl amine skeleton is preferable.

The non-reactive charge transportable compound (β) is used from 0% by weight to 30% by weight, more preferably from 1% by weight to 25% by weight, and even more preferably 5% from by weight to 25% by weight, with respect to the total solid content of the coating liquid for layer formation.

Reactive Compound (c) having No Charge Transportable Skeleton

A film forming the protective layer 5 may contain the reactive compound (c) having an acryloyl group or a methacryloyl group, or derivatives thereof, in addition to the reactive charge transportable compound (α) described above such that the cross-linked density and film strength are improved.

The reactive compound (c) used in a curing film forming the protective layer 5 may be any one of monomers, oligomers, or polymers.

Examples of a mono-functional monomer as the reactive compound (c) include isobutyl acrylate, t-butyl acrylate, isooctyl acrylate, lauryl acrylate, stearyl acrylate, isobornyl acrylate, cyclohexyl acrylate, 2-methoxyethyl acrylate, methoxytriethylene glycol acrylate, 2-ethoxyethyl acrylate, tetrahydrofurfuryl acrylate, benzyl acrylate, ethylcarbitol acrylate, phenoxyethyl acrylate, 2-hydroxyacrylate, 2-hydroxypropyl acrylate, 4-hydroxybutyl acrylate, methoxypolyethylene glycol acrylate, methoxypolyethylene glycol methacrylate, phenoxypolyethylene glycol acrylate, phenoxypolyethylene glycol methacrylate, hydroxyethyl o-phenylphenol acrylate, o-phenylphenol glycidyl ether acrylate, or the like.

Examples of a di-functional monomer as the reactive compound (c) include diethylene glycol di(meth)acrylate, polyethylene glycol di(meth)acrylate, polypropylene glycol di(meth)acrylate, neopentyl glycol di(meth)acrylate, 1,6-hexanediol di(meth)acrylate, or the like.

Examples of a tri-functional monomer as the reactive compound (c) include trimethylol propane tri(meth)acrylate, pentaerythritol tri(meth)acrylate, aliphatic tri(meth)acrylate, or the like.

Examples of a tetra-functional monomer as the reactive compound (c) include pentaerythritol tetra(meth)acrylate, ditrimethylol propane tetra(meth)acrylate, aliphatic tetra(meth)acrylate, or the like.

Examples of a penta-functional monomer as the reactive compound (c) include (meth)acrylate having polyester skeleton, urethane skeleton, phosphazene skeleton, other than dipentaerythritol penta(meth)acrylate, dipentaerythritol hexa(meth)acrylate.

Examples of the polymer as the reactive compound (c) include one disclosed in JP-A No. 5-216249, JP-A No. 5-323630, JP-A No. 11-52603, JP-A No. 2000-264961.

When the reactive compound (c) is used, the reactive compound (c) is used alone or as a mixture of two or more kinds. The reactive compound (c) is used preferably from 50% by weight or less, more preferably from 45% by weight or less, and even more preferably from 40% by weight or less, with respect to the total solid content of the composition used when the protective layer 5 is formed.

Other Resins

When a curing film forming a protective layer 5 satisfies the conditions described above, the film has excellent mutual compatibility in regard to the charge transportable compound (α) and the polycarbonate resin. Therefore, a mixture of the film and a non-reactive binder resin not having an acryloyl group or a methacryloyl group, or derivatives thereof can be attained. Therefore, for purposes such as discharge gas resistance, adhesion, mechanical strength, scratch resistance, particle dispersibility, viscosity control, torque reduction, control of the amount of wear, extension of pot life, or the like, non-reactive binder resin may be added. By using the non-reactive binder resin, the viscosity of the composition is improved, the protective layer 5 having an excellent surface properties is formed. In addition, gas barrier properties are improved that prevents gas incorporation in the outermost layer, and the adhesion of the lower layer is improved.

Examples of the non-reactive binder resin include known resins such as polyester resin, polyarylate resin, methacrylic resin, acrylic resin, polyvinyl chloride resin, polyvinylidene chloride resin, or polystyrene resin.

Further, for the purposes of discharge gas resistance, mechanical strength, scratch resistance, particle dispersibility, viscosity control, torque reduction, control of the amount of wear, and extending pot life of the protective layer 5, a resin dissolved in alcohol may be added.

The total content of non-reactive binder resin is preferably from 0% by weight to 20% by weight, more preferably from 1% by weight to 15% by weight, and even more preferably from 5% by weight to 10% by weight, with respect to the total solid content of the composition used when the protective layer 5 is formed:

Polymerization Initiator

When the protective layer 5 is formed, catalysts and polymerization initiators do not always need to be used, but photo-curing catalysts or thermal polymerization initiators may be used. Examples of these photo-curing catalysts and thermal polymerization initiators may use known photo-curing catalysts or thermal polymerization initiators.

—Photo-Curing Catalyst—

Examples of the photo-curing catalyst include intramolecular cleavage catalyst or a hydrogen extraction catalyst.

Examples of the commercially available product of the intermolecular cleavable polymerization initiator include benzylketal, alkylphenone, aminoalkylphenone, phosphine oxide, titanocene, and oxime compounds. More specifically, examples of the benzylketal compounds include 2,2-dimethoxy-1,2-diphenylethane-1-one. Examples of the alkylphenone compounds include 1-hydroxy-cyclohexyl-phenyl-ketone, and 2-hydroxy-2-methyl-1-phenyl-propane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, acetophenone, and 2-phenyl-2-(p-toluenesulfonyloxy)acetophenone. Examples of the aminoalkylphenone compounds include p-dimethylaminoacetophenone, p-dimethylaminopropiophenone, 2-methyl-1-(4-methylthiophenyl)-2-morpholinopropane-1-one, and 2-benzyl-2-dimethylamino-1-(4-morpholinophenyl)-butanone-1,2-(dimethyl)amino-2-[(4-methylphenyl)methyl]-1-[4-(4-morpholinyl)phenyl]-1-butanone. Examples of the phosphine oxide (or phosphinoxide) compounds include 2,4,6-trimethylbenzoyl-diphenyl-phosphine oxide, and bis(2,4,6-trimethylbenzoyl)-phenylphosphine oxide. Examples of the titanocene compounds include bis(η5-2,4-cyclopentadienyl-1-yl)-bis(2,6-difluoro-3-(1H-pyrrole-1-yl)-phenyl)titanium. Examples of the oxime compounds include 1,2-octanedione, 1-[4-(phenylthio)-,2-(o-benzoyloxime)} and ethanone, 1-[9-ethyl-6-(2-methylbenzoyl)-9H-carbazole-3-yl],1-(o-acetyloxime).

Examples of the hydrogen extraction type initiator include benzophenone-based, thioxanthone-based, benzyl-based, Michler's ketone-based initiators or the like.

More specifically, examples of the benzophenone-based initiators include 2-benzoyl benzoic acid, 2-chlorobenzophenone, 4,4'-dichlorobenzo-phenone, 4-benzoyl-4'-methyldiphenyl sulfide, and p,p'-bisdiethylaminobenzophenone.

Examples of the thioxanthone-based initiators include 2,4-diethylthioxanthen-9-one, 2-chlorothioxanthone, and 2-isopropylthioxanthone, or the like.

Examples of the benzyl-based initiators include benzyl, (±)-camphor-quinone, and p-anisyl.

These photo-polymerization initiators may be used alone or in combination of two or more kinds.

—Thermal Polymerization Initiator—

The commercially available thermal polymerization initiators include azo-based initiators, such as V-30, V-40, V-59, V601, V65, V-70, VF-096, VE-73, VAm-110 and VAm-111 (trade names, all manufactured by Wako Pure Chemical Industries), OTA$_{ZO}$-15, OTA$_{ZO}$-30, AIBM, AMBN, ADVN and ACVA (trade names, all manufactured by Otsuka Chemical Co., Ltd.); PERTETRA A, PERHEXA HC, PERHEXA C, PERHEXA V, PERHEXA 22, PERHEXA MC, PERBUTYL H, PERCUMYL H, PERCUMYL P, PERMENTA H, PEROCTA H, PERBUTYL C, PERBUTYL D, PERHEXYL D, PEROYL IB, PEROYL 355, PEROYL L, PEROYL SA, NYPER BW, NYPER BMT-K40/M, PEROYL IPP, PEROYL NPP, PEROYL TCP, PEROYL OPP, PEROYL SBP, PERCUMYL ND, PEROCTA ND, PERHEXYL ND, PERBUTYL ND, PERBUTYL NHP, PERHEXYL PV, PERBUTYL PV, PERHEXA 250, PEROCTA O, PERHEXYL O, PERBUTYL O, PERBUTYL L, PERBUTYL 355, PERHEXYL I, PERBUTYL I, PERBUTYL E, PERHEXA 25Z, PERBUTYL A, PERHEXYL Z, PERBUTYL ZT, and PERBUTYL Z (trade names, all manufactured by NOF CORPORATION), KAYAKETAL AM-C55, TRIGONOX 36-C75, LAUROX, PERKADOX L-W75, PERKADOX CH-50L, TRIGONOX TMBH, KAYACUMENE H, KAYABUTYL H-70, PERKADOX BC-FF, KAYAHEXA AD, PERKADOX 14, KAYABUTYL C, KAYABUTYL D, KAYAHEXA YD-E85, PERKADOX 12-XL25, PERKADOX 12-EB20, TRIGONOX 22-N70, TRIGONOX 22-70E, TRIGONOX D-T50, TRIGONOX 423-C70, KAYAESTER CND-C70, KAYAESTER CND-W50, TRIGONOX 23-C70, TRIGONOX 23-W50N, TRIGONOX 257-C70, KAYAESTER P-70, KAYAESTER TMPO-70, TRIGONOX 121, KAYAESTER O, KAYAESTER HTP-65W, KAYAESTER AN, TRIGONOX 42, TRIGONOX F-C50, KAYABUTYL B, KAYACARBON EH-C70, KAYACARBON EH-W60, KAYACARBON I-20, KAYACARBON BIC-75, TRIGONOX 117, AND KAYALEN 6-70 (trade names, all manufactured by Kayaku Akzo Co., Ltd.), LUPEROX 610, LUPEROX 188, LUPEROX 844, LUPEROX 259, LUPEROX 10, LUPEROX 701, LUPEROX 11, LUPEROX 26, LUPEROX 80, LUPEROX 7, LUPEROX 270, LUPEROX P, LUPEROX 546, LUPEROX 554, LUPEROX 575, LUPEROX TANPO, LUPEROX 555, LUPEROX 570, LUPEROX TAP, LUPEROX TBIC, LUPEROX TBEC, LUPEROX JW, LUPEROX TAIC, LUPEROX TAEC, LUPEROX DC, LUPEROX 101, LUPEROX F, LUPEROX DI, LUPEROX 130, LUPEROX 220, LUPEROX 230, LUPEROX 233, AND LUPEROX 531 (trade names, all manufactured by ARKEMA YOSHITOMI, LTD.).

Among them, when using an azo-based polymerization initiator having a molecular weight of 250 or more, homogeneous reaction is progressed at a low temperature, and therefore a film having excellent homogeneity and high strength is formed. More preferably, the molecular weight of the azo-based polymerization initiator is 250 or more and even more preferably 300 or more.

The total content of photo-curing catalyst or thermal polymerization initiator is from 0.1% by weight to 10% by weight, preferably from 0.1% by weight to 8% by weight, even more preferably from 0.1% by weight to 5% by weight with respect to the total solid content of the coating liquid for layer-formation.

Other Additives

The curing film forming the protective layer 5 may be further used by mixing other coupling agents, in particular, a fluorine-containing coupling agent for the purposes of adjusting film-fowling property, flexibility, lubricity and adhesion. Examples of the compounds that are used include various silane coupling agents and commercially available silicone hard coat agents. Further, a silicon compound having a radical polymerizable group or a fluorine-containing compound may be used.

Examples of the silane coupling agents include vinyl trichlorosilane, vinyl trimethoxysilane, vinyl triethoxysilane, γ-glycidoxypropylmethyldiethoxysilane, γ-glycidoxypropyltriethoxysilane, γ-glycidoxypropyltrimethoxysilane, γ-aminopropyltriethoxysilane, γ-aminopropyltrimethoxysilane, γ-aminopropylmethyldimethoxysilane, N-β-(aminoethyl)-γ-aminopropyltriethoxysilane, tetramethoxysilane, methyltrimethoxysilane, and dimethyldimethoxysilane.

Examples of the commercially available hard coat agents include KP-85, X-40-9740, X-8239 (trade names, all manufactured by Shin-Etsu Chemical Co., Ltd.), AY42-440, AY42-441, and AY49-208 (trade names, all manufactured by Dow Corning Toray Co., Ltd).

For giving water repellency, fluorine-containing compounds such as (tridecafluoro-1,1,2,2-tetrahydrooctyl)-triethoxysilane, (3,3,3-trifluoropropyl)trimethoxysilane, 3-(heptafluoroisopropoxy)propyltriethoxysilane, 1H,1H,2H,2H-perfluoroalkyltriethoxysilane, 1H,1H,2H,2H-perfluorodecyltriethoxysilane, and 1H,1H,2H,2H-perfluorooctyltriethoxysilane may be added.

Silane coupling agents can be used in an arbitrary amount, but the amount of fluorine-containing compounds is preferably 0.25 times or less by weight, with respect to compounds having no fluorine from the viewpoint of film formation of cross-linked films. Further, reactive fluorine-containing compounds disclosed in JP-A No. 2001-166510 may be mixed.

Examples of silicon compounds and fluorine-containing compounds having a radical polymerizable group include compounds described in JP-A No. 2007-11005.

It is desired to add a deterioration preventing agent to a curing film forming protective layer 5 for the purpose of prevention of deterioration due to oxidizing gas, such as ozone and the like, generated in a charging apparatus of the protective layer. When the mechanical strength of the surface of a photoreceptor is improved and the photoreceptor has a long life span, the photoreceptor is brought into contact with oxidized gas for a long time, and so strengthened oxidation resistance may be required in some cases.

As the deterioration preventing agent, hindered phenol-based or hindered amine-based deterioration preventing agents are preferable, and well-known antioxidants such as organic sulfur-based antioxidants, phosphite-based antioxidants, dithiocarbamate-based antioxidants, thiourea-based antioxidants, and benzimidazole-based antioxidants may also be used.

The addition amount of deterioration preventing agent is preferably 20% by weight or less, and more preferably 10% by weight or less.

Examples of the hindered phenol-based antioxidants include IRGANOX 1076, IRGANOX 1010, IRGANOX 1098, IRGANOX 245, IRGANOX 1330, IRGANOX 3114, IRGANOX 1076 (trade names, all manufactured by Ciba Japan KK), and 3,5-di-t-butyl-4-hydroxybiphenyl.

Examples of the hindered amine-based antioxidants include SANOL LS2626, SANOL LS765, SANOL LS770, SANOL LS744 (trade names, all manufactured by Sankyo Lifetech Co., Ltd), TINUVIN 144, TINUVIN 622LD (trade names, all manufactured by Ciba Japan KK), MARK LA57, MARK LA67, MARK LA62, MARK LA68, and MARK LA63 (trade names, all manufactured by Adeka Corporation). Examples of the thioether-based antioxidants include SUMILIZER TPS and SUMILIZER TP-D (trade names, all manufactured by Sumitomo Chemical Co., Ltd.). Examples of the phosphite-based antioxidants include MARK 2112, MARK PEP-8, MARK PEP-24G, MARK PEP-36, MARK 329K and MARK HP-10 (trade names, all manufactured by Adeka Corporation).

Further, for the purpose of lowering residual potential or improving the strength of a protective layer, conductive particles, or organic or inorganic particles may be added to a curing film forming protective layer 5.

Examples of the particles include silicon-containing particles. Silicon-containing particles are particles that contain silicon in the constitutional elements, and specifically include colloidal silica and silicone particles. Colloidal silica used as silicon-containing particles is selected from acidic or alkaline aqueous dispersion, or dispersion or an organic solvent such as alcohol, ketone or ester, with silica having an average particle size from 1 nm to 100 nm dispersed therein, preferably from 10 nm to 30 nm, and commercially available products may be used as the particle.

The solid content of colloidal silica in the protective layer is not especially limited, but the content is generally from 0.1% by weight to 50% by weight based on the total solids content of the protective layer 5, and preferably used in the range of from 0.1% by weight to 30% by weight from the viewpoints of a film-forming property, electrical properties and strength.

The silicone particles used in the silicon-containing particles are selected from silicone resin particles, silicone rubbery particles, and silicone surface-treated silica particles. Generally commercially available silicon-containing particles may be used. The silicone particles are in a spherical form, and the average particle diameter thereof is desirably from 1 to 500 nm, and more preferably from 10 to 100 nm. The silicone particles are chemically inactive small-diameter particles having excellent resin-dispersion property. Furthermore, the content by percentage thereof necessary for obtaining a satisfactory property is low. For these reasons, the surface property of the electrophotographic photoreceptor is improved without hindering the crosslinking reaction. In other words, by the particles cause, the lubricating property and the water repellency of the electrophotographic photoreceptor surface is improved in the state that the particles are uniformly taken in the strong crosslinked structure. Thus, good abrasion resistance and contamination adhesion resistance of the electrophotographic photoreceptor are kept over a long term.

The content by percentage of the silicone particles in the protective layer 5 is preferably from 0.1 to 30% by weight of the whole of solids in the protective layer 5, and more preferably from 0.5 to 10% by weight thereof.

Further, examples of other particles include fluorine-based particles such as particles of ethylene tetrafluoride, ethylene trifluoride, propylene hexafluoride, vinyl fluoride, and vinylidene fluoride, particles containing a resin obtained by copolymerization of a monomer having a hydroxyl group and fluorine resins disclosed in "the Proceedings of The $8^{th}$ Polymer Material Forum, Lecture, p. 89" and semiconductive metal oxides such as $ZnO$—$Al_2O_3$, $SnO_2$—$Sb_2O_3$, $In_2O_3$—$SnO_2$, $ZnO_2$—$TiO_2$, $ZnO$—$TiO_2$, $MgO$—$Al_2O_3$, $FeO$—$TiO_2$, $TiO_2$, $SnO_2$, $In_2O_3$, $ZnO$, and $MgO$. Known dispersants are used for dispersing particles.

For a similar purpose, an oil such as silicone oil may be added to the protective layer. Examples of the silicone oil include ordinary silicone oils such as dimethylpolysiloxane, diphenylpolysiloxane, and phenylmethylsiloxane; reactive silicone oils such as amino-modified polysiloxane, epoxy-modified polysiloxane, carboxyl-modified polysiloxane, carbitol-modified polysiloxane, methacrylic modified polysiloxane, mercapto-modified polysiloxane, and phenol-modified polysiloxane; cyclic dimethylcyclosiloxanes such as hexamethylcyclotrisiloxane, octamethylcyclotetrasiloxane, decamethylcyclopentasiloxane, and dodecamethylcyclohexasiloxane; cyclic methylphenylcyclosiloxanes such as 1,3,5-trimethyl-1,3,5-triphenylcyclotrisiloxane, 1,3,5,7-tetramethyl-1,3,5,7-tetraphenylcyclotetrasiloxane, and 1,3,5,7,9-pentamethyl-1,3,5,7,9-pentaphenylcyclopentasiloxane; cyclic phenylcyclosiloxanes such as hexaphenylcyclotrisiloxane; fluorine-containing cyclosiloxanes such as (3,3,3-trifluoropropyl)methylcyclotrisiloxane; hydrosilyl-group-containing cyclosiloxanes such as a methylhydrosiloxane mixture, pentamethylcyclopentasiloxane, and phenylhydrocyclosiloxane; and vinyl-group-containing cyclosiloxanes such as pentavinylpentamethylcyclopentasiloxane.

A metal, a metal oxide, carbon black and/or some other material may be added to the protective layer. Examples of the metal include aluminum, zinc, copper, chromium, nickel, silver, and stainless steel. A product wherein such a metal is evaporated onto the surfaces of plastic particles may be added to the layer 5. Examples of the metal oxide include zinc oxide, titanium oxide, tin oxide, antimony oxide, indium oxide, bismuth oxide, indium oxide doped with tin, tin oxide doped with antimony or tantalum, and zirconium oxide doped with antimony. These may be used alone or in combination of two or more kinds. When two or more of the oxides are used in combination, they may be simply mixed with each other, or may be mixed into the form of a solid solution or a melted body. The average particle diameter of the conductive particles is desirably 0.3 µm or less, and more desirably 0.1 µm or less from the viewpoint of the transparency of the protective layer.

Composition

It is preferable that the composition which is used for forming the protective layer 5 is prepared as a coating solution for forming a protective layer.

The coating solution for forming a protective layer may be free of solvents, or optionally, the solution may be prepared using an aromatic solvent, such as toluene or xylene, a ketone solvent, such as methyl ethyl ketone, methyl isobutyl ketone, or cyclohexanone, an ester solvent, such as ethyl acetate or butyl acetate, an ether solvent, such as tetrahydrofuran or dioxane, a cellosolve solvent, such as ethylene glycol monomethyl ether, or an alcohol solvent, such as isopropyl alcohol or butanol, alone or as a mixed solvent.

When a coating solution is prepared by the reaction of the above components, they may be merely mixed and dissolved, but preferably they are heated under a condition of from room temperature to 100° C., more preferably from 30° C. to 80° C. for 10 minutes to 100 hours, and still more preferably for 1 hour to 50 hours. At this time, it is also preferable to apply ultrasonic wave. Therefore, a film where homogeneity of the coating liquid is improved and coating defects are suppressed is obtained.

Production of Protective Layer 5

The coating liquid for forming a protective layer is coated on the charge transporting layer 3 forming a coating surface according to an ordinary method, such as a blade coating method, a wire bar coating method, a spray coating method, a dip coating method, a bead coating method, an air knife coating method, a curtain coating method, or ink jet coating method.

After that, light, electron beams or heat is applied to the obtained film and radical polymerization occurs to polymerize and cure the film.

When the film is polymerized and cured by heat, the heating condition is preferably 50° C. or higher. If the temperature is lower than this temperature, reaction is likely to be insufficient and the duration of the life of the cured film is short, which is not preferable. In particular, it is preferable that the heating temperature is from 100° C. to 180° C., from the viewpoints of strength, electrical properties, and surface homogeneity of the photoreceptor.

Further, when the film is polymerized and cured by light, curing film is obtained by known irradiation methods such as mercury lamps or metal halide lamp.

In the polymerization and curing reaction as above, the reaction is carried out in a vacuum or an inert gas atmosphere of oxygen concentration of preferably 10% or less, more preferably 5% or less, still more preferably 2% or less, and most preferably low oxygen concentration of 500 ppm or lower, so that a chain reaction can be performed without the deactivation of radicals generated by light, electron beams or heat.

In this embodiment, if the reaction is carried out too rapidly, it is difficult to bring about structural relaxation of the film by cross-linking, and unevenness and wrinkles on the film are liable to occur. Accordingly, it is preferable to use a curing method by heating in which radical is relatively slowly generated. Structural relaxation of the film is promoted by the combination of polymer (a) according to the exemplary embodiment with curing by heating, and a protective layer 5 (outermost layer) with excellent surface properties can be obtained.

The thickness of the protective layer 5 is preferably from 3 μm to 40 μm and more preferably 5 μm to 35 μm.

The example of a function-separation type photosensitive layer has been explained above with reference to electrophotographic photoreceptor 7A shown in FIG. 1, but is the same manner as a function-separation type electrophotographic photoreceptor 7B shown in FIG. 2

In the case of a single photosensitive layer 6 of electrophotographic photoreceptor 7 C shown in FIG. 3, the following embodiment is preferable. That is, the content of a charge generating material in the single photosensitive layer 6 is 5% by weight to 50% by weight, and preferably 10% by weight to 40% by weight or less, and even more preferably from 15% by weight to 35% by weight, with respect to the total solid content of the composition when the protective layer 5 is formed from the viewpoint of film strength.

The method of forming the single photosensitive layer 6 is the same as the forming methods of the charge generating layer 2 and the charge transporting layer 3. The thickness of the single photosensitive layer 6 is preferably from 5 μm to 50 μm or less or the like, and more preferably from 10 μm to 40 μm.

The exemplary embodiment in which the outermost layer is the protective layer 5 is described, but in the case where the protective layer 5 is not present, the charge transporting layer 40 positioned on the outermost surface in the layer constitution is the outermost layer.

When the outermost layer is a charge transporting layer, the thickness of the layer is preferably from 7 μm to 70 μm, and more preferably 10 μm to 60 μm.

<Conductive Substrate>

Examples of the conductive substrate 4 include metal plates, metal drums, and metal belts using metals such as aluminum, copper, zinc, stainless steel, chromium, nickel, molybdenum, vanadium, indium, gold, platinum or alloys thereof. Examples of the conductive substrate 4 include papers, plastic films and belts which are coated, deposited, or laminated with a conductive compound such as a conductive polymer and indium oxide, a metal such as aluminum, palladium and gold, or alloys thereof.

The term "conductive" means that the volume resistivity is less than $10^{13}$ Ωcm.

When the electrophotographic photoreceptor 7A is used in a laser printer, the surface of the conductive substrate 4 is preferably roughened so as to have a centerline average roughness (Ra) of from 0.04 μm to 0.5 μm in order to prevent interference fringes which are formed when irradiated by laser light. If Ra is in the range of the above, the surface may exhibit a satisfactory interference prevention effect, and roughness of the image quality tends to be suppressed. When an incoherent light source is used, surface roughening for preventing interference pattern is not necessary, and occurrence of defects due to the irregular surface of the conductive substrate 4 can be suppressed to achieve a long life. Desired examples of the method for roughening the surface include wet honing performed by spraying a suspension wherein an abrasive agent is suspended in water onto the support, centerless grinding, wherein the support is brought into contact with a rotating grinding stone under pressure to attain grinding continuously, and anodic oxidation treatment.

An additional desired example of the surface-roughening method is a method of dispersing electroconductive or semi-electroconductive powder into a resin, and making the powder-dispersed product into a layer on the support surface, thereby making the electroconductive substrate 4 rough through the particles dispersed in the layer without roughening the substrate 4 surface directly.

In the surface-roughening treatment by anodic oxidation, an oxide film is formed on an aluminum surface by anodizing the aluminum as an anode in an electrolyte solution. Examples of the electrolyte solution include a sulfuric acid solution and an oxalic acid solution. However, the porous anodic oxide film formed by anodic oxidation is chemically active as is, easily contaminated and has a large resistance variation due to the environment. Therefore, it is preferable to conduct a sealing treatment in which fine pores of the anodic oxide film are sealed by cubical expansion caused by a hydration in pressurized water vapor or boiled water (to which a metallic salt such as nickel salt may be added) to transform the anodic oxide into a more stable hydrated oxide.

The thickness of the anodic oxide film is preferably 03 μm to 15 μm. When the thickness of the anodic oxide film is within the above range, the barrier property against injection tends to be exhibited, and further increase of the residual potential due to repeated use tends to be suppressed.

The conductive substrate 4 may be subjected to a treatment with an acidic aqueous solution or a boehmite treatment. The treatment with an acidic treatment liquid including phosphoric acid, chromic acid and hydrofluoric acid is carried out as follows: phosphoric acid, chromic acid, and hydrofluoric acid are mixed to prepare an acidic treatment solution preferably in a mixing ratio of from 10% by weight to 11% by weight of phosphoric acid, from 3% by weight to 5% by weight of chromic acid, and from 0.5% by weight to 2% by weight of hydrofluoric acid. The concentration of the total acid components is preferably in the range of from 13.5% by weight to 18% by weight. The treatment temperature is preferably from 42° C. to 48° C., and by keeping the treatment temperature high, a thicker film can be obtained more rapidly. The thickness of the film is preferably 0.3 μm to 15 μm. If the thickness of the film is within the above range, the barrier property against injection tends to be exhibited, and increase of the residual potential due to repeated use tends to be suppressed.

The boehmite treatment is carried out by immersing the substrate in pure water at a temperature of from 90° C. to 100° C. for from 5 minutes to 60 minutes, or by bringing it into contact with heated water vapor at a temperature of from 90° C. to 120° C. for from 5 minutes to 60 minutes. The film thickness is preferably from 0.1 μm to 5 μm. The film may further be subjected to anodic oxidation using an electrolyte solution which has low film solubility, such as adipic acid, boric acid, borate salt, phosphate, phthalate, maleate, benzoate, tartrate, and citrate.

<Undercoating Layer>

The undercoating layer 1 includes, for example, a binder resin containing inorganic particles.

As the inorganic particles, powder resistance (volume resistivity) of $10^2$ Ω·cm to $10^{11}$ Ω·cm is preferably used so that the undercoating layer 1 can obtain adequate resistance in order to achieve leak resistance and carrier blocking properties. If the resistance value of the inorganic particles is in the range, sufficient leak resistance and increase in residual potential is suppressed.

Among them, preferable examples of the inorganic particles having the above resistance value include inorganic particles of tin oxide, titanium oxide, zinc oxide, and zirconium oxide, and most preferably, zinc oxide.

The inorganic particles may be those which are subjected to surface treatment. Particles which are subjected to different surface treatments, or those having different particle diameters, may be used in combinations of two or more kinds.

Inorganic particles having a specific surface area (measured by a BET analysis) of 10 $m^2/g$ or more are preferably used. When the specific surface area thereof is 10 $m^2/g$ or more, lowering of the charging properties is suppressed.

The volume average particle diameter of inorganic particles is desirably in the range between 50 nm and 2,000 nm, and more preferably from 60 nm to 1,000 nm.

By including inorganic particles and acceptor compounds, the undercoating layer which is superior in long-term stability of electrical properties and carrier blocking property can be achieved.

The acceptor compound is not limited and any may be used so long as the above desired properties can be obtained, but preferable examples thereof include electron transporting substances such as quinone-based compounds such as chloranil and bromanil, tetracyanoquinodimethane-based compounds, fluorenone compounds such as 2,4,7-trinitrofluorenone and 2,4,5,7-tetranitro-9-fluorenone, oxadiazole-based compounds such as 2-(4-biphenyl)-5-(4-t-butylphenyl)-1,3, 4-oxadiazole, 2,5-bis(4-naphthyl)-1,3,4-oxadiazole, and 2,5-bis(4-diethylaminophenyl)-1,3,4-oxadiazole, xanthone-based compounds, thiophene compounds and diphenoquinone compounds such as 3,3',5,5'-tetra-t-butyl-diphenoquinone, and particularly preferable examples are compounds having an anthraquinone structure. Still more preferable examples are acceptor compounds having an anthraquinone structure such as hydroxyanthraquinone-based compounds, aminoanthraquinone-based compounds, and aminohydroxyanthraquinone-based compounds, and specific examples thereof include anthraquinone, alizarin, quinizarin, anthrarufin, and purpurin.

The content of the acceptor compound is not limited so long as the desired properties can be achieved, but is preferably in the range of from 0.01% by weight to 20% by weight relative to the inorganic particles, more preferably in the range of from 0.05% by weight to 10% by weight from the viewpoints of preventing the accumulation of charge and aggregation of inorganic particles. By suppressing the aggregation of the inorganic particles, irregular formation of conductive channels is suppressed, deterioration of maintainability such as increase in residual potential, or image defects such as black points during repeatedly use, are suppressed.

The acceptor compound may simply be added in the coating liquid for forming the undercoating layer, or may be previously attached to the surface of the inorganic particles.

There are a dry method and a wet method as methods of attaching the acceptor compound to the surface of the inorganic particles.

When a surface treatment is conducted according to a dry method, the acceptor compound is directly or the acceptor compound which is dissolved in an organic solvent is added dropwise, and sprayed thereto together with dry air or nitrogen gas, while the inorganic particles are stirred with a mixer or the like having a high shearing force, whereby the treatment is carried out without causing irregular formation. The addition or spraying is preferably carried out at a temperature equal to or lower than the boiling point of the solvent. If the spraying is carried out at a temperature lower than the boiling point of the solvent, localized distribution of the acceptor compound is suppressed. After the addition or spraying of the acceptor compound, baking is carried out at a temperature of 100° C. or higher. The baking may be carried out as appropriate at a temperature and timing as long as desired electrophotographic properties can be obtained.

When a surface treatment is conducted according to a wet method, the inorganic particles are stirred in a solvent, dispersed in a solvent, using ultrasonic waves, a sand mill, an attritor, a ball mill or the like. Then, after the acceptor compound is added and the mixture is further stirred or dispersed, the solvent is removed, and thereby the treatment is carried out without causing variation. The solvent is removed by filtration or distillation.

After removing the solvent, baking may be carried out at a temperature of 100° C. or higher. The baking is not limited so long as it is at a temperature and timing in which desired electrophotographic properties can be obtained. In the wet method, the moisture contained in the inorganic particles can be removed prior to adding the surface treatment agent. The moisture can be removed by, for example, stirring and heating the mixture in the solvent used for the surface treatment, or by azeotropic removal with the solvent.

The inorganic particles may be subjected to surface treatment before the acceptor compound is supplied to the particles. The agent for the surface treatment may be any agent as far as a desired characteristic can be obtained, and may be selected from known materials. Examples of the agent include a silane coupling agent, a titanate based coupling agent, an aluminum based coupling agent, and a surfactant. In particular, a silane coupling agent is desirably used since the agent gives good electrophotographic characteristics. A silane coupling agent having an amino group is desirably used since the agent gives a good blocking property to the undercoating layer 1.

The silane coupling agents having amino groups may be any compound as long as desired electrophotographic photoreceptor properties can be obtained. Specific examples thereof include γ-aminopropyltriethoxysilane, N-β-(aminoethyl)-γ-aminopropyltrimethoxysilane, N-β-(aminoethyl)-γ-aminopropylmethydimethoxysilane, and N,N-bis(β-hydroxyethyl)-γ-aminopropyltriethoxysilane, but the silane coupling agents are not limited thereto.

The silane coupling agents may be used in combination of two or more kinds thereof. Examples of the silane coupling agents which can be used in combination with the above-described silane coupling agents having an amino group include vinyltrimethoxysilane, γ-methacryloxypropyl-tris-(β-methoxyethoxy)silane, β-(3,4-epoxycyclohexyl)ethyltrimethoxysilane, γ-glycidoxypropyltrimethoxysilane, vinyltriacetoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, N,N-bis(β-hydroxyethyl)-γ-aminopropyltriethoxysilane, and γ-chloropropyltrimethoxysilane, but the silane coupling agents are not limited thereto.

The surface treatment method using the surface treatment agent may be any one as long as it is a known method, and either a dry or a wet method is used. Addition of an acceptor compound and a surface treatment using surface treatment agent such as a coupling agent or the like can be carried out simultaneously.

The content of the silane coupling agent relative to the inorganic particles contained in the undercoating layer 1 is not limited so long as it is within a range in which the desired electrophotographic properties can be obtained, but is preferably from 0.5% by weight to 10% by weight with respect to inorganic particles from the viewpoint of improving dispersibility.

In addition, a binder resin may be contained in the undercoating layer 1.

As the binder resin contained in the undercoating layer 1, any known resin that can form a favorable film and achieve desired properties may be used. Examples thereof include known polymer resin compounds, for example, acetal resins such as polyvinyl butyral; polyvinyl alcohol resins, casein, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenolic resins, phenol-formaldehyde resins, melamine resins and urethane resins; known materials such as a zirconium chelate compound, a titanium chelate compound, an aluminum chelate compound, a titanium alkoxide compound, an organic titanium compound, and a silane coupling agent.

As the binder resin contained in the undercoating layer 1, conductive resins such as charge transportable resin or polyaniline having a charge transporting group may be used. Among them, resins which are insoluble in the coating solvent for the upper layer are preferable, in particular, phenolic resins, phenol-formaldehyde resins, melamine resins, urethane resins, epoxy resins and the like are preferable. When these resins are used in combination of two or more kinds, the mixing ratio can be optionally determined.

The ratio of the inorganic particles imparted with acceptor compounds on the surface (metal oxide imparted with the properties as an acceptor) to the binder resin, or the ratio of the inorganic particles to the binder resin, in the coating solution for forming the undercoating layer, can be appropriately determined within a range in which the desired electrophotographic photoreceptor properties can be obtained.

Various additives may be added to the undercoating layer 1 to improve the electric characteristics, the environmental stability, or the image quality.

As the additives, it is possible to use any known materials such as an electron transporting pigment (for example, a condensed polycyclic pigment or an azo pigment), a zirconium chelate compound, a titanium chelate compound, an aluminum chelate compound, a titanium alkoxide compound, an organic titanium compound, or a silane coupling agent. The silane coupling agent is used for the surface treatment of the inorganic particles as described above; however, the agent may be added, as an additive, into the undercoating-layer-forming coating solution.

Specific examples of the silane coupling agent as the additive include vinyltrimethoxysilane, γ-methacryloxypropyltris(β-methoxyethoxy)silane, β(3,4-epoxycyclohexyl)ethyltrimethoxysilane, γ-glycidoxypropyltrimethoxysilane, vinyltriacetoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, N,N-bis(β-hydroxyethyl)-γ-aminopropyltriethoxysilane, and γ-chloropropyltrimethoxysilane.

Examples of the zirconium chelate compound include zirconiumbutoxide, zirconiummethyl acetoacetate, zirconiumtriethanolamine, acetylacetonate zirconiumbutoxide, ethyl acetoacetate zirconiumbutoxide, zirconium acetate, zirconium oxalate, zirconium lactate, zirconium phosphonate, zirconium octanate, zirconium naphthenate, zirconium laurate, zirconium stearate, zirconium isostearate, methacrylate zirconiumbutoxide, stearate zirconiumbutoxide, and isostearate zirconiumbutoxide.

Examples of the titanium chelate compounds include tetraisopropyl titanate, tetranormalbutyl titanate, butyl titanate dimer, tetra (2-ethylhexyl) titanate, titanium acetyl acetonate, polytitaniumacetyl acetonate, titanium octylene glycolate, titanium lactate ammonium salt, titanium lactate, titanium lactate ethyl ester, titanium triethanol aminate, and polyhydroxy titanium stearate.

Examples of the aluminum chelate compounds include aluminum isopropylate, monobutoxy aluminum diisopropylate, aluminum butylate, diethylacetoacetate aluminum diisopropylate, and aluminum tris (ethylacetoacetate).

These compounds may be used alone, or in the form of a mixture of two or more thereof or in the form of a polycondensate from two or more thereof.

The solvent for preparing the coating solution for forming the undercoating layer may be appropriately selected from known organic solvents such as alcohol-based, aromatic, hydrocarbon halide-based, ketone-based, ketone alcohol-based, ether-based, and ester-based solvents.

Specific Examples of the solvent include ordinary organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

These solvents may be used alone or in the form of a mixture of two or more thereof. Any solvent may be used as a mixed solvent as far as the mixed solvent is able to dissolve a binder resin.

As a method of dispersing inorganic particles in preparing the coating solution for forming an undercoating layer, well-known methods such as using a roll mill, a ball mill, a vibration ball mill, an attritor, a sand mill, a colloid mill, or a paint shaker are used.

Further, as the coating method in providing the undercoating layer 1, ordinary methods such as a blade coating method, a wire bar coating method, a spray coating method, a dip coating method, a bead coating method, an air knife coating method, and a curtain coating method are used.

The undercoating layer-forming coating solution obtained as described above is used to form the undercoating layer 1 on the electroconductive substrate.

The Vickers hardness of the undercoating layer 1 is preferably 35 or more.

The thickness of the undercoating layer 1 can be optionally determined so long as desired properties can be obtained, but is preferably 15 μm or more, more preferably from 15 μm to 50 μm.

When the thickness of the undercoating layer 1 is within the above range, leak resistance properties are sufficiently improved, residual potential is reduced during long-term use and defects in image density is suppressed.

The surface roughness of the undercoating layer 1 (average roughness of ten point) is adjusted such that the wavelength λ of the laser for exposure is from from (¼)n (n represents a refractive index of the upper layer) to (½)λ, in order to prevent a moire image.

Particles of a resin or the like may also be added to the undercoating layer for adjusting the surface roughness thereof. Examples of the resin particles include silicone resin particles and cross-linking polymethyl methacrylate resin particles.

The surface of the undercoating layer may be subjected to grinding for adjusting the surface roughness thereof. Methods such as buffing, sandblast treatment, wet honing, grinding treatment and the like can be used for grinding. When incoherent light sources such as LED and organic EL image array are used, flat and smooth surfaces may be used, film defects or image failure caused by exposure to the surface of the substrate is suppressed, and thus it is preferable.

The undercoating layer 1 can be obtained by drying the undercoating layer-forming coating solution coated on the conductive substrate 4, and generally drying is performed at a temperature capable of evaporating the solvents and forming a film.

<Charge Generating Layer>

The charge generating layer 2 contains a charge generating material and a binder resin. The charge generating layer may be formed as a deposited film having no binder resin. In particular, when incoherent light sources such as LEDs and organic EL image arrays are used, it is preferable.

Examples of the charge generating material include azo pigments such as bisazo and trisazo pigments, condensed aromatic pigments such as dibromoantanthrone, perylene pigments, pyrrolopyrrole pigment, phthalocyanine pigment, zinc oxides, and trigonal selenium. Among them, for laser exposure in the near-infrared region, preferable examples of charge generating material are metal or nonmetal phthalocyanine pigments, and more preferably hydroxy gallium phthalocyanine disclosed in JP-A No. 5-263007 and JP-A No. 5-279591, chlorogallium phthalocyanine disclosed in JP-A No. 5-98181, dichlorotin phthalocyanine disclosed in JP-A Nos. 5-140472 and 5-140473, and titanyl phthalocyanine disclosed in JP-A No. 4-189873. For laser exposure in the near-ultraviolet region, preferable examples of charge generating material are condensed aromatic pigments such as dibromoantanthrone, thioindigo-based pigments, porphyrazine compounds, zinc oxides, trigonal selenium, and bisazo pigment disclosed in JP-A No. 2004-78147 and JP-A No. 2005-181992.

The binder resin used in the charge generating layer 2 can be selected from a wide range of insulating resins, and from organic photoconductive polymers such as poly-N-vinyl carbazole, polyvinyl anthracene, polyvinyl pyrene, and polysilane. Preferable examples of the binder resin include polyvinyl butyral resins, polyarylate resins (polycondensates of bisphenols and aromatic divalent carboxylic acid or the like), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, casein, polyvinyl alcohol resins, and polyvinyl pyrrolidone resins. These binder resins may be used alone or in combination of two or more kinds thereof. The mixing ratio of the charge generating material and binder resin is preferably in the range of from 10/1 to 1/10 in terms of weight ratio. The term "insulating" means that the volume resistivity is $10^{13}$ Ωcm or more.

The charge generating layer 2 may be formed using a coating solution for forming charge generating layer in which the above-described charge generating materials and binder resins are dispersed in a given solvent, or may be formed as a deposited film having no the binder resin.

Examples of the solvent used for dispersion include methanol, ethanol, n-propanol, n-butanol, benzyl alcohol, methyl cellosolve, ethylcellosolve, acetone, methyl ethyl ketone, cyclohexanone, methyl acetate, n-butyl acetate, dioxane, tetrahydrofuran, methylene chloride, chloroform, chlorobenzene, and toluene. These solvents may be used alone or in the form of a mixture of two or more thereof.

The method for dispersing the charge generating material and the binder resin into the solvent may be an ordinary method, such as a ball mill dispersing method, an attriter dispersing method, or a sand mill dispersing method. According to such a method, the crystal form of the charge generating material is prevented from being changed by dispersion.

At the time of the dispersion, it is effective to adjust the average particle diameter of the charge generating material to be 0.5 μm or less, preferably 0.3 μm or less, and more preferably 0.15 μm or less.

When the charge generating layer 2 is formed, an ordinary coating method is used, examples thereof including blade coating, Meyer bar coating, spray coating, dip coating, bead coating, air knife coating and curtain coating.

The film thickness of the thus-obtained charge generating layer 2 is preferably from 0.1 to 5.0 μm, and more preferably from 0.2 to 2.0 μm.

<Charge Transporting Layer>

When the charge transporting layer 3 of the electrophotographic photoreceptor contains polymer (a) including a partial structure represented by the (1) and (2) respectively, the charge transporting layer 3 is formed by containing a charge transportable materials and binder resin or polymer transportable materials.

Examples of the charge transportable material include electron transporting compounds such as quinone-based compounds such as p-benzoquinone, chloranil, bromanil and anthraquinone; tetracyanoquinodimethane-based compounds, fluorenone compounds such as 2,4,7-trinitrofluorenone, xanthone-based compound, benzophenone-based compound, cyanovinyl-based compounds, and ethylene-based compounds; and hole transportable compounds such as triaryl amine-based compounds, benzidine-based compounds, arylalkane-based compounds, aryl-substituted ethylene-based compounds, stilbene-based compounds, anthracene-based compounds, and hydrazone-based compounds. These charge transportable materials may be used alone or in combination of two or more kinds.

From the viewpoint of charge mobility, the charge transporting material is preferably a triarylamine derivative represented by a structural formula (a-1) illustrated below or a benzidine derivative represented by a structural formula (a-2) illustrated below.

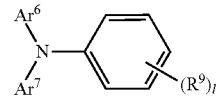

(a-1)

In formula (a-1), $R^9$ represents a hydrogen atom or a methyl group, —C($R^{10}$)=C($R^{11}$)($R^{12}$), or —CH=CH—CH=C($R^{13}$)($R^{14}$). l represents 1 or 2; each of $Ar^6$ and $Ar^7$ independently represents a substituted or unsubstituted aryl group, —C$_6$H$_4$—C($R^{10}$)=C($R^{11}$)($R^{12}$), or —C$_6$H$_4$—CH=CH—CH=C($R^{13}$)($R^{14}$); and each of $R^{10}$ to $R^{14}$ independently represents a hydrogen atom, a substituted or unsubstituted alkyl group, or a substituted or unsubstituted aryl group.

Examples of the substituents of each of the above groups include a halogen atom, an alkyl group having 1 to 5 carbon atoms, an alkoxy group having 1 to 5 carbon atoms, and a substituted amino group substituted with an alkyl group having 1 to 3 carbon atoms.

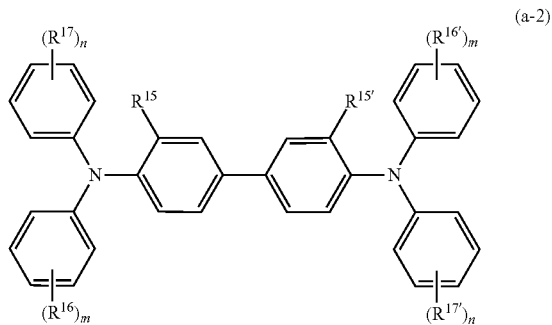

(a-2)

In the structural silicon (a-2), $R^{15}$ and $R^{15'}$ each independently represent a hydrogen atom, a halogen atom, an alkyl group having 1 to 5 carbon atoms, or an alkoxy group having 1 to 5 carbon atoms; $R^{16}$, $R^{16'}$, $R^{17'}$ each independently represent a hydrogen atom, a halogen atom, an alkyl group having 1 to 5 carbon atoms, an alkoxy group having 1 to 5 carbon atoms, an amino group substituted with an alkyl group having one or two carbon atoms, a substituted or unsubstituted aryl group, —C($R^{18}$)=C($R^{19}$)($R^{20}$), or —CH=CH—CH=C($R^{21}$)($R^{22}$) wherein $R^{18}$ to $R^{22}$ each independently represent a hydrogen atom, a substituted or unsubstituted alkyl group, or a substituted or unsubstituted aryl group; and m and n each independently represent an integer of 0 to 2.

Among the triarylamine derivatives represented by the formula (a-1) and the benzidine derivatives represented by the formula (a-2), triarylamine derivatives having "—$C_6H_4$—CH=CH—CH=C($R^{13}$)($R^{14}$)" and benzidine derivatives having "—CH=CH—CH=C($R^{21}$)($R^{22}$)" are particularly preferable because they are excellent in charge mobility, adhesion to the protective layer, and prevention of residual image (hereinafter, also referred to as "ghosting") caused by the trace of the preceding image.

Examples of the binder resin used in the charge transporting layer 3 include polycarbonate resins, polyester resins, polyarylate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone alkyd resins, phenol-formaldehyde resins, styrene-alkyd resins, poly-N-vinyl carbazole and polysilane. Polyester-based high molecular charge transporting materials disclosed in JP-A Nos. 8-176293 and 8-208820, having high charge transporting properties, are particularly preferable. Among these, polycarbonate resins and polyarylate resins are excellent in charge transportability and mutual compatibility with charge transporting materials, and so are preferable.

These binder resins may be used alone or in combination of two or more kinds thereof. The mixing ratio between the charge transporting material and the binder resin is preferably 10:1 to 1:5 in terms of weight ratio.

For providing a protective layer 5 containing a cured film of the composition containing reactive charge transporting materials (α) and polycarbonate resins on the charge transporting layer 3, it is preferable for the binder resin used in the charge transporting layer 3 to have a viscosity average molecular weight of 50,000 or more, and more preferably 55,000 or more. By using the binder resin having such a molecular weight, an excellent adhesive property and cracking resistance in forming a protective layer can be obtained, and so is preferable.

Incidentally, the upper limit of the viscosity average molecular weight of the binder resin for use in the charge transporting layer 3 is preferably 100,000 or less from the viewpoint of coating film uniformity (liquid dripping).

The viscosity average molecular weight of the binder resin in this embodiment is a value measured with a capillary viscometer.

For the same reason, when the outermost layer is a charge transporting layer, the viscosity average molecular weight of the binder resin contained in the lower layer thereof is preferably in the above range.

As the charge transporting material, polymer charge transport materials can also be used. As the polymer charge transporting material, known materials having charge transporting properties such as poly-N-vinyl carbazole and polysilane can be used. Polyester-based polymer charge transporting materials disclosed in JP-A Nos. 8-176293 and 8-208820 having high charge transporting properties compared with other types, are particularly preferable. Polymer charge transporting materials can form a film independently, but may also be mixed with the above-described binder resin to form a film.

The charge transporting layer 3 can be formed using the coating solution for forming the charge transporting layer containing the above-described constituents.

Examples of the solvent used for the coating solution for forming the charge transporting layer include ordinary organic solvents such as aromatic hydrocarbons such as benzene, toluene, xylene and chlorobenzene, ketones such as acetone and 2-butanone, aliphatic hydrocarbon halides such as methylene chloride, chloroform and ethylene chloride, cyclic or straight-chained ethers such as tetrahydrofuran and ethyl ether. These solvents may be used alone or in combination of two or more kinds thereof. Known methods can be used for dispersing the above-described constituents.

For applying the coating solution for forming the charge transporting layer onto the charge generating layer 2, ordinary methods such as blade coating, Meyer bar coating, spray coating, dip coating, bead coating, air knife coating and curtain coating can be used.

The film thickness of the charge transporting layer 3 is preferably 5 μm to 50 μm and more preferably 10 μm to 30 μm.

The charge transporting layer 3 may have an organic compound layer containing polymer (a) including a partial structure represented by the above (1) and (2) respectively.

(Image Forming Apparatus/Processing Cartridge)

Figure 4:
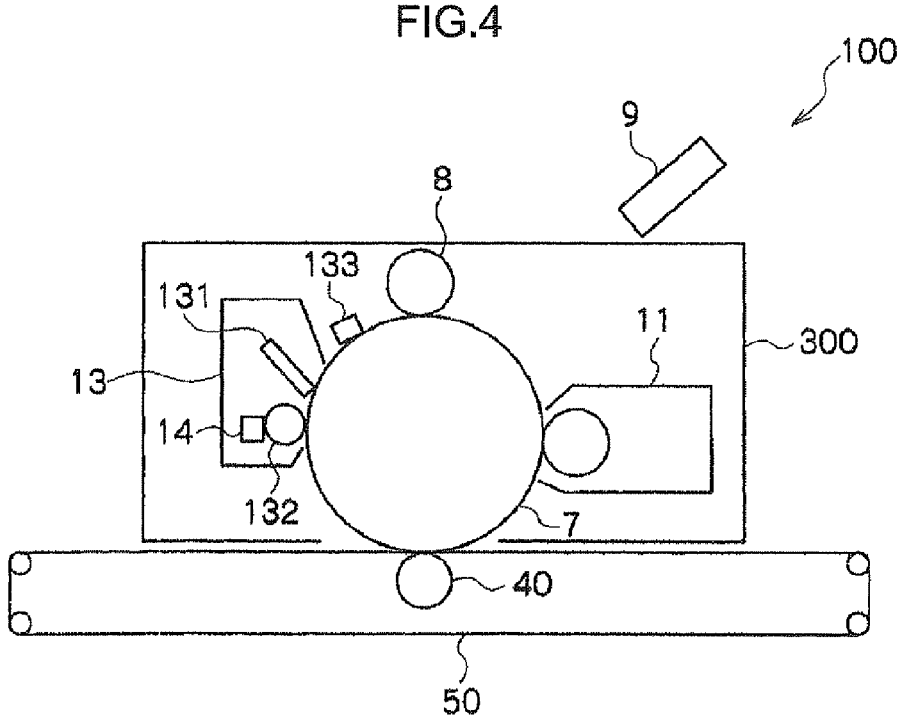
FIG. 4 is a schematic diagram illustrating one example of a configuration of a process cartridge according to an exemplary embodiment of the invention.

FIG. 4 is a schematic configuration diagram showing an image forming apparatus 100 according to an exemplary embodiment of the invention.

As shown in FIG. 4, the image forming apparatus 100 includes a processing cartridge 300 equipped with electrophotographic photoreceptor 7, an exposure device (electrostatic latent image forming unit) 9, a transfer device (transfer unit) 40, and an intermediate transfer medium 50. In the image forming apparatus 100, the exposure device 9 is arranged so as to irradiate the electrophotographic photoreceptor 7 through the opening of the processing cartridge 300, the transfer device 40 is arranged so as to oppose the electrophotographic photoreceptor 7 via the intermediate transfer medium 50, and the intermediate transfer medium 50 is arranged so as to partially contact with the electrophotographic photoreceptor 7.

The processing cartridge 300 in FIG. 4 integrally supports the electrophotographic photoreceptor 7, the charging device (charging unit) 8, a developing device (developing unit) 11 and a cleaning device 13, in a housing. The cleaning device 13 has a cleaning blade (cleaning member). The cleaning blade 131 is disposed so as to contact the surface of the electrophotographic photoreceptor 7. Incidentally, instead of the embodiment of cleaning blade 131, the cleaning member maybe a conducting or insulating fibrous member, and may be used alone, or in combination with the blade.

In FIG. 4, an example of the cleaning device 13 is shown, which is equipped with fibrous member 132 (roll shape) feeding lubricant 14 to the surface of photoreceptor 7, and which uses a fibrous member 133 (flat brush shape) to assist cleaning, these members being used according to necessity.

As the charging device 8, for example, a contact type charging device using a conductive or semiconductive charging roller, a charging brush, a charging film, a charging rubber blade, a charging tube or the like can be used. Known charging devices such as a non-contact type roller charging device using a charging roller near the electrophotographic photoreceptor, and scorotron or corotron charging devices utilizing corona discharge, can also be used.

When scorotron charging devices are used, in order to prevent discharge materials attached to the charging devices from being released to the electrophoto graphic photoreceptor, shielding may be provided between the electrophotographic photoreceptor and the charging device when the charging device is not being used.

Although not shown, in order to improve the stability of the image, a photoreceptor heating member may be provided around the electrophotographic photoreceptor 7 thereby increasing the temperature of the electrophotographic photoreceptor 7 and reducing the relative humidity.

Examples of the exposure device 9 include optical instruments which can expose the surface of the photoreceptor 7 to form a desired image using light such as a semiconductor laser, an inorganic LED, an organic EL, a liquid-crystal shutter light or the like. The wavelengths of the light sources to be used are within the range of the spectral sensitivity region of the photoreceptor. As the semiconductor laser light, near-infrared light having an oscillation wavelength in the vicinity of 780 nm is used. However, the wavelength of the light source is not limited to the above-described wavelength, and lasers having an oscillation wavelength on the order of 600 nm and blue lasers having an oscillation wavelength in the vicinity of from 400 nm to 450 nm can also be used. Surface-emitting type laser light sources which are capable of performing multi-beam output are effective in forming a color image.

As the developing device 11, for example, an ordinary developing device, in which a magnetic or non-magnetic one- or two-component developer is contacted or not contacted for development, can be used. Such a developing device is not particularly limited as long as it serves the above-described functions, and can be selected in accordance with the intended use. Examples thereof include known developing devices in which the one- or two-component developer is applied to the photoreceptor 7 using a brush, a roller, or the like.

A toner to be used in the developing device 11 will be described below.

The toner particles preferably have an average shape factor ($ML^2/A \times \pi/4 \times 100$, in which ML represents the maximum length of a toner particle and A represents the projection area of the toner particle.) of from 100 to 150, more preferably from 105 to 145 and even more preferably from 110 to 140.

Furthermore, the volume-average particle diameter of the toner particles is preferably from 3 μm to 12 μm, more preferably from 3.3 μm to 10 μm, further preferably from 3.5 μm to 9 μm. By using such toner particles satisfying the above-described average shape factor and volume-average particle diameter, high developability, transferring property, and high quality images can be obtained in comparison with other toners.

The toner may be a toner produced by any method as far as the toner satisfies the average shape coefficient and volume-average particle diameter requirements. The toner may be, for example, a toner produced by the following method: a kneading pulverizing method of kneading a binder resin, a colorant, a releasing agent, and optional components such as a charge control agent, and pulverizing these components, and classifying the resultant particles; a method of changing the shape of the particles obtained by the kneading pulverizing method by mechanical impact force or thermal energy; an emulsion polymerization aggregation method of emulsion-polymerizing a polymerizable monomer for obtaining a binder resin, mixing the produced liquid dispersion and a liquid dispersion containing a colorant, a releasing agent, and optionally a charge control agent and others with each other, aggregating the mixture, and heating/melt-bonding the aggregated particles to obtain toner particles; a suspension polymerization method of suspending a polymerizable monomer for obtaining a binder resin, a colorant, a releasing agent, and optionally a solution of a charge control agent and others into an aqueous solvent and polymerizing the monomer; or a dissolution suspension method of suspending a solution of a binder resin, a colorant, a releasing agent, and an optionally a charge control agent and others into an aqueous solution to produce particles.

Moreover, known methods such as a production method having a core-shell structure may be used, in which aggregated particles are further attached using the toner particles obtained by the above-described method, as the core, then heated and fused. As the method of producing toner particles, a suspension-polymerization method, an emulsion polymerization aggregation method, and a dissolution suspension method, all of which are carried out in an aqueous solvent are preferable, and an emulsion polymerization aggregation method is more preferable from the viewpoints of regulation of the shape and particle size distribution.

Toner mother particles include a binder resin, a coloring agent and a releasing agent, and optionally, further include silica and a charge control agent.

Examples of the binder resins used in the toner mother particles include monopolymers and copolymers of styrenes such as styrene and chlorostyrene, monoolefins such as ethylene, propylene, butylene, and isoprene, vinyl esters such as vinyl acetate, vinyl propionate, vinyl benzoate, and vinyl butyrate; a -methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; and vinyl ketones such as vinyl methyl ketone, vinyl hexyl ketone, and vinyl isopropenyl ketone, and polyester resins synthesized by copolymerization of dicarboxylic acids and diols.

Examples of the typical binder resins include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene and polyester resins. Other examples include polyurethane, epoxy resins, silicone resins, polyamide, modified rosin and paraffin wax.

Examples of the typical coloring agents include magnetic powder such as magnetite and ferrite, carbon black, aniline blue, chalcoyl blue, chrome yellow, ultramarine blue, Du Pont oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Yellow 17, C. I. Pigment Blue 15:1, and C. I. Pigment Blue 15:3.

Examples of the typical releasing agents include low-molecular polyethylene, low-molecular polypropylene, Fischer-Tropsch wax, montan wax, carnauba wax, rice wax and candelilla wax.

As the charge control agent, known agents such as azo metal-complex compounds, metal-complex compounds of salicylic acid, and resin-type charge control agents having polar groups can be used. When toner particles are produced by a wet method, it is preferable to use materials not easily soluble in water from the viewpoints of regulating ion strength and reducing waste water contamination. The toner may be either a magnetic toner which contains a magnetic material or a non-magnetic toner which contains no magnetic material.

The toner used in the developing device 11 can be produced by mixing the above-described toner mother particles and external additives using a Henschel mixer, a V blender or the like. When the toner mother particles are produced by a wet method, external additives can be added by a wet method.

Toner used in the developing device 11 may have particles having a fluorine atom.

As the particles having a fluorine atom, carbon fluoride including balek lead and graphite to which fluorine is bonded, polyethylene tetrafluoride resin (PTFE), perfluoroalkoxy.fluorocarbon resin (PFA), ethylene tetrafluoride.propylene hexafluoride copolymer (FEP), ethylene.ethylene tetrafluoride copolymer (ETFE), polychloroethylene trifluoride (PCTFE), vinylidene fluoride (PVDF), and vinyl fluoride (PVF) can be used.

The average diameter of a particle having a fluorine atom is preferably from 0.1 μm to 10 μm, and those having the above-described chemical structure may be ground into particles having the same particle diameter.

The content of the particles having a fluorine atom in the toner is preferably in the range of from 0.05% by weight to 2.0% by weight, more preferably 0.05% by weight to 1.5% by weight. When the content is within this range, friction coefficient is in a preferable range, and thus ghosting is suppressed or the generation of reverse polarity toner from suitable toner charge properties is suppressed.

Lubricant particles may be added to the toner used in the developing device 11. Examples of the lubricant particles include solid lubricants such as graphite, molybdenum disulfide, talc, fatty acids and metal salts of fatty acids, low molecular weight polyolefins such as polypropylene, polyethylene and polybutene, silicones having a softening point by heating, fatty-acid amides such as oleic acid amide, erucic acid amide, ricinoleic acid amide and stearic acid amide, vegetable waxes such as camauba wax, rice wax, candelilla wax, Japan wax and jojoba oil, animal waxes such as beeswax, mineral and petroleum waxes such as montan wax, ozokerite, ceresine, paraffin wax, microcrystalline wax and Fischer-Tropsch wax, and modified products thereof. These may be used alone or in combination of two or more kinds thereof.

The average particle diameter of the lubricant particles is preferably in the range of from 0.1 μm to 10 μm, and those having the above-described chemical structure may be ground into particles having the same particle diameter. The content of the lubricant particles in the toner is preferably in the range of from 0.05% by weight to 2.0% by weight, more preferably from 0.1% by weight to 1.5% by weight.

Inorganic particles, organic particles or composite particles to which inorganic particles are attached to the organic particles may be added to the toner particles used in the developing device 11 for the purpose of removing a deposition or a deterioration-inducing substance from the surface of an electrophotographic photoreceptor.

Examples of the appropriate inorganic particles include various inorganic oxides, nitrides and borides such as silica, alumina, titania, zirconia, barium titanate, aluminum titanate, strontium titanate, magnesium titanate, zinc oxide, chromium oxide, cerium oxide, antimony oxide, tungsten oxide, tin oxide, tellurium oxide, manganese oxide, boron oxide, silicon carbide, boron carbide, titanium carbide, silicon nitride, titanium nitride and boron nitride.

The above-described inorganic particles may be treated with titanium coupling agents such as tetrabutyl titanate, tetraoctyl titanate, isopropyltriisostearoyl titanate, isopropyltridecylbenzenesulfonyl titanate and bis(dioctylpyrophosphate)oxyacetate titanate; silane coupling agents such as γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)γ-aminopropyltrimethoxysilane hydrochloride, hexamethyldisilazane, methyltrimethoxysilane, butyltrimethoxysilane, isobutyltrimethoxysilane, hexyltrimethoxysilane, octyltrimethoxysilane, decyltrimethoxysilane, dodecyltrimethoxysilane, phenyltrimethoxysilane, o-methylphenyltrimethoxysilane and p-methylphenyltrimethoxysilane. The above-described particles hydrophobized with metal salts of higher fatty acids such as silicone oil, aluminum stearate, zinc stearate and calcium stearate are also preferably used.

Examples of the organic particles include styrene resin particles, styrene acrylic resin particles, polyester resin particles, urethane resin particles, polyethylene tetrafluoride resin (PTFE), perfluoroalkoxy.fluorine resin (PFA), ethylene tetrafluoride.propylene hexafluoride copolymer (FEP), ethylene.ethylene tetrafluoride copolymer (ETFE), polychloroethylene trifluoride (PCTFE), vinylidene fluoride (PVDF), and vinyl fluoride (PVF).

The particle diameter based on the number average particle diameter is preferably from 5 nm to 1000 nm, more preferably from 5 nm to 800 nm, further preferably from 5 nm to 700 nm. If the number average particle diameter is in the range described above, grinding ability is excellent and the occurrence of scratches on the surface of an electrophotographic photoreceptor is suppressed. Further, the total of the content of the above-described particles and lubricant particles is preferably 0.6% by weight or more.

As the other inorganic oxides added to the toner particles, small inorganic oxide having a primary diameter of 40 nm or less are preferably used from the viewpoints of powder mobility and charge control, and inorganic oxide having a larger diameter than that of the small inorganic oxide are preferably added from the viewpoints of adhesiveness reduction and charge control. Known inorganic oxide particles may be used, but the combination of silica and titanium oxide is preferable for precise charge control.

Surface treatment of small inorganic particles enhances the dispersibility and powder mobility of the particles. Furthermore, the addition of carbonates such as calcium carbonate and magnesium carbonate, and inorganic minerals such as hydrotalcite or cerium oxide is also preferably added to remove discharge products.

Color toner particles for electrophotography are used in combination with carriers. Examples of the carrier include iron powder, glass beads, ferrite powder, nickel powder and those with the surface coated with a resin. The mixing ratio of the carriers can be determined optionally.

Examples of the transfer device 40 include known transfer charging devices such as a contact type transfer charging devices using a belt, a roller, a film, a rubber blade, a scorotron transfer charging device and a corotron transfer charging device utilizing corona discharge.

As the intermediate transfer body 50, a belt-shape substance (intermediate transfer belt) made of polyimide, polyamide imide, polycarbonate, polyarylate, polyester, rubber or the like which are imparted with semiconductivity is used. The intermediate transfer body 50 may also take the shape of a drum rather than a belt-shape.

In addition to the above-described devices, the image forming apparatus 100 may further be provided with, for example, a photodischarge device for photodischarging the photoreceptor 7.

FIG. 5 is a schematic block diagram showing an image forming apparatus 120 according to another exemplary embodiment of the invention.

As shown in FIG. 5, the image forming apparatus 120 is a full color image forming apparatus of a tandem type including four processing cartridges 300.

In the image forming apparatus 120, four processing cartridges 300 are disposed parallel with each other on the intermediate transfer body 50, and one electrophotographic photoreceptor can be used for one color. The image forming apparatus 120 has the same constitution as the image forming apparatus 100, except being of a tandem type.

When the electrophotographic photoreceptor of the exemplary embodiment is used in a tandem type image forming apparatus, the electrical properties of the four photoreceptors are stabilized, which provides high image quality with excellent color balance over a long time.

Organic Electroluminescent Device

The organic electroluminescent device will be described below.

Figure 7:
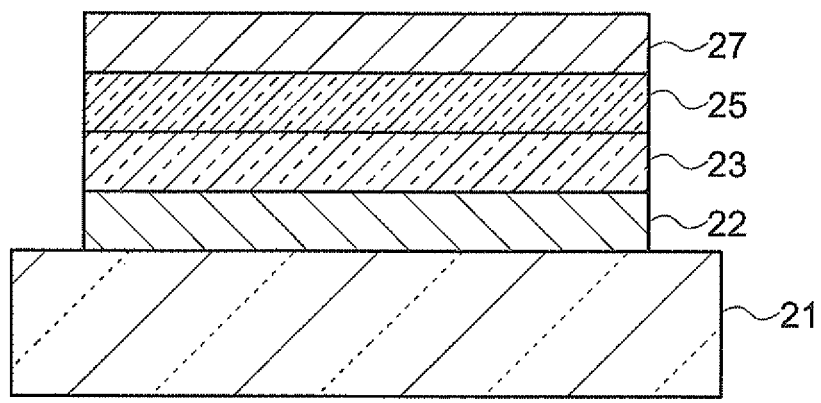
FIG. 7 is a schematic cross-sectional diagram partially illustrating one example of an organic electroluminescent device according to an exemplary embodiment of the invention.
Figure 9:
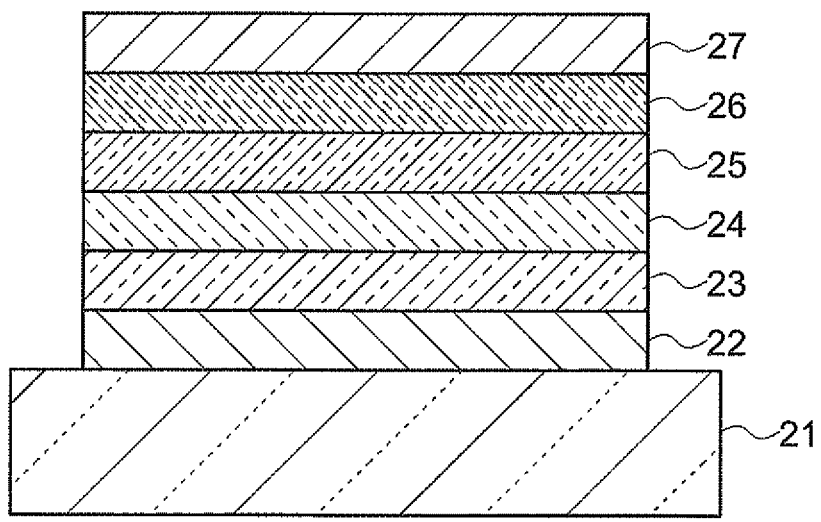
FIG. 9 is a schematic cross-sectional diagram partially illustrating another example of an organic electroluminescent device according to an exemplary embodiment of the invention.

FIGS. 7 and 9 are cross-sectional diagrams illustrating the layer configuration of the organic electroluminescent device of the exemplary embodiment. Reference numeral 21 represents a substrate, reference numeral 22 represents an anode, reference numeral 23 represents a hole injection layer, reference numeral 24 represents a hole transporting layer, reference numeral 25 represents light emission layer, reference numeral 26 represents an electron transporting layer, and reference numeral 27 represents a cathode. However, configuration of the organic EL device of the exemplary embodiment is not limited thereto.

The substrate 21 is a support of the organic electroluminescent device, and a quartz or glass plate, a metal plate or metal foil, or a plastic film or sheet is used. In particular, glass plate or transparent synthetic resin plates such as polyester, polymethacrylate, polycarbonate, or polysulfone are preferable. In a case of using a synthetic resin plate, it may be required that gas barrier properties are noted. When gas barrier properties of the substrate are low, the organic electroluminescent device is deteriorated by external air passing through the substrate, and thus it is not preferable. Therefore, the method is also preferable in which a dense silicon oxide film is provided on one or both sides of the synthetic resin substrate and gas barrier properties are attained.

The anode 22 is provided on the substrate 21. The anode 22 serves to inject holes to the hole injection layer 23. This anode 22 is generally formed of metals such as aluminum, gold, silver, nickel, palladium, platinum, metal oxides of indium and/or tin oxide, halogenated metal such as copper iodide, or carbon black. The anode 22 is generally formed by a sputtering method or a vacuum deposition method in many cases. Further, the anode 22 may be formed by dispersing a metallic fine particle such as silver, a fine particle such as copper iodide, carbon black, an conductive metal oxide fine particle or the like in a suitable binder resin solution, and coating the solution on the surface of the substrate 21.

An anode 22 can also be formed of different material layers.

The thickness of the anode 22 is different depending on the required transparency. Since higher transparency is generally desirable, transmittance of the visible light is normally 60% or larger, preferably 80% or larger. In this case, a thickness is preferably from 10 nm to 1000 nm, more preferably around from 20 nm to 500 nm. When both electrodes are made opaque, for example metal deposition film may be provided, for the purpose of reflecting the light between both electrodes for laser oscillation from one end, the anode 22 may have the same materials as the substrate 21.

Alternatively, different conductive materials may be layered on the surface of the aforementioned anode 22. The hole injection layer 23 is provided on the anode 22 in a device structure shown in FIGS. 1 to 3 as typical examples of the exemplary embodiment. The conditions required for the material used in the hole injection layer 23 are that the hole injection efficiency from the anode 22 is high and that materials are efficiently transferred to the injected hole. Therefore, it is desirable that ionized potential is low, transparency with respect to visible light is high, hole mobility is high, further stability is excellent, and for impurities which become a trap is suppressed during preparation or use. In addition to the general requirement, in a case of considering use for a vehicle installation display, a heat resistance of 100° C. or more, and more preferably 120° C. or more, may be required. Further, in comparison to devices of lower molecular amorphous film, by making the three-dimensional cross-linking charge transportable compound where molecular motion is suppressed and the glass transition temperature is high, into the mother hole injection layer, the heat resistance of device is greatly improved.

In the examplary embodiment, an organic compound layer containing polymer (a) including a partial structure represented by the following formulae (1) and (2) respectively is formed by a general coating method. For example, a case of forming the compound as a hole injection layer will be described. With respect to polymer (a) including a partial structure represented by the following formulae (1) and (2) respectively, binder resin or coating property improving agents where the holes does not act as a trap of a hole optionally may be added in predetermined amounts. Charge transporting materials having an alkoxysilyl group on the end has excellent adhesion with base materials mainly containing inorganic materials and is preferable from the viewpoint of the properties of the obtained organic electroluminescent device. For various purposes, other silane coupling agents, aluminum coupling agents, or titanate coupling agents may be added. These compounds are dissolved to prepare a coating solution at the desirable concentration and the coating solution is coated on the anode 22 by a spin coating method or a dipping method and dryed to form the hole injection layer 23. The thickness of the hole injection layer 23 thus formed is generally from 5 nm to 3000 nm, preferably from 10 nm to 2000 nm.

The light-emitting layer 25 is provided on the hole injection layer 23. In the light-emitting layer 25, electrons injected from the cathode 27 between electrodes provided with electrical fields and holes transferred from the hole injection layer 23 are efficiently re-bonded and are formed from materials which is emitted efficiently by re-bonding. Exemples of materials satisfying these conditions include aluminum complexes of 8-hydroxyquinoline (JP-A No. 59-194393), metal complexes of 10-hydroxybenzo[h]quinoline (JP-A No. 6-322362), bisstyrylbenzene derivatives (JP-A Nos. 1-245087 gazette, 2-222484), bisstyrylarylene derivatives (JP-A No. 2-247278), metal complexes of (2-hydroxyphenyl) benzothiazole (JP-A No. 8-315983), and silol derivatives. These emission layer forming materials are generally formed by layering by a vapor deposition method or a coating method on the hole injection layer 23. When a coating method is used, a solvent which does not substantially dissolve the hole injection layer 23 is preferable, but the lower layer has a three-dimensional cross-linked structure in the exemplary embodiment, and thus resistance to solvents is high. Solvents may be selected from a wide range.

For the purpose of improving the light-emitting efficiency in a device and changing the emitted light color, by using aluminum complexes of 8-hydroxyquinoline as a host material, for example, doping with a laser fluorescent dye such as coumarine and the like is done (J. Appl. Phys., Vol. 65, p. 3610, (1989)). Advantages of this method are that 1) the light-emission efficiency is improved by a fluorescent dye having a high light-emission efficiency, 2) an emitting wavelength can be varied by selecting a fluorescent dye, 3) a fluorescent dye which causes concentration quenching can also be used, 4) a fluorescent dye with which it is difficult to prepare a thin film may be used, for example. Also, for the purpose of improving a driving life of a device, it is effective to dope a fluorescent dye using the aforementioned light-emitting layer material as a host material. The light-emitting property of the device, in particular, the driving stability, can be considerably improved by doping a host material with a naphthacene derivative, a representative of which is rubrene (JP-A No. 4-335087), a quinacridone derivative (JP-A No. 5-70773), a condensed polycyclic aromatic ring such as perylene and the like (JP-A No. 5-198377) into a host material at from 0.1% by weight to 10% by weight, using metal complexes such as aluminum complex of 8-hydroxyquinoline.

As a method of doping a host material of a light-emitting layer 25 with a fluorescent dye such as the aforementioned naphthacene derivative, quinacridone derivative, perylene and the like, there are a method by codeposition and a method of mixing deposition sources at a predetermined concentration in advance. Examples of the light-emitting layer material of polymer systems include polymer materials such as the aforementioned poly(p-phenylenevinylene), poly[2-methoxy-5-(2-ethylhexyloxy)-1,4-phenylenevinilene], poly(3-alkylthiophene) and the like, systems in which a light-emitting material and an electron transferring material are mixed into a polymer such as polyvinylcarbazol and the like. These materials are coated on the hole injection layer 23 by method such as spin coating or dipping coating to form a thin film, similarly to the hole injection layer. When a coating method is used, a solvent which does not substantially dissolve the hole injection layer 23 is preferably used, but in the examplary embodiment, the lower layer is three-dimensionally cross-linked and thus resistance to solvents is high. The solvent is selected among a wide range.

The thickness of the light-emitting layer 25 thus formed is from 10 nm to 200 nm, preferably 30 nm to 100 nm. In order to improve the emission properties of the device, there is a function separation type device where, as shown in FIG. 8, the hole transporting layer 24 is provided between the hole injection layer 23 and the light-emitting layer 25 or further the electron transporting layer 26 is provided between the emission 25 and the cathode 27, as shown in FIG. 9.

Figure 8:
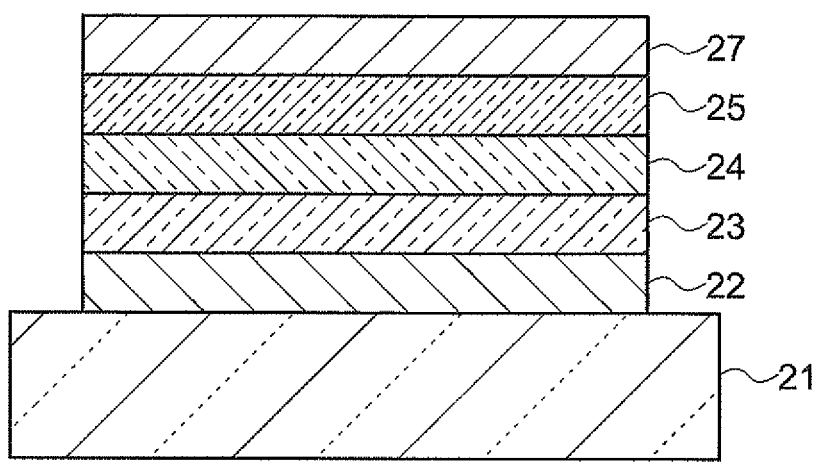
FIG. 8 is a schematic cross-sectional diagram partially illustrating another example of an organic electroluminescent device according to an exemplary embodiment of the invention.

In the function separation type device shown in FIGS. 8 and 9, in regard to the configuration materials of the hole transporting layer 24, there should be high hole injection efficiency from the hole injection layer 23 and the injected holes should be efficiently transferred. Therefore, ionized potential is low, hole mobility is high, stability is excellent, and impurities which becomes a trap is suppressed during preparation or use.

Such a hole transporting material may, for example, be an aromatic diamine compound having tertiary aromatic amine units of 1,1-bis(4-di-p-tolylaminophenyl)cyclohexane connected thereto (JP-A No. 59-194393), an aromatic amine containing at least two tertiary amines represented by 4,4'-bis [N-(1-naphtyl)-N-phenylamino]biphenyl and having at least two condensed aromatic rings substituted with a nitrogen atom (JP-A No.5-234681), an aromatic triamine which is a triphenylbenzene derivative and which has a star burst structure (U.S. Pat. No. 4,923,774), an aromatic diamine such as N,N'-diphenyl-N,N'-bis(3-methylphenyl)biphenyl-4,4'-diamine (U.S. Pat. No. 4,764,625), a triphenylamine derivative which is sterically asymmetrical as a whole molecule (JP-A No. 4 No. 129271), a compound having a plurality of aromatic diamino groups substituted on a pyrenyl group (JP-A No. 4-175395), an aromatic diamine having tertiary aromatic amine units connected by ethylene groups (JP-A No. 4-264189), an aromatic diamine having a styryl structure (JP-A No. 4-290851), one having aromatic tertiary amine units connected by thiophene groups (JP-A No. 4-304466), a star burst type aromatic triamine (JP-A No. 4-308688), a benzylphenyl compound (JP-A No. 4-364153), one having tertiary amines connected by fluorene groups (JP-A No. 5-25473), a triamine compound (JP-A No. 5-239455), bis-dipyridylamino biphenyl (JP-A No. 5-320634), an N,N,N-triphenylamine derivative (JP-A No. 6-1972), an aromatic diamine having a phenoxadine structure (JP-A No. 7-138562), a diaminophenylphenanetrizine derivative (JP-A No. 7-252474), a silazane compound (U.S. Pat. No. 4,950,950), a silanamine derivative (JP-A No. 6-49079), or a phosphamine derivative (JP-A No. 6-25659), optionally. These compounds may be used alone or in combination of two or more kinds, optionally.

In addition to the above compounds, configuration of the material for the hole transport layer 24 may, for example, be a polymer material such as a polyvinyl carbazole or polysilane, polyphosphazene (JP-A No. 5-310949), polyamide (JP-A No. 5-310949), polyvinyl triphenylamine (JP-A No. 7-53953), a polymer having a triphenylamine structure (JP-A No. 4-133065), or a polymetacrylate containing an aromatic amine.

The hole transporting layer 24 is formed by the hole transporting material by a layering on the hole injection layer 23 using coating method or a vacuum deposition method. In the case of a coating method, one or two or more of the hole transporting materials, additives such as a binder resin or coating-property improving agent which does not become a trap of a hole optionally is added, dissolved to prepare a coating solution, and coated on the hole injection layer 23 by a spin coating method, or the like, and dried to form the hole transporting layer 24. When the coating method is used, a solvent where a hole injection layer 23 is not substantially dissolved is preferably used. However, since a lower layer is three-dimensionally cross-linked in the exemplary embodiment, resistance to solvent is high and solvent is selected in a wide range.

Examples of the binder polymer include polycarbonates, polyarylates, and polyesters. The hole mobility is decreased when the content of a binder polymer is high. Therefore, a smaller amount of the binder polymer is desirable. Usually, the content in a hole injection layer is preferably 50% by weight or less (or about 50% by weight or less). When a vacuum deposition method is used, hole transportable materials are placed in a crucible disposed in a vacuum container, and are exhausted to about 10-4 Pa with a suitable vacuum pump in the vacuum container. Thereafter, the crucible is heated, the hole transportable materials are evaporated, and the hole transportable layer 24 is formed on the substrate 21 having the anode 22 and the hole injection layer 23 facing toward the crucible formed. Thus, the thickness of the formed hole transportable layer 24 is from 10 nm to 300 nm, preferably 30 nm to 100 nm. In order that this thin film is uniformly formed, a vacuum deposition method is generally used.

The compound to be used for this electron transporting layer 26 may be required that electron injection from the cathode is easy, and the ability of transporting electrons is larger. Examples of an electron transporting material include an aluminum complex of 8-hydroxyquinoline or an oxadiazole derivative, (Appl. Phys. Lett., vol. 55, p. 1489, 1989), a system having such a material dispersed in a resin such as polymethyl methacrylate (PMMA), a phenanthroline derivative (JP-A No. 5-331459), 2-t-butyl-9,10-N,N'-dicyanoanthraquinonediimine, n-type hydrogenated amorphous silicon carbide, n-type zinc sulfide, or n-type zinc selenide, which are described above as the light-emitting materials.

The thickness of the electron transporting layer 26 is usually from 5 nm to 200 nm, preferably from 10 nm to 100 nm.

The cathode 27 has a function to inject electrons into the light-emitting layer 25. The material used as the cathode 27 may be the same as that used in the anode 22, but a metal having a low work function is preferable for efficiently injecting electrons. An appropriate metal such as tin, magnesium, indium, calcium, aluminum, and silver or an alloy thereof may be used. Specific examples of the cathode 27 include low-work-function alloy electrodes such as a magnesium-silver alloy, a magnesium-indium alloy, and an aluminum-lithium alloy. The thickness of the cathode 27 is usually the same as that of the anode 22. In order to protect the cathode 27 made of a low-work-function metal, a metal layer which has a high-work-function and is stable to the air is layered on the cathode. This increases the stability of a device. For achieving this purpose, a metal such as aluminum, silver, copper, nickel, chromium, gold, or platinum is used. The efficiency of a device can be enhanced by inserting an ultrathin insulating film (from 0.1 nm to 5 nm) made of LiF, $MgF_2$, or $Li_2O$ at the interface between the cathode 27 and the light-emitting layer 25 or between the cathode 27 and an electron transport layer 26 described below (Appl. Phys. Lett., vol. 70, p. 152, 1977; JP-A No. 10-74586; IEEE Trans. Electron. Devices, vol. 44, p. 1245, 1997).

FIGS. 7 and 9 show one example of a device structure used in the exemplary embodiment. The exemplary embodiment is not limited to that shown in the drawings. For example, a structure having layers in reverse order of FIG. 7 may be used, that is, a structure having layers in the order of cathode 27, the light-emitting layer 25, the hole injection layer 23, and the anode 22 on the substrate 21. As described above, at least one organic electroluminescent device of the exemplary embodiment may be provided between two high transparent substrates. Similarly, a structure having layers in reverse order of FIGS. 8 and 9 may be also used. In order to improve the life of a device, a structure is effective in which sealing is made with resin or metal materials, a sealing layer to protect the device from air or water are formed, or the device can be operated in a vacuum system.

EXAMPLES

The invention will now be described more specifically with reference to Examples, but the invention is not limited to the description of the following Examples.

Synthesis Examples 1

Synthesis of CTP-1

In a 500 ml flask, after polymerization, 40 parts by weight of a compound represented by the following formula (1)-13' to be (1)-13, and 10 parts by weight of a compound represented by the following formula (B) are dissolved in 100 ml of toluene, followed by adding 0.3 parts by weight of azobisisobutyronitrile (AIBN) thereto. The reaction system is sufficiently subjected to nitrogen replacement, and then is sealed and is reacted at 80° C. for 10 hours. After reaction, the resultant is injected into 4,000 ml of methanol, the obtained polymer is filtered off, followed by cleaning and drying to obtain 45 parts by weight of CTP-1 precursor.

Figure 10:
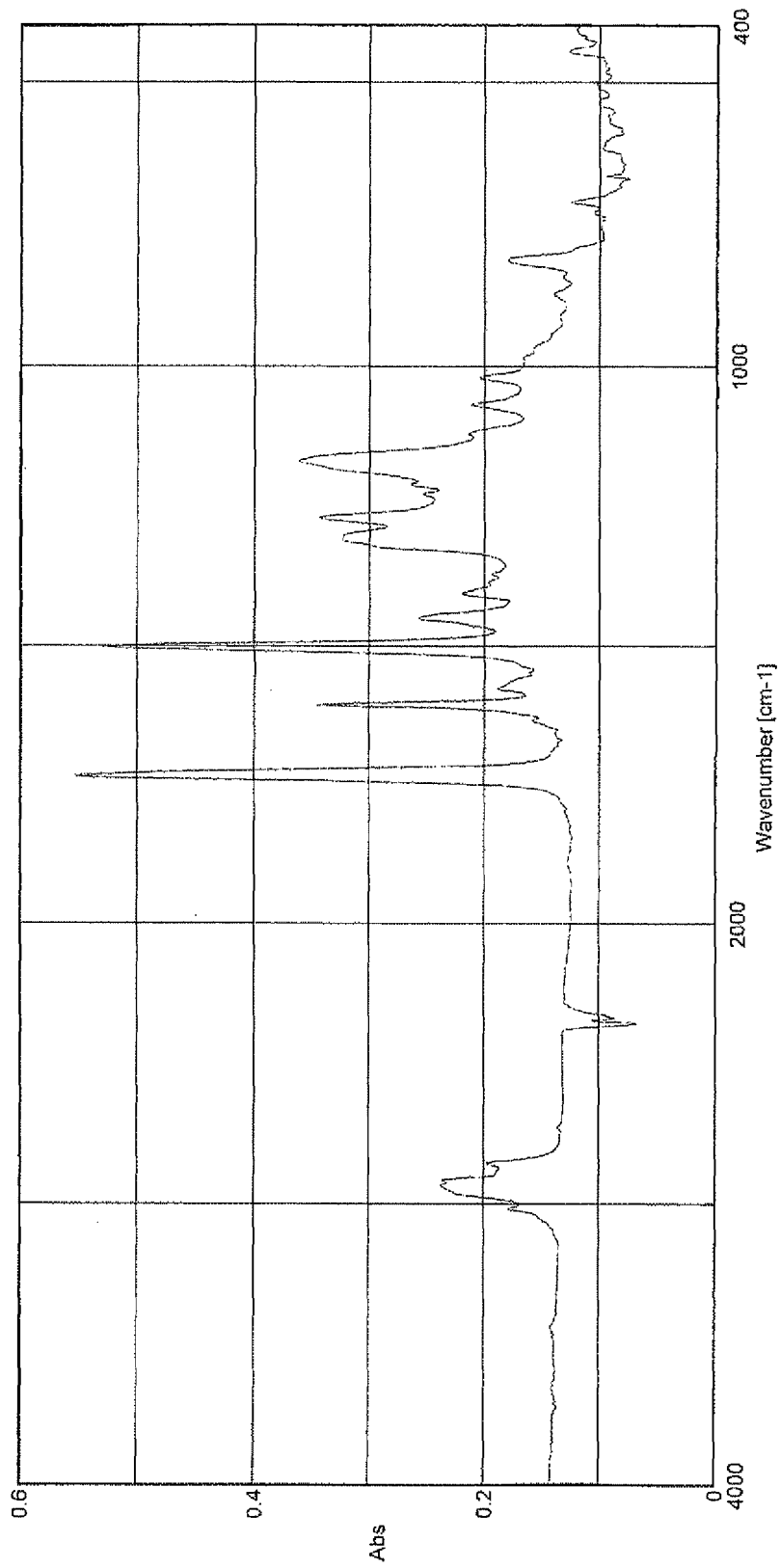
FIG. 10 is a diagram illustrating an IR spectrum of a compound CTP-1 synthesized in Examples.

45 parts by weight of the obtained CTP-1 precursor is dissolved in 200 ml of dimethyl acetamide, followed by nitrogen replacement, and 7.5 parts by weight of triethyl amine is slowly added. After addition, reaction is carried out at room temperature for 24 hours. After the reaction, 200 ml of toluene is added thereto and the resultant is injected into 1,000 ml of water, followed by washing. The organic phase is sufficiently washed until the organic phase is neutral, 2,000 ml of methanol is added dropwise, and the obtained polymer is washed with methanol and dried to obtain 39 parts by weight of CTP-1. The weight-average molecular weight Mw of CTP-1 is about 85,000 in terms of polystyrene standard, and the IR spectrum is shown in FIG. 10.

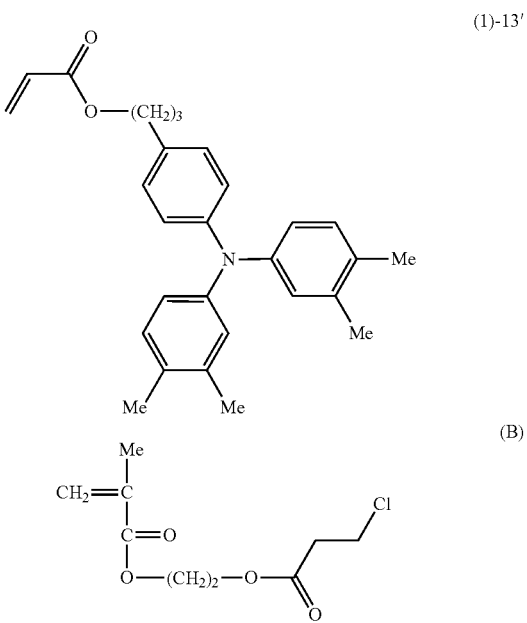

Synthesis Examples 2

Synthesis of CTP-3

Figure 11:
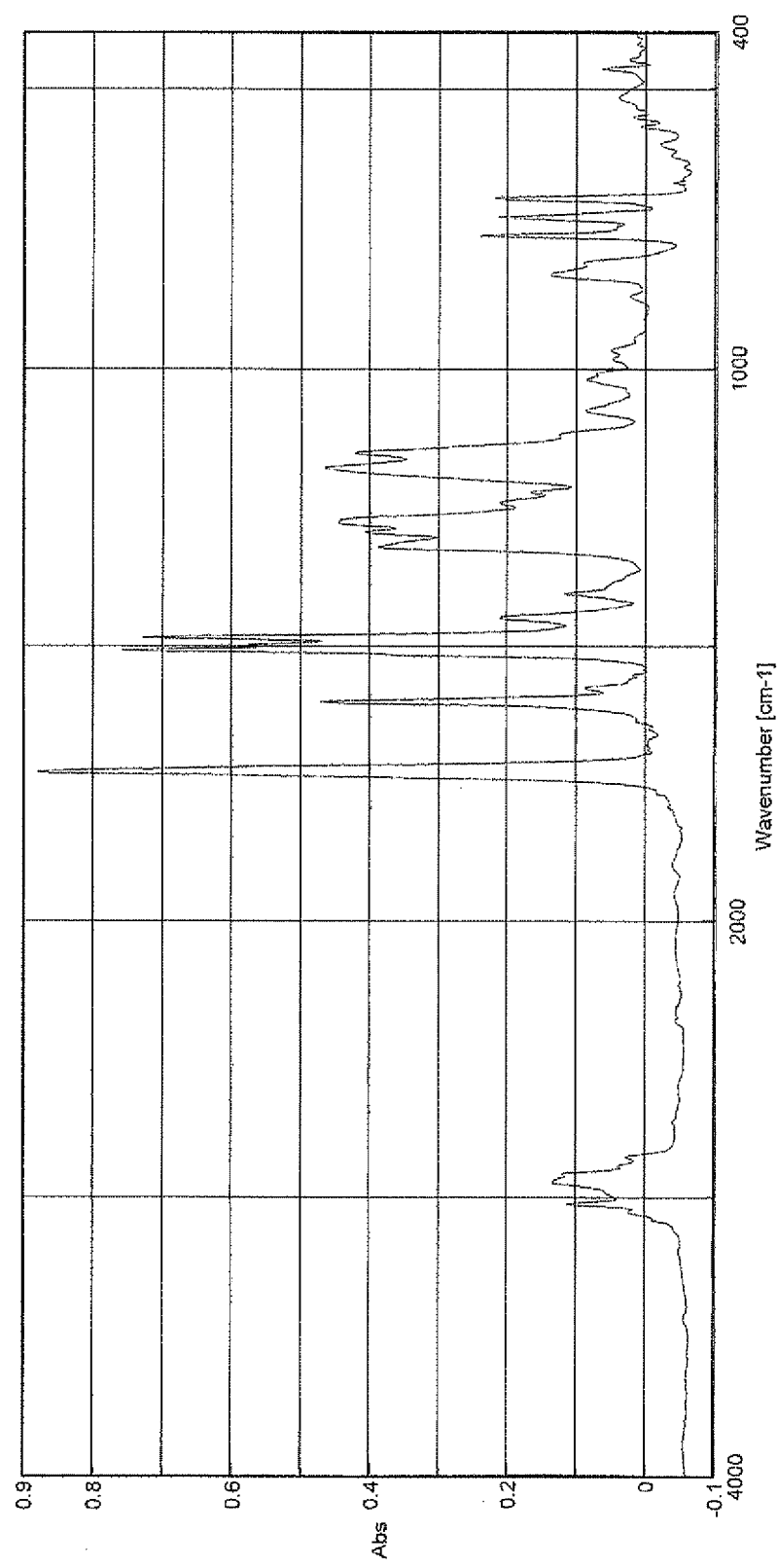
FIG. 11 is a diagram illustrating an IR spectrum of a compound CTP-3 synthesized in Examples.

In a 500 ml flask, after polymerization, 40 parts by weight of a compound represented by the following formula (1)-25' to be (1)-25, and 10 parts by weight of a compound represented by the following formula (B) are dissolved in 200 ml of toluene, followed by adding 0.3 parts by weight of azobisisobutyronitrile (AIBN) thereto. The reaction system is sufficiently subjected to nitrogen replacement, and then is sealed and is reacted at 80° C. for 10 hours. After reaction, the resultant is injected into 4,000 ml of methanol, the obtained polymer is filtered off, followed by cleaning and drying to obtain 45 parts by weight of CTP-3 precursor. 45 parts by weight of the obtained CTP-3 precursor are dissolved in 200 ml of dimethyl acetamide, followed by nitrogen replacement, and 7.5 parts by weight of triethyl amine are slowly added. After the addition, the reaction is carried out at room temperature for 24 hours. After the reaction, 200 ml of toluene is added thereto and the resultant is injected into 1,000 ml of water, followed by washing. The organic layer is sufficiently washed until the organic layer is neutral, 2,000 ml of methanol is added dropwise, and the obtained polymer is washed with methanol and dried to obtain 43 parts by weight of CTP-3. The weight-average molecular weight Mw of CTP-3 is about 35,000 in terms of polystyrene standard, and the IR spectrum is shown in FIG. 11.

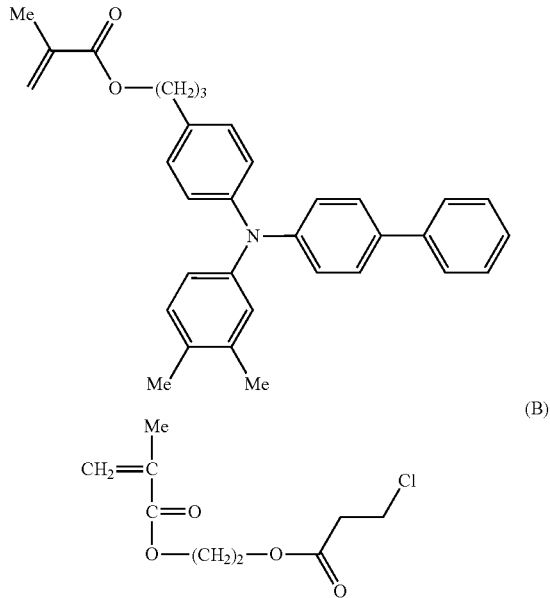

In a similar manner to synthesis examples 1 and 2, examples of charge transportable polymers (CTP) are shown in Table 1.

TABLE 1

| | CT | R1 | R2 | R3 | X |
|---|---|---|---|---|---|
| CTP-1 | (triarylamine structure) | H | Me | H | —(CH$_2$)$_3$—O— |
| CTP-2 | (triarylamine structure) | Me | Me | H | —(CH$_2$)$_3$—O— |

TABLE 1-continued

| | | | | | |
|---|---|---|---|---|---|
| CTP-3 | (structure) | Me | Me | H | —(CH₂)₃—O— |
| CTP-4 | (structure) | H | H | Me | —(CH₂)₂—O— |
| CTP-5 | (structure) | H | Me | H | —(CH₂)₃—O— |
| CTP-6 | (structure) | Me | Me | H | —CH₂—O— |
| CTP-7 | (structure) | Me | Me | H | — |

TABLE 1-continued
| | | | | | | |
|---|---|---|---|---|---|---|
| CTP-8 | 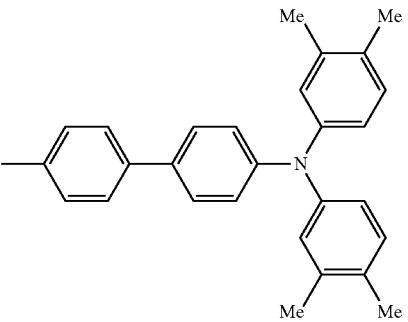 | Me | Me | H | — | |
| CTP-9 | 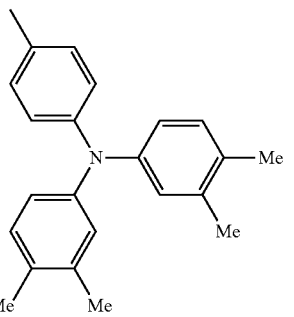 | Me | Me | H | 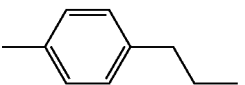 | |
| CTP-10 | 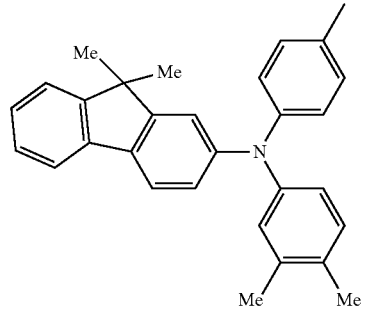 | Me | Me | H | —(CH$_2$)$_3$—O— | |
| | a | Y | m | n | Molecular weight (Mw) |
|---|---|---|---|---|---|
| CTP-1 | 1 | 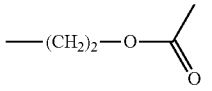 —(CH$_2$)$_2$—O— | about 164 | about 77 | 85000 |
| CTP-2 | 0 | 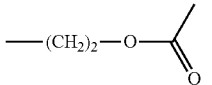 —(CH$_2$)$_2$—O— | about 58 | about 75 | 55000 |
| CTP-3 | 1 | 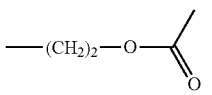 —(CH$_2$)$_2$—O— | about 59 | about 32 | 35000 |
| CTP-4 | 1 | 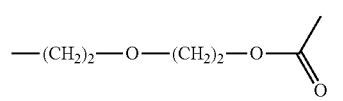 —(CH$_2$)$_2$—O—(CH$_2$)$_2$—O— | about 71 | about 38 | 50000 |
| CTP-5 | 1 | 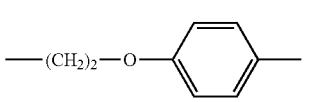 —(CH$_2$)$_2$—O— | about 87 | about 34 | 45000 |
| CTP-6 | 1 | 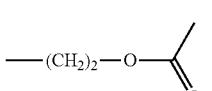 —(CH$_2$)$_2$—O— | about 84 | about 45 | 50000 |

TABLE 1-continued

| | | | | | |
|---|---|---|---|---|---|
| CTP-7 | 0 | 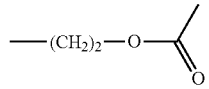 | about 191 | about 36 | 80000 |
| CTP-8 | 0 | 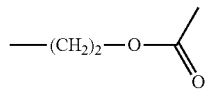 | about 61 | about 32 | 35000 |
| CTP-9 | 0 | 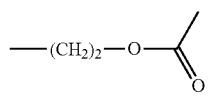 | about 49 | about 27 | 30000 |
| CTP-10 | 1 | 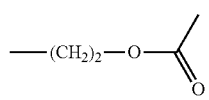 | about 61 | about 61 | 45000 |

Example 1

Preparation of Photoreceptor
(Preparation of Undercoating Layer)

100 parts by weight of zinc oxide: (average particle diameter 70 nm: manufactured from Tayca Corp.:specific surface area 15 m$^2$/g) is mixed by stirring with 500 parts by weight of tetrahydrofuran, and 1.3 parts by weight of silane coupling agent (KBM503, trade name, manufactured by Shin-Etsu Chemical Co. Ltd.) is added thereto, followed by stirring for 2 hours. Thereafter, the toluene is distilled off under reduced pressure, baked at 120° C. for 3 hours and subjected to surface treatment by a silane coupling agent to obtain zinc oxide.

The 110 parts by weight of zinc oxide subjected to surface treatment using a silane coupling agent is mixed by stirring with 500 parts by weight of tetrahydrofuran, and 1.0 part by weight of Alizarin is added to the solution dissolved in 50 parts by weight of tetrahydrofuran, followed by stirring at 50° C. for 5 hours. Thereafter, alizarin is provided by filtration under reduced pressure and zinc oxide is separated by filtration, and further drying is carried out at 60° C. under reduced pressure to obtain zinc oxide providing aniline. 38 parts by weight of a solution prepared by dissolving 60 parts by weight of the alizarin-added zinc oxide, 13.5 parts by weight of a curing agent (blocked isocyanate, trade name: SUMIDUR 3175, manufactured by Sumitomo-Bayer Urethane Co., Ltd.) and 15 parts by weight of a butyral resin (trade name: S-Lee BM-1, manufactured by Sekisui Chemical Co., Ltd.) in 85 parts by weight of methyl ethyl ketone is mixed with 25 parts by weight of methyl ethyl ketone. The mixture is dispersed using a sand mill with the glass beads having a diameter of 1 mmφ for 2 hours to obtain dispersion.

0.005 parts by weight of dioctyltin dilaurate as a catalyst, and 45 parts by weight of silicone resin particles (trade name: TOSPAL 145, manufactured by GE Toshiba Silicone Co., Ltd.) are added to the dispersion to obtain a coating solution for an undercoating layer. An undercoating layer having a thickness of 18 μm is formed by applying the coating solution on an aluminum substrate having a diameter of 30 mm, a length of 340 mm and a thickness of 1 mm by dip coating, and drying to cure at a temperature of 170° C. for 40 minutes.

(Formation of Charge Generating Layer)

A mixture including 15 parts by weight of hydroxy gallium phthalocyanine having the diffraction peaks at least at 7.3°, 16.0°, 24.9° and 28.0° of Bragg angles) (20±0.2°) in an X-ray diffraction spectrum of Cuka X ray as a charge generating substance, 10 parts by weight of vinyl chloride-vinyl acetate copolymer resin (trade name: VMCH, manufactured by Nippon Unicar Co., Ltd.) as a binder resin, and 200 parts by weight of n-butyl acetate is dispersed using a sand mill with the glass beads of 1 mmφ diameter for 4 hours. 175 parts by weight of n-butyl acetate and 180 parts by weight of methyl ethyl ketone are added to the obtained dispersion, then stirred to obtain a coating solution for a charge generating layer. The coating solution for the charge generating layer is applied to the undercoating layer by dip coating, and dried at an ordinary temperature to form a charge generating layer having a film thickness of 0.2 μm.

(Formation of Charge Transporting Layer)

45 parts by weight of N,N'-diphenyl-N,N'-bis(3-methylphenyl)-[1,1']biphenyl-4,4'-diamine (TPD) and 55 parts by weight of bisphenol Z polycarbonate resin (PC(Z): viscosity average molecular weight: 60,000) are dissolved in 800 parts by weight of chlorobenzene to obtain a coating solution for a charge transporting layer. The coating solution is applied onto the charge generating layer, then dried at a temperature of 130° C. for 45 minutes to form a charge transporting layer having a film thickness of 15 μm.

Formation of Protective Layer 100 parts by weight of CTP-1, 2 parts by weight of OTAZO-15 (trade name, manufactured by Otsuka Chemical Co. Ltd., molecular weight 354.4) is dissolved into 500 parts by weight of monochlorobenzene, and is coated on the charge transporting layer by spray coating. The resultant is dried at room temperature for 30 minutes, and then raised to 150° C. at 10° C./minute from room temperature under nitrogen of 200 ppm of oxygen concentration, heated and cured at 150° C. for 1 hour, a protective layer (outermost layer) having a film thickness of about 10 μm is formed to produce photoreceptor of Example 1.

<Evaluation of Image Quality>

The electrophotographic photoreceptor made as described above is mounted on APEOSPORT-III C4400 (trade name, manufactured by Fuji Xerox Co., Ltd.) and continuously subjected to the following evaluations under low temperature and low humidity (8° C., 20% RH), and high temperature and high humidity (28° C., 85% RH).

Specifically, the image quality is evaluated according to the last sheet printed in the 10,000-sheet imaging test and the first sheet printed after the electrophotographic photoreceptor is left for 24 hours under a condition of low temperature and low humidity (8° C., 20% RH) after completion of the 10,000- sheet image forming test. The evaluations are made in regard to ghosting, blushing, streaks and image degradation. The results are shown in Table 4.

Subsequent to the above image-forming test under low temperature and low humidity, another 10,000-sheet image forming test is carried out under a condition of high temperature and high humidity (28° C., 85% RH).

The image quality is evaluated according to the last sheet printed in the 10,000-sheet imaging test, and the first sheet printed after the electrophotographic photoreceptor is left for 24 hours under a condition of high temperature and high humidity (28° C., 85% RH) after completion of the second 10,000-sheet image forming test. The results are shown in Table 5.

<Evaluation of Ghosting>

Figure 6A:
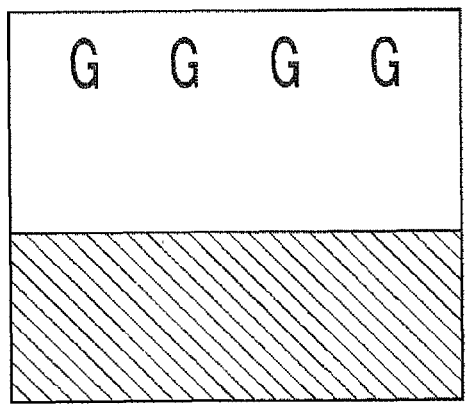
FIGS. 6A-6C are diagrams illustrating criteria of ghosting evaluation.

As shown in FIG. 6(A), a pattern chart of letters G and a gray area having 50% of image density is printed to evaluate the visibility of the letters G appearing in the gray area having 50% of image density by visual observation.

Figure 6B:
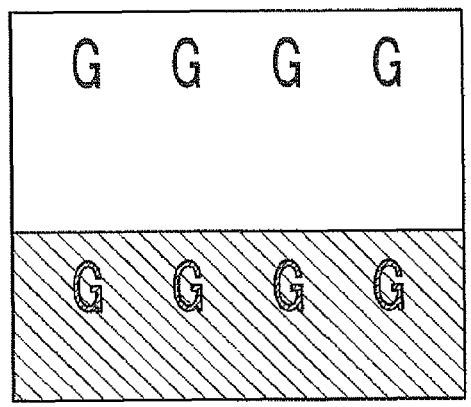
Figure 6C:
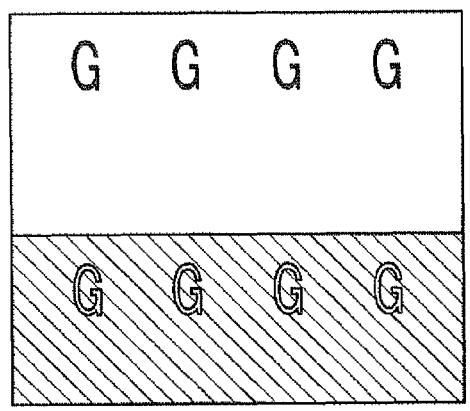

A: Good or almost good as shown in FIG. 6(A).
B: Slightly visible as shown in FIG. 6(B).
C: Distinctly visible as shown in FIG. 6(C).

<Evaluation of Blushing>

The degree of toner adhesiveness to the white area is evaluated by visual observation using the same sample with the evaluation of ghosting.

A: Good.
B: Light blushing is developed.
C: Blushing having a damaging effect on image quality is developed.

<Evaluation of Streaks>

Development of streaks is evaluated by visual observation using the same sample with the evaluation of ghosting.

A: Good.
B: Streaks are partially developed.
C: Streaks having a damaging effect on image quality are developed.

<Evaluation of Image Degradation>

Image degradation is evaluated by visual observation using the same sample as the one used for evaluation of ghosting.

A: Good.
B: No problem occurs during the continuous printing test, but image degradation is observed after leaving the electrophotographic photoreceptor for 1 day (24 hours).
C: Image degradation is observed during the continuous printing test.

—Evaluation of Adhesiveness of the Protective Layer—

The surface of the photoreceptor after the image forming test is cut with a utility knife to form a grid consisting of 5×5 squares, wherein each square has the size of 2×2 mm. A mending tape (manufactured by 3M Corp.) is applied onto the grid and peeled off. The evaluation of the adhesiveness is evaluated by the number of the remaining square after the mending tape is peeled off. The results are shown in Table 4.

A: 21 or more.
B: from 11 to 20.
C: 10 or less.

<Evaluation of Abrasion Amount of Protective Layer>

The thickness of the initial photoreceptor and the abrasion amount are evaluated by measuring the thickness of the film after completion of the image forming test at high temperature and high humidity (28° C., 85%RH) by an eddy-current measuring device (FISCHERSCOPE MMS, trade name, manufactured by Fischer Instrumente K.K.).

Example 2

The undercoating layer up to the charge transporting layer is manufactured similarly to Example 1.

(Manufacture of Protective Layer)

100 parts by weight of CTP-1 is dissolved in 500 parts by weight of monochlorobenzene, and is coated on the charge transporting layer by spray coating. The resultant is dried by air at room temperature and then raised from room temperature to 165° C. at a rate of 10° C./min under nitrogen having oxygen concentration of 100 ppm, heated and cured at 165° C. for 1 hour, and a protective layer having a thickness of about 14 μm is formed to produce a photoreceptor of Example 2.

Example 3

The undercoating layer up to the charge transporting layer is manufactured similarly to Example 1.

(Manufacture of Protective Layer)

100 parts by weight of CTP-1 and 20 parts by weight of A-BPE-300 (trade name, manufactured by Shin-Nakamura Chemical Co., Ltd.) are dissolved in 500 parts by weight of monochlorobenzene, and is coated on the charge transporting layer by spray coating. The resultant is dried by air at room temperature for 30 minutes and then raised from room temperature to 165° C. at a rate of 10° C./rain under nitrogen having oxygen concentration of 100 ppm, heated and cured at 165° C. for 1 hour, and a protective layer having a thickness of about 8 μm is formed to produce a photoreceptor of Example 3.

Example 4

The undercoating layer up to the charge transporting layer is manufactured similarly to Example 1.

(Manufacture of Protective Layer)

60 parts by weight of CTP-1, 20 parts by weight of TPD, 20 parts by weight of A-16, and 2 parts by weight of VE-73 (trade name, manufactured by Wako Pure Chemical industries, Ltd.) are dissolved in 500 parts by weight of monochlorobenzene, and is coated on the charge transporting layer by spray coating. The resultant is dried by air at room temperature for 30 minutes and then raised from room temperature to 150° C. at a rate of 10° C./min under nitrogen having oxygen concentration of 100 ppm, heated and cured at 150° C. for 1 hour, and a protective layer having a thickness of about 10 μm is formed to produce a photoreceptor of Example 4.

Example 5

The undercoating layer up to the charge transporting layer is manufactured similarly to Example 1.

(Manufacture of Protective Layer)

60 parts by weight of CTP-1, 20 parts by weight of TPD, 10 parts by weight of A-16, 10 parts by weight of PC(Z) and 2 parts by weight of VE-73 (trade name, manufactured by Wako Pure Chemical industries, Ltd.) are dissolved in 500 parts by weight of monochlorobenzene, and are coated on the charge transporting layer by spray coating. The resultant is dried by air at room temperature for 30 minutes and then raised from room temperature to 150° C. at a rate of 10° C./min under nitrogen having oxygen concentration of 100 ppm, heated and cured at 150° C. for 1 hour, and a protective layer having a thickness of about 15 μm is formed to produce a photoreceptor of Example 5.

Example 6

The undercoating layer up to the charge transporting layer is manufactured similarly to Example 1.

(Manufacture of Protective Layer)

60 parts by weight of CTP-1, 20 parts by weight of TPD, 10 parts by weight of A-16, 10 parts by weight of PC(Z), 1 part by weight of 2,6-di-t-butyl-4-hydroxytoluene (BHT) and 2 parts by weight of VE-73 (trade name, manufactured by Wako Pure Chemical industries, Ltd.) are dissolved in 500 parts by weight of monochlorobenzene, and is coated on the charge transporting layer by spray coating. The resultant is dried by air at room temperature for 30 minutes and then raised from room temperature to 150° C. at a rate of 10° C./min under nitrogen having oxygen concentration of 100 ppm, heated and cured at 150° C. for 1 hour, and a protective layer having a thickness of about 13 μm is formed to produce a photoreceptor of Example 6.

Example 7

The undercoating layer up to the charge transporting layer is manufactured similarly to Example 1.

(Manufacture of Protective Layer)

60 parts by weight of CTP-1, 20 parts by weight of A-TMMT (trade name, manufactured by Shin-Nakamura Chemical Co., Ltd.), 10 parts of PTFE (LUBLON-2, trade name, manufactured by DAIKIN INDUSTRIES, ltd.) are dissolved in 500 parts by weight of monochlorobenzene, followed by dispersion in three passes through NANO-MIZER-TL-1500 (trade name, manufactured by Nanomizer.inc). 2 parts by weight of VE-73 (Wako Pure Chemical industries) is added to a dispersion liquid, and the solution is coated on the charge transporting layer by spray coating. The resultant is dried by air at room temperature for 30 minutes and then raised at the rate of 10° C./minutes from room temperature to 150° C. under nitrogen having oxygen concentration of 100 ppm, heated and cured at 150° C. for 1 hour, and a protective layer having a thickness of about 10 μm is formed to produce a photoreceptor of Example 7.

Example 8

An undercoating layer up to the charge transporting layer is manufactured similarly to Example 1 except that 25 parts by weight of N,N'-diphenyl-N,N'-bis(3-methylphenyl)-[1,1']biphenyl-4,4'-diamine(TPD) and 20 parts by weight of charge transporting material having the following structure are used as the materials in the charge transporting layer.

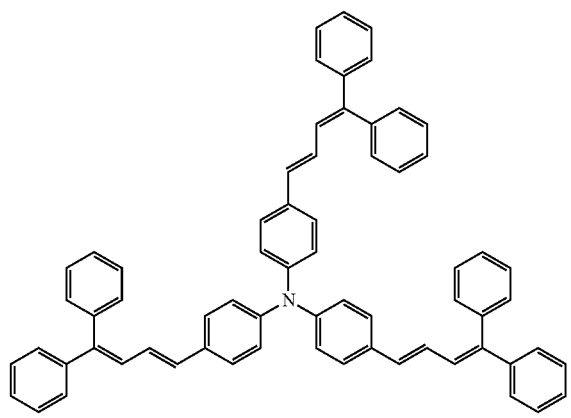 [SMILES: C(/C=C/c1ccc(N(c2ccc(/C=C/C=C(c3ccccc3)c3ccccc3)cc2)c2ccc(/C=C/C=C(c3ccccc3)c3ccccc3)cc2)cc1)=C(c1ccccc1)c1ccccc1]

(Manufacture of Protective Layer)

60 parts by weight of CTP-1, 20 parts by weight of A-TMMT (trade name, manufactured by Shin-Nakamura Chemical Co., Ltd.), 2 parts by weight of VE-73 (trade name, manufactured by Wako Pure Chemical Industries, Ltd.) are dissolved in 500 parts by weight of monochlorobenzene, and the solution is coated on the charge transporting layer by spray coating. The resultant is dried by air at room temperature for 30 minutes and then raised at the rate of 10° C./minutes from room temperature to 150° C. under nitrogen having oxygen concentration of 100 ppm, heated and cured at 150° C. for 1 hour, and a protective layer having a thickness of about 8 μm is formed to produce a photoreceptor of Example 8.

Example 9

A photoreceptor of Example 9 is manufactured similarly to Example 3 except that the material used in the protective layer is CTP-2.

Example 10

A photoreceptor of Example 10 is manufactured similarly to Example 8 except that CTP-1 is changed to 60 parts by weight of CTP-2 and A-TMMT is changed to 20 parts by weight of A-BPE-300, and VE-73 is changed to 2 parts by weight of OTazo-15.

Examples 11 and 12

Photoreceptors of Examples 11 and 12 are manufactured similarly to Example 7 except that CTP-1 is changed to that shown in Table 2.

Examples 13 to 16

Photoreceptors of Examples 13 to 16 are manufactured similarly to Example 8 except that CTP-1 is changed to that shown in Tables 2 and 3.

Examples 17 to 20

A photoreceptors of Examples 17 to 20 are manufactured similarly to Example 10 except that CTP-1 is changed to that shown in Table 3.

Example 21

A photoreceptor of Example 21 is manufactured similarly to Example 1 except that CTP-1 is changed to CTP-5.

Example 22

A photoreceptor of Example 22 is manufactured similarly to Example 2 except that CTP-1 is changed to CTP-3.

Example 23

A photoreceptor of Example 23 is manufactured similarly to Example 5 except that CTP-1 is changed to CTP-3.

Example 24

A photoreceptor of Example 24 is manufactured similarly to Example 10 except that CTP-2 is changed to CTP-8 and A-BPE-300 is changed to A-50.

Example 25

The undercoating layer to charge transporting layer are manufactured similarly to Example 8.

(Manufacture of Protective Layer)

60 parts by weight of CTP-9, 20 parts by weight of A-TMMT, 1 part by weight of MDPS (trade name, manufactured by Mitsubishi Chemical Co., Ltd.), 2 parts by weight of VE-73 (trade name, manufactured by Wako Pure Chemical Industries, Ltd.) are dissolved in 500 parts by weight of monochlorobenzene, and the solution is coated on the charge transporting layer by spray coating. The resultant is dried by air at room temperature for 30 minutes and then raised at the rate of 10° C./minutes from room temperature to 150° C. under nitrogen having oxygen concentration of 100 ppm, heated and cured at 150° C. for 1 hour, and a protective layer having a thickness of about 12 μm is formed to produce a photoreceptor of Example 25.

Comparative Example 1

Photoreceptor of Comparative Example 1 is produced similarly to Example 1 except that a protective layer is not formed.

Comparative Example 2

In a 500 ml flask, 50 parts by weight of a compound represented by the following structure (1)-13' to be (1)-13 after polymerization is dissolved in 100 ml of toluene and 0.3 parts by weight of azobisisobutyronitrile (AIBN) is added thereto. After nitrogen replacement of a reaction system, the reaction system is closed, and is reacted at 80° C. for 10 hours. After reaction, the resultant is injected into 4000 ml of methanol and the obtained polymer is filtered, washed and dried to 45 parts by weight of a charge transportable polymer (P-1) having no reactive group.

50 parts by weight of the charge transportable polymer is dissolved in 300 parts by weight of monochlorobenzene, and the solution is coated on the charge transporting layer by spraying. The resultant is dried by air at room temperature for 30 minutes, heated at 150° C. for 1 hour, and a protective layer having the thickness of about 10 μm is formed to a photoreceptor of Comparative Example 2.

Comparative Examples 3 and 4

100 parts by weight of the compound having the following structure, parts by weight of glycidyl methacrylate, 2 parts by weight of azobisisobutyronitrile, and 460 parts by weight of toluene is injected to a three-neck flask, and is replaced with nitrogen at room temperature for 30 minutes. The solution is reacted at 75° C. for 7 hours, and then is diluted with 200 parts by weight of toluene and the reaction is completed. 28 parts by weight of acrylic acid, 0.4 parts by weight of hydroxymonomethyl ether to the reaction liquid, and 1 part by weight of triphenyl phosphate are added and reacted at 90° C. for 7 hours, and then diluted with 2000 parts by weight of toluene and the solution is injected to 15,000 parts by weight of methanol, followed by precipitation. This polymer is filtered, washed with methanol, and dried under the vaccum to give 205 parts by weight of reactive charge transportable polymer disclosed in "Example 1" of JP-A No. 2005-2291. The weight-average molecular weight of P-2 determined by GPC is about 18000 in terms of polystyrene standard.

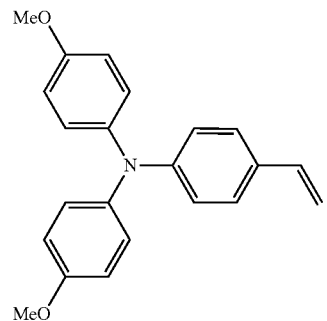 [SMILES: C=Cc1ccc(N(c2ccc(OC)cc2)c2ccc(OC)cc2)cc1]

Each of the photoreceptors of Comparative Examples 3 and 4 is manufactured similarly to Examples 1 and 8 except that CTP-1 of Examples 1 and 8 are changed to a reactive charge transportable polymer respectively.

The photoreceptors are evaluated similarly to Example 1, but even at low temperature and low humidity, high temperature and high humidity, the potential after image recording is not sufficiently reduced, image density is low, and thus problems of image quality are caused.

Organic EL Device

Example 26

First, a glass substrate provided with an ITO film having a thickness of 150 nm is prepared, and washed with oxygen plasma for 30 seconds using a plasma washing machine (BP1, trade name, manufactured by SAMCO International, Inc.). 1 part by weight of CTP-3 is dissolved in 20 parts by weight of dichloromethane, this solution is spin-coated on the surface of the aforementioned glass substrate at a rotation rate of 300 rpm, heated at 160° C. for 1 hour and cured to form a hole injecting layer having a thickness of 600 nm (as measured by a needle contact type film thickness measuring equipment). Then, tris(8-hydroxyquinoline)aluminum (Alq) as a material for a light-emitting layer is vacuum-deposited on the surface of this hole injecting layer at 50 nm, and a magnesium-silver alloy electrode as a cathode is vapor-deposited on the surface of a light-emitting layer at a thickness of 200 nm to prepare an organic EL device. Using the ITO electrode of the organic EL device as an anode and the magnesium-silver alloy electrode as a cathode, DC 7 V is applied, current-voltage properties are obtained and a luminance and efficiency are measured. In addition, luminance after working for 1000 hours is measured, and thus the result is shown in Table 6.

When the organic EL device is used in a display or a laser, high current may need to be charged. Therefore, the voltage required for a current of 250 mA/cm² is measured. The result is shown in Table 6.

Examples 27 and 28

The organic EL device of Examples 27 and 28 are manufactured similarly to Example 26 except that CTP-3 is changed to CTP-1 and CTP-10 respectively, and evaluated. The result is shown in Table 6.

Comparative Example 5

Comparative Example 5 is evaluated similarly to Example 26 except that the CTP-3 curing film of Example 26 is changed to a hole injecting transporting layer having a thickness of 600 nm formed of TPD. The result is shown in Table 6.

TABLE 2

| | CTP | Non-reactive Charge Transportable Material (β) | Cross-linking agent | Resin | Additive | Polymerization Initiator Type | Molecular Weight | Thickness of Film (μm) |
|---|---|---|---|---|---|---|---|---|
| Example 1 | CTP-1 100 parts by weight | — | — | — | — | O Tazo-15 2 parts by weight | 354.4 | 10 |
| Example 2 | CTP-1 100 parts by weight | — | — | — | — | — | — | 14 |
| Example 3 | CTP-1 60 parts by weight | — | A-BPE-300 20 parts by weight | — | — | — | — | 8 |
| Example 4 | CTP-1 60 parts by weight | TPD 20 parts by weight | A-16 20 parts by weight | — | — | VE-73 2 parts by weight | 310.4 | 10 |
| Example 5 | CTP-1 60 parts by weight | TPD 20 parts by weight | A-16 10 parts by weight | PC(Z) 10 parts by weight | — | VE-73 2 parts by weight | 310.4 | 15 |
| Example 6 | CTP-1 60 parts by weight | TPD 20 parts by weight | A-16 10 parts by weight | PC(Z) 10 parts by weight | BHT 1 parts by weight | VE-73 2 parts by weight | 310.4 | 13 |
| Example 7 | CTP-1 60 parts by weight | — | A-BPE-300 20 parts by weight | — | PTFE 10 parts by weight | VE-73 2 parts by weight | 310.4 | 10 |
| Example 8 | CTP-1 60 parts by weight | — | A-TMMT 20 parts by weight | — | — | VE-73 2 parts by weight | 310.4 | 8 |
| Example 9 | CTP-2 60 parts by weight | — | A-BPE-300 20 parts by weight | — | — | — | — | 13 |
| Example 10 | CTP-2 60 parts by weight | — | A-BPE-300 20 parts by weight | — | — | O Tazo-15 2 parts by weight | 354.4 | 8 |
| Example 11 | CTP-3 60 parts by weight | — | A-BPE-300 20 parts by weight | — | PTFE 10 parts by weight | VE-73 2 parts by weight | 310.4 | 10 |
| Example 12 | CTP-4 60 parts by weight | — | A-BPE-300 20 parts by weight | — | PTFE 10 parts by weight | VE-73 2 parts by weight | 310.4 | 10 |
| Example 13 | CTP-6 60 parts by weight | — | A-TMMT 20 parts by weight | — | — | VE-73 2 parts by weight | 310.4 | 10 |
| Example 14 | CTP-7 60 parts by weight | — | A-TMMT 20 parts by weight | — | — | VE-73 2 parts by weight | 310.4 | 10 |
| Example 15 | CTP-8 60 parts by weight | — | A-TMMT 20 parts by weight | — | — | VE-73 2 parts by weight | 310.4 | 12 |

TABLE 3

| | CTP | Non-reactive Charge Transportable Material (P) | Cross-linking agent | Resin | Additive | Polymerization Initiator Type | Molecular Weight | Thickness of Film (μm) |
|---|---|---|---|---|---|---|---|---|
| Example 16 | CTP-10 60 parts by weight | — | A-TMMT 20 parts by weight | — | — | VE-73 2 parts by weight | 310.4 | 8 |
| Example 17 | CTP-5 60 parts by weight | — | A-BPE-300 20 parts by weight | — | — | O Tazo-15 2 parts by weight | 354.4 | 9 |
| Example 18 | CTP-7 60 parts by weight | — | A-BPE-300 20 parts by weight | — | — | O Tazo-15 2 parts by weight | 354.4 | 7 |
| Example 19 | CTP-9 60 parts by weight | — | A-BPE-300 20 parts by weight | — | — | O Tazo-15 2 parts by weight | 354.4 | 19 |
| Example 20 | CTP-10 60 parts by weight | — | A-BPE-300 20 parts by weight | — | — | O Tazo-15 2 parts by weight | 354.4 | 9 |

TABLE 3-continued

| | CTP | Non-reactive Charge Transportable Material (P) | Cross-linking agent | Resin | Additive | Polymerization Initiator Type | Molecular Weight | Thickness of Film (μm) |
|---|---|---|---|---|---|---|---|---|
| Example 21 | CTP-5 100 parts by weight | — | — | — | — | O Tazo-15 2 parts by weight | 354.4 | 10 |
| Example 22 | CTP-3 100 parts by weight | — | — | — | — | — | — | 14 |
| Example 23 | CTP-3 60 parts by weight | TPD 20 parts by weight | A-16 10 parts by weight | PC(Z) 10 parts by weight | — | VE-73 2 parts by weight | 310.4 | 15 |
| Example 24 | CTP-8 60 parts by weight | — | A-50 20 parts by weight | — | — | O Tazo-15 2 parts by weight | 354.4 | 10 |
| Example 25 | CTP-9 60 parts by weight | — | A-TMMT 20 parts by weight | — | MDPS 1 parts by weight | VE-73 2 parts by weight | 310.4 | 12 |
| Comparative Example 1 | — | — | — | — | — | — | — | — |
| Comparative Example 2 | P-1 | — | — | — | — | — | — | 10 |
| Comparative Example 3 | P-2 100 parts by weight | — | — | — | — | O Tazo-35 2 parts by weight | 354.4 | 10 |
| Comparative Example 4 | P-2 60 parts by weight | — | A-TMMT 20 parts by weight | — | — | VE-73 2 parts by weight | 310.4 | 8 |

TABLE 4

| | | | Low Temperature and Low Humidity (8° C., 20% RH) | | | | | | | |
|---|---|---|---|---|---|---|---|---|---|---|
| | | Worn | After 10,000-sheet test under Low temperature and low humidity | | | | Left for 24 hours under Low temperature and low humidity | | | |
| | Adhesive | amount (μm) | Ghosting | Blushing | Streak | Image Degradation | Ghosting | Blushing | Streak | Image Degradation |
| Example 1 | A | 0.42 | A | A | A | A | A | A | A | A |
| Example 2 | A | 0.52 | A | A | A | A | A | A | A | A |
| Example 3 | A | 0.49 | A | A | A | A | A | A | A | A |
| Example 4 | A | 0.49 | A | A | A | A | A | A | A | A |
| Example 5 | A | 0.61 | A | A | A | A | A | A | A | A |
| Example 6 | A | 0.65 | A | A | A | A | A | A | A | A |
| Example 7 | A | 0.35 | A | A | A | A | A | A | A | A |
| Example 8 | A | 0.36 | A | A | A | A | A | A | A | A |
| Example 9 | A | 0.55 | A | A | A | A | A | A | A | A |
| Example 10 | A | 0.41 | A | A | A | A | A | A | A | A |
| Example 11 | A | 0.38 | A | A | A | A | A | A | A | A |
| Example 12 | A | 0.39 | A | A | A | A | A | A | A | A |
| Example 13 | B | 0.39 | A | A | A | A | A | A | A | A |
| Example 14 | A | 0.48 | A | A | A | A | A | A | A | A |
| Example 15 | A | 0.36 | A | A | A | A | A | A | A | A |
| Example 16 | A | 0.43 | A | A | A | A | A | A | A | A |
| Example 17 | A | 0.45 | A | A | A | A | A | A | A | A |
| Example 18 | A | 0.42 | A | A | A | A | A | A | A | A |
| Example 19 | A | 0.41 | A | A | A | A | A | A | A | A |
| Example 20 | A | 0.46 | A | A | A | A | A | A | A | A |
| Example 21 | A | 0.48 | A | A | A | A | A | A | A | A |
| Example 22 | A | 0.61 | A | A | A | A | A | A | A | A |
| Example 23 | A | 0.65 | A | A | A | A | A | A | A | A |
| Example 24 | A | 0.40 | A | A | A | A | A | A | A | A |
| Example 25 | A | 0.49 | A | A | A | A | A | A | A | A |
| Comparative Example 1 | — | 2.43 | A | A | B | A | A | B | B | A |
| Comparative Example 2 | A | 3.75 | A | A | C | A | A | B | C | A |
| Comparative Example 3 | A | 0.65 | C | A | A | A | C | A | A | A |
| Comparative Example 4 | A | 0.58 | C | A | A | A | C | A | A | A |

TABLE 5

High Temperature and High Humidity (28° C., 85% RH)

| | After 10,000-sheet test under high temperature and high humidity | | | | Left for 1 day under high temperature and high humidity | | | |
|---|---|---|---|---|---|---|---|---|
| | Ghosting | Blushing | Streak | Image Degradation | Ghosting | Blushing | Streak | Image Degradation |
| Example 1 | A | A | A | A | A | A | A | A |
| Example 2 | A | A | A | A | A | A | A | A |
| Example 3 | A | A | A | A | A | A | B | A |
| Example 4 | A | A | B | B | A | A | B | A |
| Example 5 | A | A | A | B | A | A | A | A |
| Example 6 | A | A | A | A | A | A | A | A |
| Example 7 | A | A | A | A | A | A | A | A |
| Example 8 | A | A | A | A | A | A | A | A |
| Example 9 | A | A | A | B | A | A | A | B |
| Example 10 | A | A | A | A | A | A | A | A |
| Example 11 | A | A | A | A | A | A | A | A |
| Example 12 | A | A | A | A | A | A | A | A |
| Example 13 | A | A | A | A | A | A | A | A |
| Example 34 | A | A | A | A | A | A | A | B |
| Example 15 | A | A | A | A | A | A | A | A |
| Example 16 | A | A | A | A | A | A | A | A |
| Example 17 | A | A | A | A | A | A | A | A |
| Example 18 | A | A | B | A | A | A | B | A |
| Example 19 | A | A | A | A | A | A | A | A |
| Example 20 | A | A | B | A | A | B | B | A |
| Example 21 | A | A | B | B | A | A | A | A |
| Example 22 | A | A | A | B | A | A | A | A |
| Example 23 | A | A | A | A | A | A | B | B |
| Example 24 | A | A | B | A | A | A | B | A |
| Example 25 | A | A | A | A | A | B | A | A |
| Comparative Example 1 | A | A | B | A | A | A | B | A |
| Comparative Example 2 | A | A | C | A | A | A | C | A |
| Comparative Example 3 | B | A | A | A | B | A | A | A |
| Comparative Example 4 | B | A | A | A | B | A | A | A |

TABLE 6

| | Applied voltage (V) | Current density (mA/cm²) | Luminance (cd/m²) | Luminance after working for 1000 hours (cd/m²) |
|---|---|---|---|---|
| Example 26 | 7 | 80 | 400 | 330 |
| Example 27 | 7 | 90 | 420 | 350 |
| Example 28 | 7 | 90 | 430 | 360 |
| Comparative Example 5 | 7 | 90 | 450 | 210 |

As shown in Tables 2 to 6, in the electrophotographic photoreceptors of the Examples, deterioration of image quality after repeated use over a long period is suppressed. Further, in the organic EL device of Examples, stable emission properties over a long period are obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A photoelectric conversion device comprising an organic compound layer that contains a polymer (a) having partial structures represented by the following formulae (1) and (2') respectively:

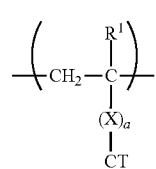

(1)

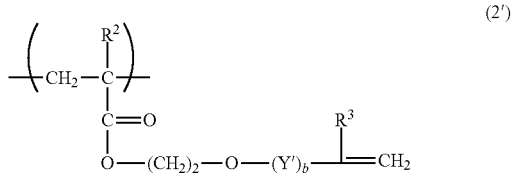

(2')

wherein, in formulae (1) and (2'), $R^1$, $R^2$, and $R^3$ each independently represent a hydrogen atom or an alkyl group having from 1 to 4 carbon atoms, X represents a divalent organic group having from 1 to 20 carbon atoms, Y' represents a divalent organic group having from 1 to 10 carbon atoms, a and b independently represent 0 or 1, and CT represents an organic group having a charge transportable skeleton.

2. The photoelectric conversion device according to claim 1, wherein the polymer (a) is cross-linked.

3. The photoelectric conversion device according to claim 1, wherein the polymer (a) is represented by the following formula (3):

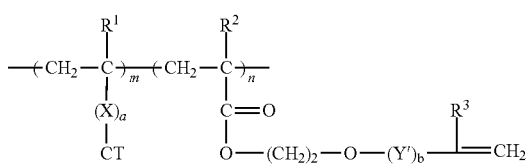

wherein, in formula (3), $R^1$, $R^2$, and $R^3$ each independently represent a hydrogen atom or an alkyl group having from 1 to 4 carbon atoms, X represents a divalent organic group having from 1 to 20 carbon atoms, Y' represents a divalent organic group having from 1 to 10 carbon atoms, a and b each independently represent 0 or 1, CT represents an organic group having a charge transportable skeleton, m and n each independently represent an integer of 5 or more and are in a range of $10<m+n<2000$, and $0.2<m/(m+n)<0.95$.

4. The photoelectric conversion device according to claim 3, wherein neither X nor Y' contains a hydroxyl group.

5. The photoelectric conversion device according to claim 1, wherein the organic group CT having a charge transportable skeleton comprises a triaryl amine skeleton.

6. The photoelectric conversion device according to claim 1, wherein the organic compound layer contains a multifunctional monomer which is reacted with the polymer (a).

7. The photoelectric conversion device according to claim 6, wherein the multifunctional monomer represents a charge transportable compound (α) having two or more acryloyl groups or methacyloyl groups, or derivatives thereof, in a molecule.

8. The photoelectric conversion device according to claim 7, wherein the charge transportable compound (α) represents a compound represented by the following formula (A):

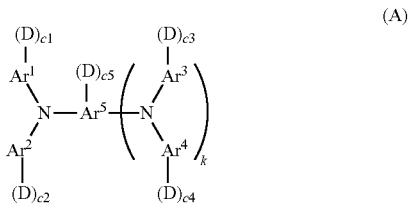

wherein, in formula (A), $Ar^1$ to $Ar^4$ each independently represent a substituted or unsubstituted aryl group, $Ar^5$ represents a substituted or unsubstituted aryl group or a substituted or unsubstituted arylene group, D represents a group having an acryloyl group or a methacryloyl group, or derivatives thereof, at a terminal thereof, c1 to c5 each independently represent 0, 1 or 2, k represents 0 or 1, and the total number of D is from 2 to 6.

9. The photoelectric conversion device according to claim 6, wherein the charge transportable compound (α) is about 50% by weight or less with respect to the total solid content of the organic compound layer.

10. The photoelectric conversion device according to claim 1, wherein the organic compound layer is formed as the outermost layer.

11. An electrophotographic photoreceptor, comprising:
the photoelectric conversion device according to claim 1;
a conductive substrate; and
the organic compound layer that is disposed on the conductive substrate.

12. A process cartridge comprising the electrophotographic photoreceptor according to claim 11, which is detachable from an image forming apparatus.

13. An image forming apparatus comprising:
the electrophotographic photoreceptor according to claim 11;
a charging apparatus for charging a surface of the electrophotographic photoreceptor:
an exposure apparatus for exposing the charged surface of the electrophotographic photoreceptor to form a electrostatic latent image on the surface;
a developing apparatus for developing the electrostatic latent image with developer to form a toner image, and
a transfer apparatus for transferring the toner image to a transfer medium.

* * * * *